United States Patent
Cutter et al.

(10) Patent No.: US 12,541,949 B2
(45) Date of Patent: Feb. 3, 2026

(54) CONTEXTUAL UNDERSTANDING OF MEDIA CONTENT TO GENERATE TARGETED MEDIA CONTENT

(71) Applicant: Roku, Inc., San Jose, CA (US)

(72) Inventors: Michael Patrick Cutter, Golden, CO (US); Sunil Ramesh, Saratoga, CA (US); Karina Levitian, Austin, TX (US)

(73) Assignee: Roku, Inc., San Jose, CA (US)

( * ) Notice: Subject to any disclaimer, the term of this patent is extended or adjusted under 35 U.S.C. 154(b) by 279 days.

(21) Appl. No.: 18/498,867

(22) Filed: Oct. 31, 2023

(65) Prior Publication Data

US 2025/0139942 A1    May 1, 2025

(51) Int. Cl.
 *G06V 10/70*    (2022.01)
 *H04N 21/45*    (2011.01)

(52) U.S. Cl.
 CPC ....... *G06V 10/768* (2022.01); *H04N 21/4532* (2013.01)

(58) Field of Classification Search
 CPC .......................... G06V 10/768; H04N 21/4532
 USPC ......................................................... 382/229
 See application file for complete search history.

(56) References Cited

U.S. PATENT DOCUMENTS

| | | | |
|---|---|---|---|
| 11,042,505 B2 * | 6/2021 | Teran Guajardo | G06N 7/01 |
| 2011/0213655 A1 * | 9/2011 | Henkin | G06Q 30/00 |
| | | | 707/E17.061 |
| 2015/0082349 A1 | 3/2015 | Ishtiaq et al. | |
| 2019/0373297 A1 * | 12/2019 | Sarkhel | H04N 21/25841 |
| 2020/0029131 A1 | 1/2020 | Mavlankar et al. | |
| 2021/0117685 A1 | 4/2021 | Sureshkumar et al. | |
| 2021/0321172 A1 | 10/2021 | Krishnamurthy | |
| 2023/0064341 A1 * | 3/2023 | Ergen | H04N 21/654 |
| 2024/0064367 A1 | 2/2024 | Li et al. | |
| 2024/0357191 A1 | 10/2024 | Mazaheri et al. | |

OTHER PUBLICATIONS

European Search Report, dated Mar. 25, 2025, for the corresponding Application No. 24205554.9 in 8 pages.
Moloud Abdar, et al., "A Review of Deep Learning for Video Captioning", arxiv.org, Cornell University Library, dated Apr. 22, 2023 in 42 pages.

* cited by examiner

*Primary Examiner* — Allen H Nguyen
(74) *Attorney, Agent, or Firm* — Straylight LLP

(57) ABSTRACT

Disclosed herein are system, apparatus, article of manufacture, method and/or computer program product embodiments, and/or combinations and sub-combinations thereof, for processing, understanding, and defining video content. An example can include determining a first set of contextual features associated with a first portion of a media content item; identifying at least one contextual feature from the first set of contextual features that is associated with one or more targeted media content items; and selecting, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item.

18 Claims, 23 Drawing Sheets

| Shot 1 | Shot 2 | Shot 3 |
|--------|--------|--------|

FIG. 8A

| Shot Break | Dialog Break? | Scene Break? | Audio Break? |
|------------|---------------|--------------|--------------|
| 1 and 2 | No | Yes | Yes |
| 2 and 3 | Yes | Yes | Yes |
| 3 and next shot | Yes | Yes | Yes |
| ⋮ | ⋮ | ⋮ | ⋮ |

FIG. 8B

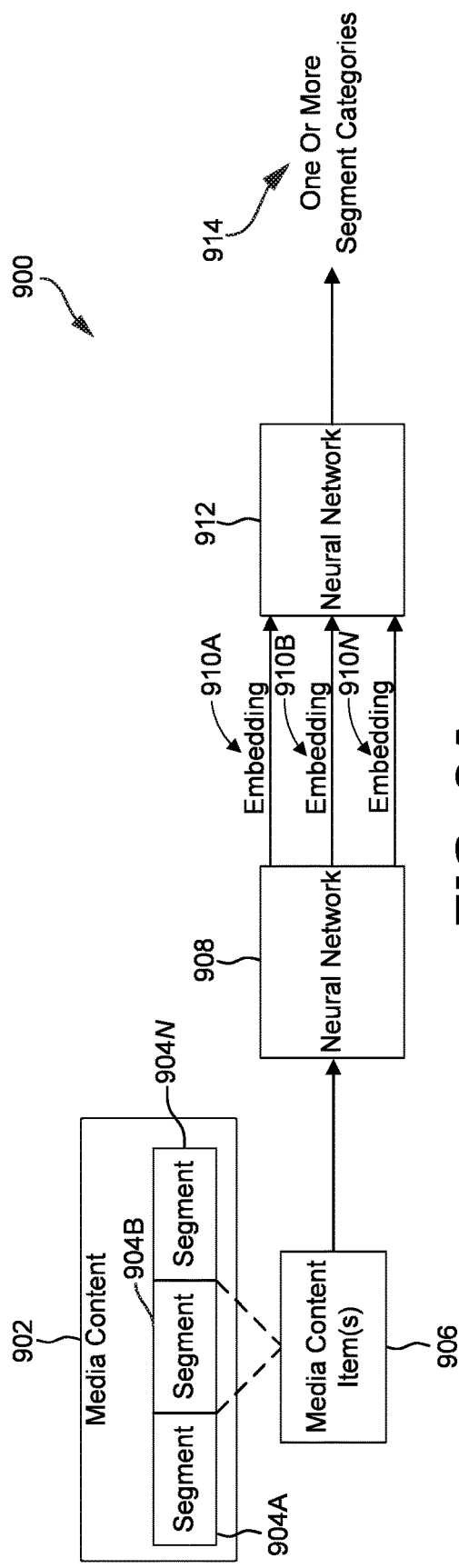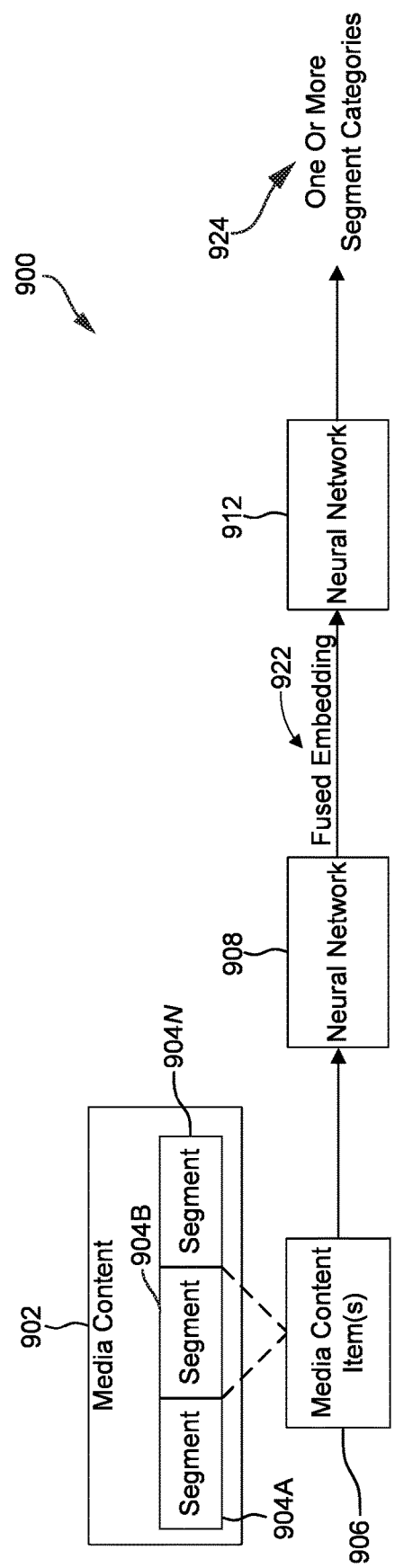

CONTEXTUAL UNDERSTANDING OF MEDIA CONTENT TO GENERATE TARGETED MEDIA CONTENT

FIELD

This disclosure is generally directed to processing video segments, and more particularly to extracting features and contextual information from media content in order to generate customized and/or targeted media content.

SUMMARY

Provided herein are system, apparatus, article of manufacture, method and/or computer program product embodiments, and/or combinations and sub-combinations thereof, for processing media content to extract features and contextual information from the media content to generate customized and targeted media content that is based on the contextual information.

In some aspects, a method is provided for processing media content to extract features and contextual information and generate targeted media content that is based on the contextual information. The method can operate in a content server(s) used to provide video content to remote devices or in a media device that is communicatively coupled to, for example, a display device. The method can operate in other devices such as, for example and without limitation, a smart television or a mobile device, among others.

The method can operate by determining a first set of contextual features associated with a first portion of a media content item. At least one contextual feature from the set of contextual features that is associated with one or more targeted media content items can be identified. A first targeted media content item can be selected based on the at least one contextual feature, wherein the first targeted media content item includes content that is related to the first portion of the media content item, and wherein the first targeted media content item is selected for presentation after the first portion of the media content item.

In some aspects, a system is provided for processing media content to extract features and contextual information from the media content and generate targeted media content that is based on the contextual information. The system can include one or more memories and at least one processor coupled to at least one of the one or more memories and configured to determine a first set of contextual features associated with a first portion of a media content item. The at least one processor of the system can be configured to identify at least one contextual feature from the first set of contextual features that is associated with one or more targeted media content items. The at least one processor of the system can also be configured to select, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item.

In some aspects, a non-transitory computer-readable medium is provided for processing media content to extract features and contextual information from the media content and generate targeted media content that is based on the contextual information. The non-transitory computer-readable medium can have instructions stored thereon that, when executed by at least one computing device, cause the at least one computing device to determine a first set of contextual features associated with a first portion of a media content item. The instructions of the non-transitory computer-readable medium can, when executed by the at least one computing device, cause the at least one computing device to identify at least one contextual feature from the first set of contextual features that is associated with one or more targeted media content items. The instructions of the non-transitory computer-readable medium also can, when executed by the at least one computing device, cause the at least one computing device to select, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item.

BRIEF DESCRIPTION OF THE FIGURES

The accompanying drawings are incorporated herein and form a part of the specification.

FIG. 8A illustrates an example portion of segmented media content as part of labeled data, according to some examples of the present disclosure.

FIG. 8B illustrates example annotations of the labeled data of the segmented media content in FIG. 8A in an annotation structure for identifying scene breaks, according to some examples of the present disclosure.

FIG. 9A is a diagram illustrating an example system flow for categorizing segments of media content, according to some examples of the present disclosure.

FIG. 9B is a diagram illustrating another example system flow for categorizing segments of media content, according to some examples of the present disclosure.

In the drawings, like reference numbers generally indicate identical or similar elements. Additionally, generally, the left-most digit(s) of a reference number identifies the drawing in which the reference number first appears.

DETAILED DESCRIPTION

Figure 1:
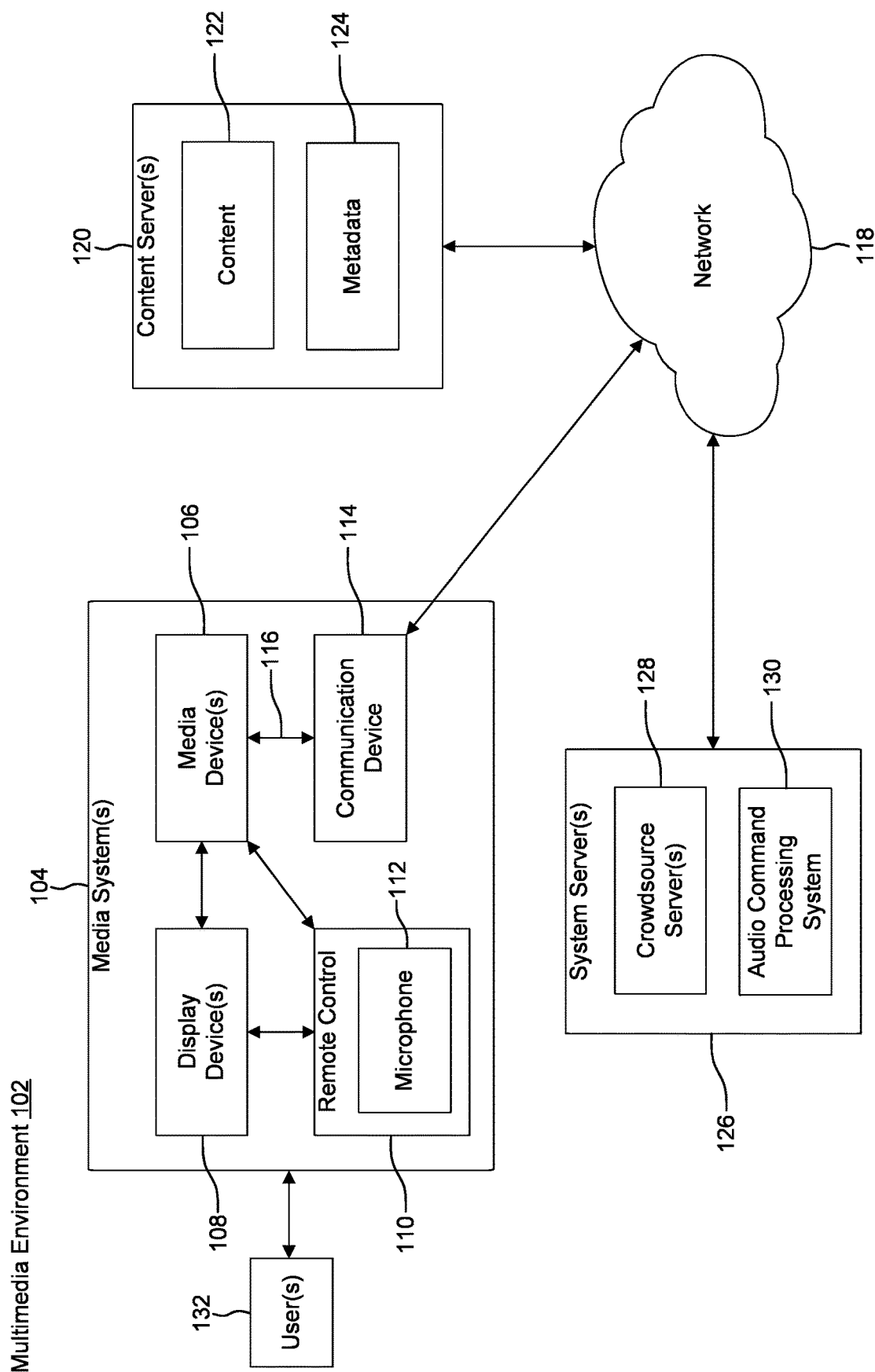
FIG. 1 illustrates a block diagram of a multimedia environment, according to some examples of the present disclosure.

Users can generally access and consume videos using client devices such as, for example and without limitation, smart phones, set-top boxes, desktop computers, laptop computers, tablet computers, televisions (TVs), IPTV receivers, media devices, monitors, projectors, smart wearable devices (e.g., smart watches, smart glasses, head-mounted displays (HMDs), etc.), appliances, and Internet-of-Things (IoT) devices, among others. The videos can include, for example, live video content broadcast by a content server(s) to the client devices, pre-recorded video content available to the client devices on-demand, streaming video content, etc. In some instances, the videos can be customized for one or more users/audiences, geographic areas, devices, markets, demographics, etc. Moreover, the videos can be adjusted to include additional content such as targeted media content. The targeted media content can include, for example, one or more frames (e.g., one or more video frames and/or still images), audio content, text content, closed-caption content, customized content, and/or any other content.

However, when adjusting media content (e.g., a video) to include targeted media content, it can be very difficult to determine where to present the targeted media content within the media content and/or what targeted media content to present with the media content in a manner that is least disruptive (or is not disruptive) to a user consuming such content. Moreover, it can also be very difficult to determine where to present the targeted media content within the media content and/or what targeted media content to present with the media content in a manner that increases the user's interest in the targeted media content, the user's recall of the targeted media content, the user's engagement with the targeted media content, and/or other performance metrics.

As further described herein, improving matches of videos and/or segments of videos (e.g., scenes in the videos, shots in the videos, and/or other segments of videos) with specific targeted media content can increase a user's interest in the targeted media content, the user's recall of the targeted media content, the user's engagement with the targeted media content, and/or other performance metrics. To better match media content and/or segments of media content with specific targeted media content, the technologies and techniques described herein can process the media content and/or portions thereof to understand the context, content, and/or other information about the media content. Such understanding can be used to select, modify, and/or synthesize targeted media content.

Provided herein are system, apparatus, device, method and/or computer program product embodiments, and/or combinations and sub-combinations thereof, for processing media content to extract features and information, such as contextual information, from the media content and/or portions thereof. In some examples, a system such as a content server(s) or a client device can determine and/or extract information (e.g., contextual information, content information and/or attributes, segment characteristics, etc.) about one or more portions of media content, and use the information to select targeted media content that can be presented together with the media content. In some aspects, the targeted media content can be modified and/or synthesized to include aspects pertaining to the contextual information obtained from the media content.

Various embodiments, examples, and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, wherein the link 116 may include wireless (such as WiFi) and/or wired connections.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources 120). Although only one content server 120 is shown in FIG. 1, in practice, the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

In some examples, the content server 120 or the media device 106 can process media content segments to extract features and information, such as contextual information, from the media content segments and classify the media content segments based on the extracted features and information. In some examples, the content server 120 or the media device 106 can determine and/or extract information (e.g., contextual information, content information and/or attributes, segment characteristics, etc.) about one or more segments of media content, and use the information to categorize the one or more segments of the media content. The content server 120 or the media device 106 can use the categorization to match targeted media content with the one or more media content segments, which can be presented at the display device 108 with or within the one or more media content segments, or with or within a break before or after the one or more media content segments. For example, the content server 120 or the media device 106 can add the targeted media content to the one or more media content segments at a certain location(s) within the one or more media content segments for presentation with and/or as part of the one or more media content segments.

To illustrate, in some aspects, the content server 120 or the media device 106 can segment media content based on identified boundaries or breaks between portions (e.g., segments) of the media content. The content server 120 or the media device 106 can adjust a segment of media content to include and/or present targeted media content matched with the segment, in addition to any media content of the segment. The targeted media content to include in or present with a segment can include content matched with the segment based on a determination of a relationship, similarity, correspondence, and/or relevance to the content in that segment. In some examples, to match targeted media content with a segment of media content, the content server 120 or the media device 106 can use an algorithm, such as a machine learning algorithm, to generate one or more embeddings encoding information about the content of the segment of the media content. The content server 120 or the media device 106 can generate the one or more embeddings based on one or more signals in one or more frames of the segment of the media content, such as a visual signal (e.g., image data), an audio signal (e.g., audio data), a closed-caption signal (e.g., text data), and/or any other signal.

The content server 120 or the media device 106 can use the one or more embeddings to determine a category for the segment of the media content that describes, represents, summarizes, classifies, and/or identifies the segment of the media content, the content of the segment of the media content, a context(s) of the content of the segment of the media content, and/or one or more characteristics of the segment of the media content and/or the content of the segment of the media content. In some cases, targeted media content available to the content server 120 or the media device 106 can include one or more respective categories determined for and/or assigned to the targeted media content. In other cases, the targeted media content available to the content server 120 or the media device 106 may not have an associated category determined for and/or assigned to the target media content, in which case the content server 120 or the media device 106 can similarly generate embeddings for the targeted media content and use such embeddings to determine and/or assign one or more respective categories for the targeted media content. The content server 120 or the media device 106 can use the determined category for the segment of the media content and the respective categories of different targeted media content to match the segment of the media content with a particular targeted media content item(s).

The content server 120 or the media device 106 can include the particular targeted media content item(s) with the segment of the media content for presentation with or within the segment of the media content. As a result, the content server 120 or the media device 106 can, among other things, better match media content segments with targeted media content, which can be presented with or within the matched media content segments, and thereby increase the relevance, similarity, relationship, and/or correspondence of the targeted media content and the media content segments. This way, the content server 120 or the media device 106 can increase an interest of the user 132 in the targeted media content, a recall of the targeted media content by the user 132, an engagement of the user 132 with the targeted media content, and/or other performance metrics.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126.

The audio command processing system 130 may operate to process and analyze the received audio data to recognize the user 132's verbal command. The audio command processing system 130 may then forward the verbal command back to the media device 106 for processing.

Figure 2:
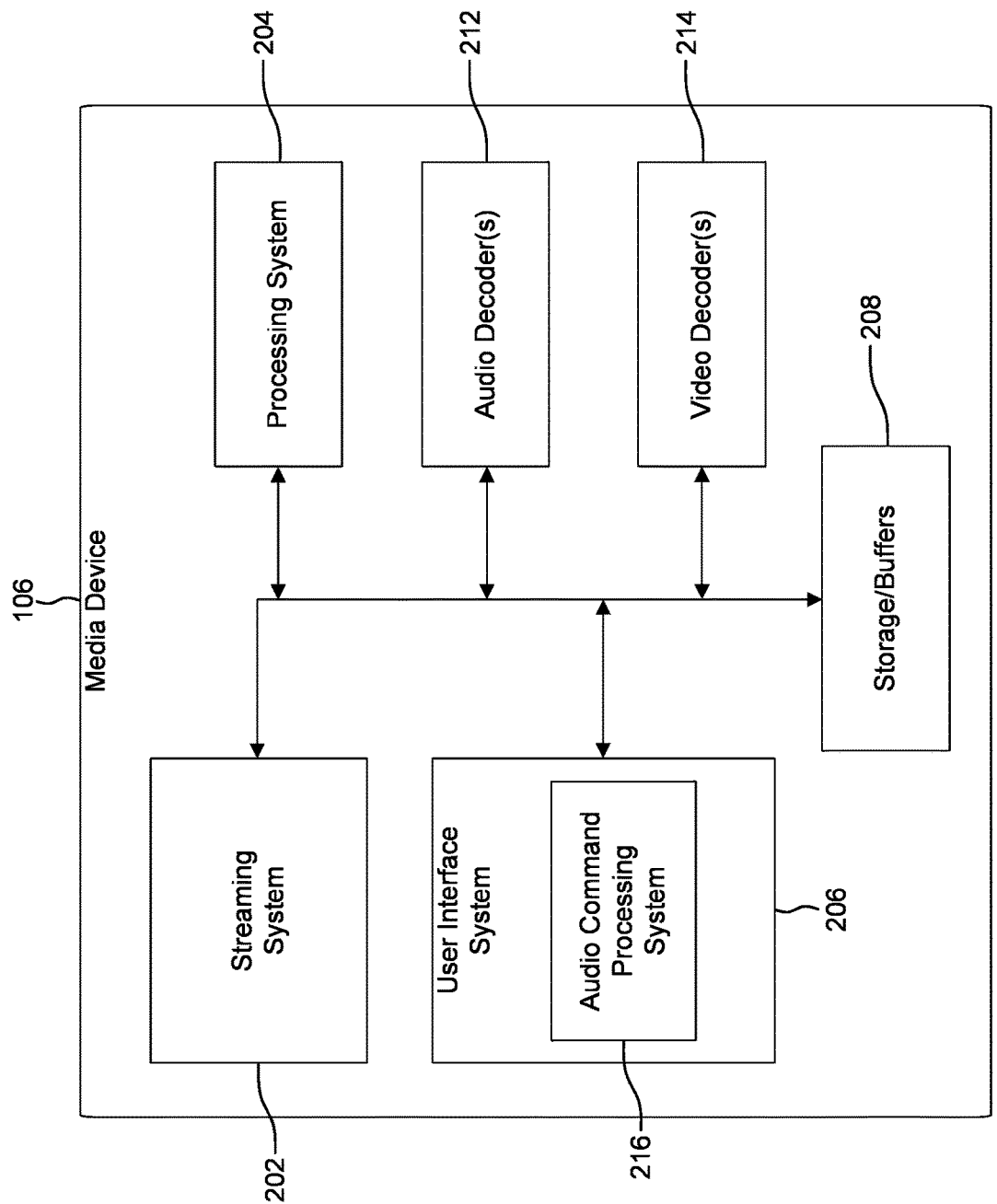
FIG. 2 illustrates a block diagram of a streaming media device, according to some examples of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Contextual Understanding of Media Content to Generate Targeted Media Content

Referring to FIG. 1, the media devices 106 may exist in thousands or millions of media systems 104. Accordingly, the media devices 106 may lend themselves to crowdsourcing embodiments. In some examples, one or crowdsource servers 128 in the system servers 126 operate to process video segments to extract features and information, such as contextual information, from the video segments and classify the video segments based on the extracted features and information.

For example, the crowdsource server(s) 128 can determine and/or extract information (e.g., contextual information, content information and/or attributes, segment characteristics, etc.) about one or more segments of a video, and use the information to categorize the one or more segments of the video. The crowdsource server(s) 128 can use the categorization to match targeted media content with the one or more video segments, which can be presented at a display device, such as the display device 108, with or within the one or more video segments, or with or within a break before or after the one or more video segments. For example, the crowdsource server(s) 128 can add the targeted media content to the one or more video segments at a certain location(s) within the one or more video segments for presentation with and/or as part of the one or more video segments.

In some aspects, the crowdsource server(s) 128 can segment a video based on identified boundaries or breaks between portions (e.g., segments) of the video. The crowdsource server(s) 128 can adjust a segment of a video to include and/or present targeted media content matched with the segment, in addition to any video frames of the segment. The targeted media content to include in or present with a segment can include media content matched with the segment based on a determination of a relationship, similarity, correspondence, and/or relevance to the content in the video frame(s) of that segment. In some examples, to match targeted media content with a segment of a video, the crowdsource server(s) 128 can use an algorithm, such as a machine learning algorithm, to generate one or more embeddings encoding information about the content of the segment of the video. The crowdsource server(s) 128 can generate the one or more embeddings based on one or more signals in one or more frames of the segment of the video, such as a visual signal (e.g., image data), an audio signal (e.g., audio data), a closed-caption signal (e.g., text data), and/or any other signal.

The crowdsource server(s) 128 can use the one or more embeddings to determine a category for the segment of the video that describes, represents, summarizes, classifies, and/or identifies the segment of the video, the content of the segment of the video, a context(s) of the content of the segment of the video, and/or one or more characteristics of the segment of the video and/or the content of the segment of the video. In some cases, targeted media content available to the crowdsource server(s) 128 can include one or more respective categories determined for and/or assigned to the targeted media content. In other cases, the targeted media content may not have an associated category determined for and/or assigned to the target media content, in which case the crowdsource server(s) 128 can similarly generate embeddings for the targeted media content and use such embeddings to determine and/or assign one or more respective categories for the targeted media content. The crowdsource server(s) 128 can use the determined category for the segment of the video and the respective categories of different targeted media content to match the segment of the video with a particular targeted media content item(s).

The crowdsource server(s) 128 can include the particular targeted media content item(s) with the segment of the video for presentation with or within the segment of the video.

Thus, the crowdsource server(s) 128 can, among other things, better match video segments with targeted media content, which can be presented with or within the matched video segments, and thereby increase the relevance, similarity, relationship, and/or correspondence of the targeted media content and the video segments. This way, the crowdsource server(s) 128 can increase an interest of the user (e.g., user 132) in the targeted media content, a recall of the targeted media content by the user, an engagement of the user with the targeted media content, and/or other performance metrics.

The disclosure now continues with a further discussion of identifying scene breaks/boundaries in media content.

Figure 3:
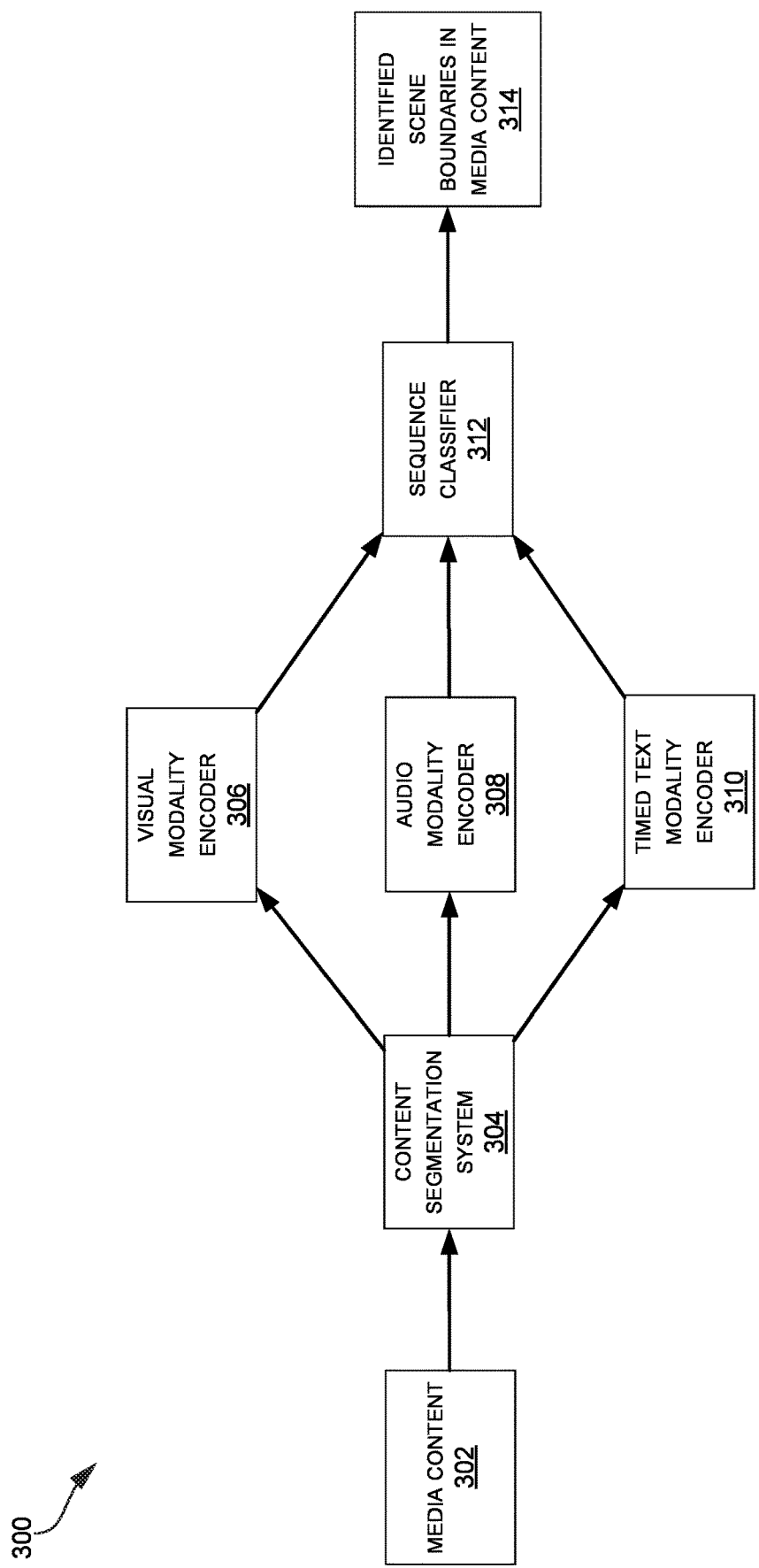
FIG. 3 is a system for identifying scene boundaries for media content based on feature representation across different media modalities, according to some examples of the present disclosure.

FIG. 3 is a system 300 for identifying scene boundaries for media content based on feature representation across different media modalities, according to some examples of the presented disclosure. The system 300 includes accessed media content 302, a content segmentation system 304, a visual modality encoder 306, an audio modality encoder 308, a timed text modality encoder 310, and a sequence classifier 312. While three encoders are shown in the system 300, a system that implements the technology described herein can have more or fewer encoders. For example, in some cases, the system 300 can additionally or alternatively implement an encoder(s) that accounts for a genre of the media content 302, a general description of the media content 302, a synopsis of the media content 302, any other aspects of the media content 302, or a combination thereof. The system 300 functions to identify scene boundaries in the accessed media content 302 to output media content with identified scene boundaries 314.

The various components of the system 300 can be implemented at applicable places in the multimedia environment 102 shown in FIG. 1. The accessed media content 302 can reside at the content servers 120. Further, the accessed media content 302 can reside at the media system 104 as part of reproducing the content 302 for the user 132. The content segmentation system 304, the visual modality encoder 306, the audio modality encoder 308, the timed text modality encoder 310, the sequence classifier 312, or a combination thereof, can reside at the media systems 104, the system servers 126, the content servers 120, or a combination thereof.

The content segmentation system 304 functions to access the media content 302 and segment the media content 302 into different units to form a sequence of units. A unit (also referred to as a segment), as used herein, can include an applicable section that media content can be divided into as part of a sequence of sections that ultimately form the media content. Specifically, a unit can include frames of media content, shots in media content, scenes in media content, subframes of media content, and spatial regions within frames of media content. Units of media content in a sequence of units can be separated by unit breaks/boundaries. As follows, unit breaks can actually define the units. For example, breaks between different frames can define the frames in a sequence of frames. In another example, breaks between shots can define the shots in a sequence of shots. In yet another example, breaks between scenes can define the scenes in a sequence of scenes.

Figure 4:
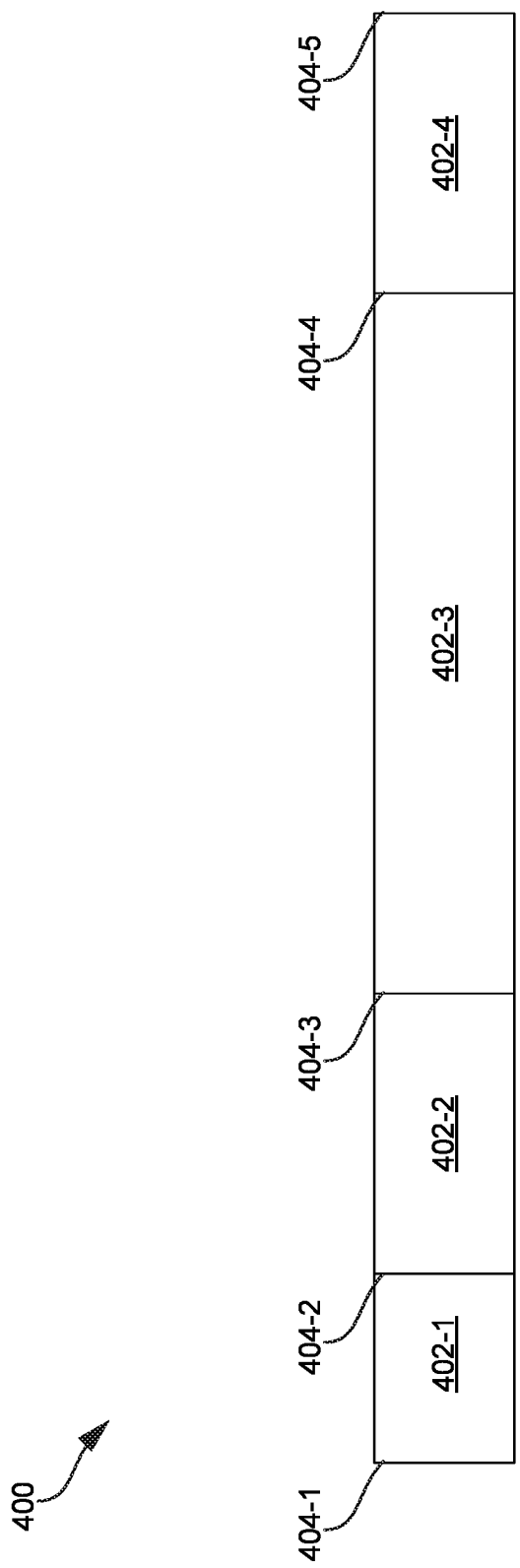
FIG. 4 illustrates an example portion of media content segmented into a plurality of shots, according to some examples of the present disclosure.

FIG. 4 illustrates an example portion of media content 400 segmented into a plurality of shots, according to some examples of the present disclosure. The portion of media content 400 includes a first shot 402-1, a second shot 402-2, a third shot 402-3, and a fourth shot 402-4, collectively referred to as "shots 402." The first shot 402-1 is defined by a first shot break 404-1 and a second shot break 404-1. The second shot 402-2 is defined by the second shot break 404-1 and a third shot break 404-3. The third shot 402-3 is defined by the third shot break 404-3 and a fourth shot break 404-4. The fourth shot 402-4 is defined by the fourth shot break 404-4 and a fifth shot break 404-5. The shot breaks are collectively referred to as "shot breaks 404."

A shot can include a contiguous sequence of frames that are captured from or generated by an applicable source. For example, a shot can be a continuous sequence of frames in media content that is generated by a computer, e.g. an animation. In another example, a shot can be a continuous sequence of frames in media content that is captured by a sensor, e.g., a camera, for a specific amount of time. More specifically, a shot can include a contiguous sequence of frames that are captured from a sensor in an uninterrupted manner. For example, a first shot can include a view of a speaker as the speaker makes sounds. Further in the example, a second shot after the first shot can include a different view of a different speaker that is switched to after the first shot.

The portion of media content 400 can be a scene that is a subset of total media content. For example, the portion of media content 400 can be a scene in an episode of a television show. The scene can be defined by scene breaks. Scene breaks, as used herein, can be unit breaks, e.g., shot breaks or frame breaks. Specifically, the scene of the portion of media content 400 can be defined by the first shot break 404-1 and the fifth shot break 404-5. As a scene comprises a plurality of units, e.g., shots, the total number of scene breaks in media content is a subset of the total number of unit breaks, e.g., shot breaks, in the media content.

Returning back to the system 300 shown in FIG. 3, the content segmentation system 304 can use an applicable technique for segmenting the media content 302 into units. Specifically, the content segmentation system 304 can use an applicable machine learning-based technique for segmenting the media content 302 into units. More specifically, the content segmentation system 304 can use a dilated 3D convolutional neural network to segment the media content 302 into units. An F1 score of 0.9603 can be achieved by the content segmentation system 304 in segmenting the media content 302 into units. Further, the content segmentation system 304 can segment the media content 302 into units based on a set time frame or period. For example, the content segmentation system 304 can define five second units in the media content 302.

The visual modality encoder 306, the audio modality encoder 308, and the timed text modality encoder 310 function to access the segmented media content that is generated in part by the content segmentation system 304. Further, the visual modality encoder 306, the audio modality encoder 308, and the timed text modality encoder 310 function to encode features of the segmented media content into an embedding space. The embedding space can exist across different media modalities. Specifically, each of the visual modality encoder 306, the audio modality encoder 308, and the timed text modality encoder 310 can encode features in different media modalities to create an embedding space across the different media modalities. As discussed previously, the system 300 can include additional applicable encoders. For example, the system 300 can implement an encoder that accounts for genre, general description, a synopsis of the media content 302, or a combination thereof. Specifically, system 300 can implement an encoder that utilizes a large language model to identify characteristics of media content and then encodes features of the media content based on the identified characteristics.

The visual modality encoder 306 can encode features in a visual modality of the media content 302. Specifically, the visual modality encoder 306 can encode features of images and video of the media content 302. The audio modality encoder 308 can encode features in an audio modality of the media content 302. For example, the audio modality encoder can encode features of an audio signal that accompanies video of the media content 302. The timed text modality encoder 310 can encode features in a timed text modality of the media content 302. Timed text modality features include features that are associated with annotations and captions of the media content 302. Features encoded by the timed text modality encoder 310 can include captions for dialog in the media content 302, descriptions of nonverbal sounds in the media content 302, actions that are performed by characters in the media content 302, and descriptions of scenes in the media content 302. For example, features encoded by the timed text modality encoder 310 can be represented in Web Video Text Tracks Formation ("webvtt") files of the media content 302.

Further, the visual modality encoder 306, the audio modality encoder 308, and the timed text modality encoder 310 can encode features of the media content 302 based on the units into which the media content 302 is segmented by the content segmentation system 304. Specifically, the visual modality encoder 306, the audio modality encoder 308, and the timed text modality encoder 310 can encode features together on a unit-by-unit basis. For example, a shot can be encoded as a vector in the embedding space. In another example, a shot can be encoded on a frame level for the entire shot as a matrix in the embedding space. As the embedding space includes features across different modalities, a representation of a unit in the embedding space can be a multimedia representation. While only the visual modality encoder 306, the audio modality encoder 308, and the timed text modality encoder 310 are in the example system 300 shown in FIG. 3, the system 300 can include additional encoders that encode in different applicable modalities than the audio modality, the visual modality, and the timed text modality.

The visual modality encoder 306, the audio modality encoder 308, and the timed text modality encoder 310 can sample units of the segmented media content to encode features into the embedding space. The segmented media content can be sampled at an applicable rate and granularity level in encoding features into the embedding space. For example, every 10 frames of the segmented media content can be sampled to encode features into the embedding space. In another example, a specific region in frames of the segmented media content can be sampled to encode features into the embedding space. Alternatively, every frame in the segmented media content can be used to encode features into the embedding space.

Additionally, the visual modality encoder 306, the audio modality encoder 308, and the timed text modality encoder 310 can use an applicable machine learning-based technique to encode features into the embedding space. Specifically, an applicable machine learning technique can be used to create lower dimensional, e.g., vector or matrix representations or embeddings, of features in units of the media content 302. More specifically, the visual modality encoder 306, the audio modality encoder 308, and the timed text modality encoder 310 can be trained using contrastive learning, e.g., contrastive self-supervised learning, to encode features into the embedding space. Contrastive learning can group together or dissociate features that are mapped into the embedding space based on similarity. In being trained through contrastive learning, the visual modality encoder 306, the audio modality encoder 308, and the timed text modality encoder 310 can pull together or otherwise map similar features together in the embedding space. Further in applying contrastive learning, the visual modality encoder 306, the audio modality encoder 308, and the timed text modality encoder 310 can push apart or otherwise map dissimilar features away from each other in the embedding space. Specifically, the visual modality encoder 306, the audio modality encoder 308, and the timed text modality encoder 310 can learn to associate similar instances (query-key pairs) and differentiate them from dissimilar instances. Further, the visual modality encoder 306, the audio modality encoder 308, and the timed text modality encoder 310 can learn to pull the representations of positive query-key pairs closer together while pushing apart the representations of negative pairs.

Equation 1 is a representation of a contrastive learning trained model that can be implemented by the visual modality encoder 306, the audio modality encoder 308, and the timed text modality encoder 310.

$$\mathcal{L}_q = -\log \frac{\exp(f(q|\theta_q) \cdot g(k_0|\theta_k)/\tau)}{\sum_{i=0}^{K} \exp(f(q|\theta_q) \cdot g(k_i|\theta_k)/\tau)} \quad \text{Equation 1}$$

By training the encoders through contrastive learning, the encoders can learn to capture meaningful similarities and differences between instances, thereby allowing the encoders to generalize well for classification tasks. Further, this can enhance the discriminative power of the learned features, leading to improved performance in classification tasks by effectively separating different classes in the embedding space.

The sequence classifier 312 functions to identify whether a unit boundary between units is a scene boundary or not a scene boundary. The sequence classifier 312 can identify whether a unit boundary between units is a scene boundary based on the multimedia representations of the units in the embedding space. Specifically, the sequence classifier 312 can classify a unit boundary between units as a scene boundary based on degrees of similarity between the multimedia representations of the units in the embedding space. For example, if units are mapped close together in the embedding space, then the sequence classifier 312 can classify a unit boundary between the units as a non-scene break, otherwise a normal unit boundary. In another example, if units are mapped far away from each other in the embedding space, then the sequence classifier 312 can classify a unit boundary between the units as a scene break.

The sequence classifier 312 can implement one or more rules in identifying whether a unit boundary between units is a scene boundary based on multimedia representations of the units in the embedding space. Rules that are implemented by the sequence classifier 312 can include applicable rules for identifying whether a unit boundary between units is a scene boundary based on multimedia representations of the units in the embedding space. Rules can define variable classification logic, that as will be described in greater detail later, can change in applying classification logic to determine whether a unit boundary is a scene boundary. For example, a rule can specify whether to interrupt a sequence of units corresponding to dialogue and whether to interrupt the dialogue can be selected in defining the variable classification logic. Rules can be defined based on characteristics of media content. For example, a rule can specify to not interrupt sequences of units that are part of suspenseful content in a thriller movie. Rules that are implemented by the sequence classifier 312 can be set by an applicable authority related to media content. Specifically, rules that are implemented by the sequence classifier 312 can be set by a director of media content.

In implementing rules through the sequence classifier 312, the rules can be used in training the sequence classifier 312. Specifically, the rules can be selected from a plurality of rules and applied in training the sequence classifier 312 to identify whether a unit boundary between units is a scene boundary. The rules for determining scene breaks can be selected and applied in training the sequence classifier 312 based on characteristics of the media content 302. Specifically, the sequence classifier 312 can be trained to determine scene breaks based on a type of content of the media content 302. For example, rules can be selected and applied to train the sequence classifier 312 to recognize scene breaks in an action movie. As follows, if the media content 302 is an action movie, then the sequence classifier 312 can be specifically applied to recognize scene breaks in the media content 302 based on the media content 302 being an action movie.

The sequence classifier 312 generates media content with identified scene boundaries 314. The media content with identified scene boundaries 314 can be used in identifying cue points for inserting targeted media content. Identified scene breaks can be labeled as cue points for targeted media content insertion according to the techniques that will be described in greater detail later. Cue points can be set based on specific rules. Such rules can be set based on an applicable authority for controlling targeted media insertion in media content. For example, rules can be set by a director and specify preferences of the director in controlling targeted media insertion. In another example, rules can be set by an owner of content and specify not putting cue points in an introduction section, the concluding section, and the recap section of the content.

The sequence classifier 312 can also identify other applicable cue points in the media content 302. The sequence classifier can identify cue points including a start of a title sequence, an end of the title sequence, a start of closing credits, an end of the closing credits, or a combination thereof. In doing so, the sequence classifier 312 can be trained on labeled data, that is labeled in the same or a similar manner as data that is labeled for scene breaks.

Figure 5:
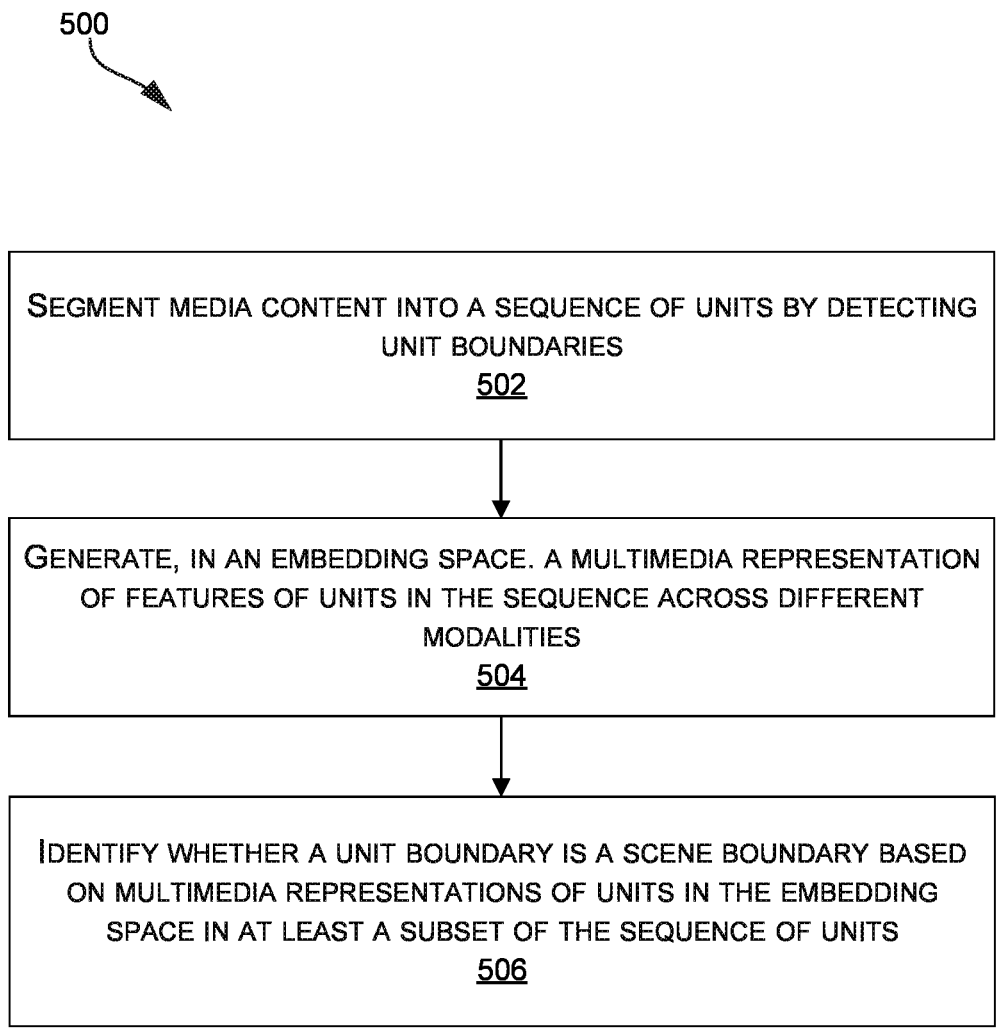
FIG. 5 is a flowchart for a method for identifying scene breaks in media content based on multimedia representations of features of the media content across different modalities, according to some examples of the present disclosure.

The disclosure now continues with a further discussion of techniques for identifying scene breaks in media content. FIG. 5 is a flowchart for a method 500 for identifying scene breaks in media content based on multimedia representations of features of the media content across different modalities, according to some examples of the presented disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art. Method 500 shall be described with reference to FIG. 3. However, method 500 is not limited to that example.

In step 502, the content segmentation system 304 segments media content into a sequence of units by detecting unit boundaries in the media content. The media content can be segmented into a sequence of units through application of one or more machine learning models. Specifically, the media content can be segmented into a sequence of units by identifying breaks between units according to changing characteristics of the media content. Characteristics of the media content for identifying unit breaks can include changes in camera angles or cameras in the media content, changes in lighting characteristics in the media content, changes in speakers or action performers in the media content, and changes in settings in the media content. For example, shot boundaries between two shots can be detected based on a change in speakers in the media content. Further unit boundaries can be a specific, or otherwise set, time frame or period that is applied to media content in order to define the unit boundaries, e.g. regardless of characteristics of the media content. For example, the content segmentation system 304 can identify or set a unit boundary in media content every three seconds. More specifically, a unit boundary can be defined based on an applicable unit of time that is capable of being processed by the system 300.

In step 504, a combination of the visual modality encoder 306, the audio modality encoder 308, and the timed text modality encoder 310 generate, in an embedding space, a multimedia representation of features of units in the sequence of units across different modalities. The visual modality encoder 306 can encode features of a visual modality into the embedding space, the audio modality encoder 308 can encode features of an audio modality into the embedding space, and the timed text modality encoder 310 can encode features of a timed text modality into the embedding space.

The multimedia representation can be generated based on contrastive learning of features to train the visual modality encoder 306, the audio modality encoder 308, and the timed text modality encoder 310. In generating the multimedia representation based on contrastive learning, features of units that are in the same scene can have similar representations in the embedding space. Specifically, it can be assumed that units that are close to each other in time are part of the same narrative and are candidates to be positive query/key pairs for contrastive learning. As follows, other units from the same media content or from different media content are considered negative query/key pairs. In various examples, the visual modality encoder 306, the audio modality encoder 308, and the timed text modality encoder 310 can identify, through contrastive learning, positive key/pairs from 65,000 negative key/pairs. The visual modality encoder 306, the audio modality encoder 308, and the timed text modality encoder 310 can be trained on more than ten million units.

In step 506, the sequence classifier 312 identifies whether a unit boundary of the unit boundaries is a scene boundary based on multimedia representations of units in the embedding space in at least a subset of the sequence of units. The sequence classifier 312 can apply rules to determine whether unit breaks between units are scene breaks based on multimedia representations of the units in the embedding space. More specifically, the sequence classifier 312 can apply rules to determine whether a unit break that separates a first unit and a second unit is a scene break, based on multimedia representations of the first unit and the second unit in the embedding space.

Figure 6:
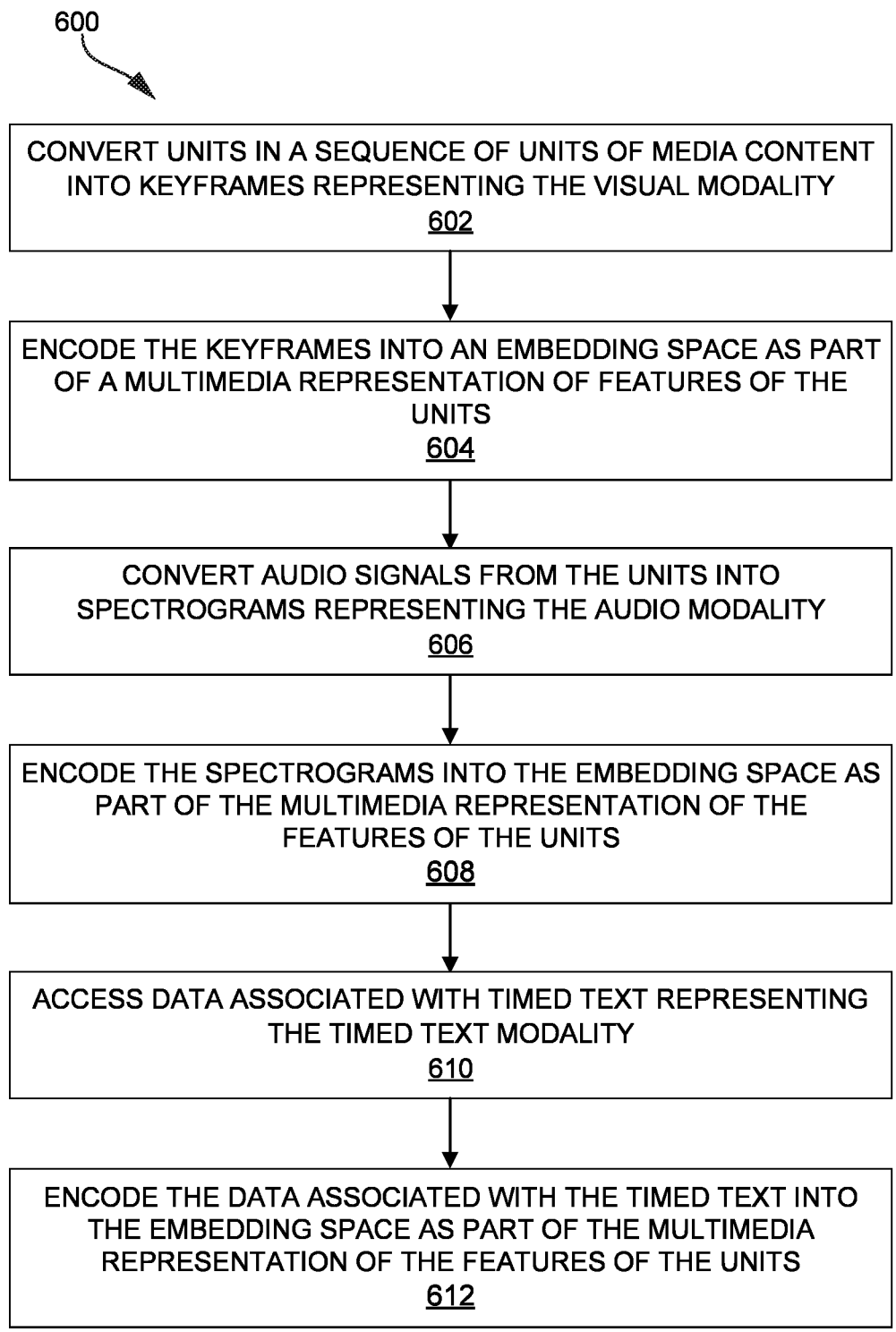
FIG. 6 is a flowchart for a method for encoding multimedia representations of features of media content in an embedding space across different modalities, according to some examples of the present disclosure.

FIG. 6 is a flowchart for a method 600 for encoding multimedia representations of features of media content in an embedding space across different modalities, according to some examples of the presented disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to FIG. 3. However, method 600 is not limited to that example.

In step 602, the visual modality encoder 306 converts units in a sequence of units of media content into keyframes representing the visual modality. Keyframes can include the starting and ending points of a smooth transition in a unit of media content. By capturing keyframes representing the visual modality, both static visual elements from the unit of media content as well as action from the media content can be represented as features of the unit of media content. As a shot includes multiple frames and keyframes are a subset of the total frames in the shot, by converting units into keyframes and encoding based on such keyframes, resources, e.g., computational resources, can be conserved in comparison to the scenario where every frame is processed and encoded.

As an alternative or supplement to extracting keyframes from the units in a sequence of units at step 602, the visual modality encoder 306 can access already extracted frames of the units in the sequence of units. Frames can be extracted as part of a trick mode or trick play during which a subset of the total frames of the units are displayed during operations on the media unit. Such operations can include a fast-forward operation, a rewind operation, a pause operation, or a combination thereof during which the subset of the total frames can be displayed to mimic visual feedback given during the fast-forward operation, the rewind operation, or the pause operation. In turn, such extracted frames can be used without processing and encoding the total number of frames in the media unit.

In step 604, the visual modality encoder 306 encodes the keyframes into an embedding space as part of a multimedia representation of features of the unit. The keyframes can be encoded for a unit as an n*3 channel image where n is the number of key frames. Accordingly, time can be encoded in the channel dimension. The keyframes can be encoded using an applicable model. For example, a deep convolutional neural network can be modified to take n*3 channels rather than 3 channels.

Instead of or supplemental to encoding the keyframes at step 604, the visual modality encoder 306 can encode already extracted frames of the units in the sequence of units. The visual modality encoder 306 can encode the frames that are extracted and displayed as part of a trick mode. Such frames can be encoded similar to the keyframes, such as through an n*3 channel image.

In step 606, the audio modality encoder 308 converts audio signals from the units into spectrograms representing the audio modality. The audio signals can be sampled from the units for an applicable duration. For example, audio signals can be sampled for ten seconds of a shot. As follows, spectrograms can be created from the audio signals, e.g., sampled audio signals, using an applicable machine learning technique, such as a vision transformer. A spectrogram into which an audio signal is converted can comprise visual representations of the spectrum of frequencies of the signal as it varies with time to create a standard spectrogram and a learned spectrogram.

In step 608, the audio modality encoder 308 encodes the spectrograms into the embedding space as part of the multimedia representation of the features of the unit. This can be performed similarly to the encoding of the keyframes in the visual modality into the embedding space at step 604. With respect to the creation of two spectrogram for an audio signal, the two spectrograms can be concatenated and fed through an applicable model, e.g., a convolutional neural network, to create a representation of the spectrograms in the embedding space.

In step 610, the timed text modality encoder 310 accesses data associated with timed text representing the timed text modality. The data associated with timed text can include features of the units of the media content that are webvtt files of the media content. The data associated with timed text can be maintained by a provider of the media content.

In step 612, the timed text modality encoder 310 encodes the data associated with the timed text into the embedding space as part of the multimedia representation of the features of the units. The timed text data can be encoded into the embedding space through an applicable technique for encoding such data based on the data type of the timed text data. For example, the timed text modality encoder 310 can use a text encoder model for encoding dialogue included in the data associated with the timed text into the embedding space.

Figure 7:
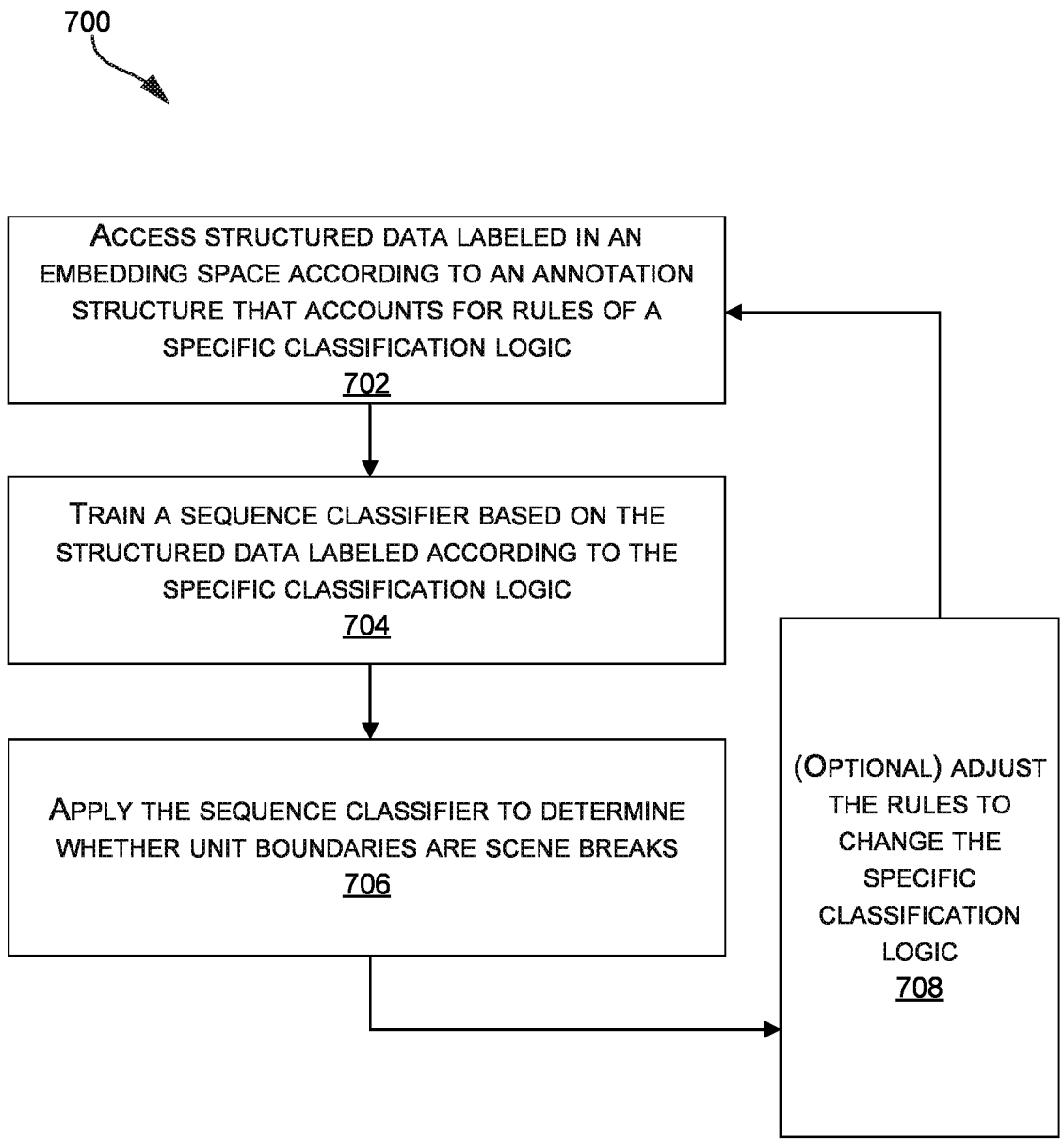
FIG. 7 is a flowchart for a method for training and updating a sequence classifier for identifying scene breaks in media content, according to some examples of the present disclosure.

The disclosure now continues with a discussion of training and applying a sequence classifier for identifying scene breaks. FIG. 7 is a flowchart for a method 700 for training and updating a sequence classifier for identifying scene breaks in media content, according to some examples of the presented disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art. Method 700 shall be described with reference to FIG. 3. However, method 700 is not limited to that example.

In step 702, structured data labeled in an embedding space according to an annotation structure that accounts for rules of a specific classification logic of a variable classification logic is accessed. The structured data can be labeled in an embedding space of a multimedia representation of features of media content across different modalities. Specifically, the structured data can be labeled in an embedding space that includes representations of features of an audio modality, a visual modality, and a timed text modality of media content. The structured data can be labeled through an applicable technique. The structured data can be labeled through a human. For example, a human can manually indicate whether a break is a scene break and other applicable characteristics of breaks in annotated media content.

The structured data can be labeled according to an annotation structure that is specific to identifying scene breaks. The annotation structure can indicate whether a unit break in the labeled data is a scene break or not a scene break. Further the annotation structure can include data that accounts for rules of a variable classification logic. The annotation structure can allow for the labeling of data to implement specific rules in forming a set classification logic of a variable classification logic. For example, a classification logic can be defined by rules that specify to not interrupt dialogue and to not interrupt calm moments in media content in labeling scene breaks. As a result, data in the annotation structure that is labeled as a scene break can also be labeled as not interrupting dialogue and not interrupting calm moments. Conversely, data in the annotation structure that is labeled as not a scene break can be labeled as either or both interrupting scene dialogue and interrupting calm moments.

The classification logic can be variable to form different classification logics by adjusting how the data is labeled in implementing the rules. The rules that define the classification logic can be adjusted to defined different classification logics by adjusting how the data is labeled in implementing the rules. For example, a classification logic can be defined by rules that specify to not interrupt dialogue but to interrupt calm moments in media content in labeling scene breaks. As a result, data in the annotation structure that is labeled as a scene break can also be labeled as not interrupting dialogue and interrupting calm moments. Conversely, data in the annotation structure that is labeled as not a scene break can be labeled as either or both interrupting scene dialogue and not interrupting calm moments.

Rules can be defined by applicable characteristics of unit breaks in media content. Rules can be defined by characteristics of units breaks in media content in relation to defining scene breaks in the media content. Examples of rules that can be implemented through the annotation structure include whether to interrupt dialogue, whether to interrupt a specific scene, whether to interrupt a specific type of scene, a specific content type of the media content, and other applicable characteristics and rules associated with such characteristics of media content. Rules can be defined by an applicable authority related to media content. For example, rules can be defined by a director of media content and specify to not interrupt certain types of content within the media content.

FIG. 8A illustrates an example portion of segmented media content as part of labeled data, according to some examples of the presented disclosure. FIG. 8B illustrates annotations of the labeled data of the segmented media content in FIG. 8A in an annotation structure for identifying scene breaks, according to some examples of the presented disclosure. As shown in FIG. 8A, the segmented media content includes three shots separated by breaks between the shots. In FIG. 8B, the annotation structure for the labeled data includes whether the shot break is a dialog break, whether the shot break is a scene break, and whether the shot break is an audio break. In the annotation structure the shot break between shots 1 and 2 is labeled as a scene break, an audio break, but not a dialog break. Further, the shot breaks between shots 2 and 3 and 3 and the next shot are labeled as scene breaks, audio breaks, and dialog breaks. This annotation can implement the rules that a scene break should not break audio but can break dialogue in media content.

Returning back to the method 700 shown in FIG. 7, in step 704, the sequence classifier 312 is trained based on the structured data labeled according to the specific classification logic. In training the sequence classifier 312 based on the structured data that is labeled according to the specific classification logic, the sequence classifier 312 can encode the rules that define the specific classification logic. As follows, the sequence classifier 312 can be identified as a rules-based classifier.

In step 706, the sequence classifier 312 is applied to determine whether the unit boundaries are scene breaks. In particular, the sequence classifier 312 can be applied to specific media content to determine whether unit boundaries in the specific media content are scene breaks. As follows, by applying the rules that define the specific classification logic of the structured data that was used to train the sequence classifier 312, the sequence classifier 312 can implement such rules.

Feedback of how the sequence classifier 312 performed in classifying scene breaks can be generated. The feedback can be generated based on targeted media content performance of targeted media content that is inserted based on the scene breaks identified by the sequence classifier 312. Further, the feedback can be generated based on audience attention in consuming media content with scene breaks that are identified by the sequence classifier 312. Audience attention can be measured through an applicable technique, such as whether audience members fast forward through a specific portion of media content in relation to an identified scene break or whether audience members leave the room in relation to an identified scene break.

In optional step 708, the rules are adjusted to set a new specific classification logic. Specifically, the rules can be adjusted based on the measured performance of scene breaks that were identified by the sequence classifier 312 at step 706. For example, if a scene break is not performing well, then rules that were implemented by the sequence classifier 312 through the training of the sequence classifier 312 can be modified. As follows, the method 700 can return back to step 702, where data that is labeled according to an annotation structure that accounts for the changing rules of the new classification logic can be accessed. The same structured data or different structured data can be labeled or relabeled based on the new classification logic. For example, if a rule is changed from not interrupting suspenseful content to interrupting suspenseful content, then the previously labeled data can be changed to reflect a scene break occurring when there is not a break in suspense. As follows, the sequence classifier 312 can be retrained based on this newly labeled structured data at step 704 and applied at step 706. This loop in the method 700 can repeat itself an applicable number of times.

The technology described herein with respect to identifying scene breaks in media content can be performed on live pre-recorded content. For example, the technology described herein can be applied to media transmitted to users through free ad-supported streaming TV (herein "FAST") channels. Specifically, the technology described herein can be applied to pre-recorded content that is transmitted to users through a media system, e.g., media systems 104. More specifically, the technology can be applied as pre-recorded content transmission is delayed at the content servers 120, the system servers 126, the media systems 104, or a combination thereof. Further, the technology described herein with respect to identifying scene breaks can be applied to offline content before it is transmitted for consumption by users.

FIG. 9A is a diagram illustrating an example system flow 900 for categorizing segments of media content, according to some examples of the present disclosure. In some examples, the system flow 900 can be used to determine and/or extract information (e.g., contextual information, content information and/or attributes, segment characteristics, etc.) about one or more segments (e.g., segment 904A, segment 904B, segment 904N) of media content (e.g., media content 902), and use the information to categorize the one or more segments of the media content. The categorization can be used to match targeted media content with the one or more segments of media content, which can be presented with/within the one or more segments or with/within a break before or after the one or more segments. For example, the targeted media content can be added to (e.g., included in, embedded in, inserted in, etc.) the one or more segments of media content at a certain location(s) within the one or more segments for presentation with and/or as part of the one or more segments.

The information about the one or more segments can include, for example and without limitation, contextual information, a type and/or genre of content in the one or more segments, a type of scene (e.g., a scenic scene, a sports scene, a scene with dialogue, a slow or fast scene, an indoors scene, an outdoors scene, a city scene, a rural scene, a holiday scene, a vacation scene, a scene with certain weather, a scene with a certain amount of lighting, and/or any other scene) in the one or more segments, a background and/or setting depicted in the one or more segments, any activity and/or events in the one or more segments, an actor(s) included in the one or more segments (and/or associated demographics of the one or more actors), a mood and/or sentiment associated with the one or more segments, a type of audio in the one or more segments (e.g., dialogue, music, noise, certain sounds, etc.) or lack thereof, any objects included in the one or more segments (e.g., a product and/or brand, a device, a structure, a tool, a toy, a vehicle, etc.), noise levels in the one or more segments, a landmark and/or architecture depicted or described in the one or more segments, a message conveyed in the one or more segments, a type of encoding associated with the one or more segments, a time and/or date associated with content of the one or more segments, one or more characteristics of content in the one or more segments, and/or any other information associated with the one or more segments.

A segment from the one or more segments can include media content associated with the one or more segments and/or one or more keyframes associated with the one or more segments. The segment can be determined using one or more segmentation techniques and/or segment boundary/break (e.g., scene boundary/break, shot boundary/break, etc.) selection techniques, such as the segment (e.g., scene, shot, etc.) break selection techniques described herein. For example, in some cases, a segment can include one or more video frames or keyframes (which can include other content such as audio, closed captions, etc.) corresponding to a scene depicted in the one or more video frames or keyframes. As another example, a segment can include one or more video frames or keyframes (which can include other content such as audio, closed captions, etc.) corresponding to a shot. A shot can include a sequence of frames captured from or generated by an applicable source. For example, a shot can include a sequence of frames in media content that is generated by a computer (e.g., an animation or computer-generated video, etc.). In some cases, a shot can include a series of frames that runs for an uninterrupted period of time. For example, a shot can include the moment that a video camera starts recording until the video camera stops recording, and/or a continuous footage or sequence between two edits or cuts in a video/film. As yet another example, a segment can include one or more video frames or keyframes (which can include other content such as audio, closed captions, etc.) preceding (or leading to) a unit break, such as a scene break, a shot break, etc.

In FIG. 9, a neural network 908 can process one or more media content items 906 of a segment 904B of media content 902 to generate embeddings 910A, 910B, 910N that represent and/or describe the one or more media content items 906 associated with the segment 904B, a content of the one or more media content items 906 associated with the segment 904B, one or more features in the one or more media content items 906 associated with the segment 904B, and/or a context of any content in the one or more media content items 906 associated with the segment 904B. The media content 902 can include video content (e.g., one or more video frames), audio content, text content (e.g., closed captions), and/or any other media content available for presentation (e.g., live or on-demand) at a device, such as media device(s) 106 illustrated in FIG. 1. For example, the media content 902 can include television content (e.g., a television show or program), a movie, a podcast, a live and/or streamed video, an on-demand (e.g., prerecorded) video, a video broadcast, or any other type of media content. The one or more media content items 906 can include any content of the segment 904B of the media content 902 such as, for example and without limitation, video content (e.g., one or more video frames), audio content, text content (e.g., closed captions), and/or any other media content.

As previously noted, the media content 902 can be segmented as described herein, to identify boundaries or breaks between portions (e.g., segments) of the media content 902. Thus, the media content 902 can include segments 904A, 904B, 904N determined as described herein. The segments 904A, 904B, 904N can be adjusted to include and/or present targeted media content in addition to the content included in the segments. The targeted media content to include in or present with a segment, such as segment 904B, can include media content determined to have some relationship, similarity, match, correspondence, and/or relevance to the content of that segment, such as the one or more media content items 906 of the segment 904B. In some examples, each of the segments 904A, 904B, 904N can include one or more media content items associated with a scene and/or a shot. In some cases, the segments 904A, 904B, 904N (and/or boundaries thereof) can be determined based on scene breaks and/or shot breaks identified within the media content 902, as further described herein.

The neural network 908 can use respective signals within the one or more media content items 906 to generate embeddings 910A, 910B, 910N that represent and/or describe the one or more media content items 906 associated with the segment 904B, a content of the one or more media content items 906 associated with the segment 904B, one or more features in the one or more media content items 906 associated with the segment 904B, and/or a context of the one or more media content items 906 associated with the segment 904B. For example, the neural network 908 can use a visual signal (e.g., image data) in the one or more media content items 906 to generate an embedding 910A representing and/or encoding information from the visual signal in the one or more media content items 906, such as a depicted setting, a depicted object, a depicted actor, a depicted background, a depicted foreground, a depicted scene, a depicted action/activity, a depicted context, a depicted gesture, semantic information, and/or any other visual features/information. Moreover, the neural network 908 can use an audio signal (e.g., audio data) in the one or more media content items 906 to generate an embedding 910B representing and/or encoding information from the audio signal in the one or more media content items 906, such as dialogue/speech, a sound(s), a noise, a noise level, music, a type of sound, a voice(s), a tone of voice, semantic information, and/or any other audio features/information. The neural network 908 can use a text signal (e.g., closed caption data, metadata, etc.) in the one or more media content items 906 to generate an embedding 910N representing and/or encoding information from the text signal in the one or more media content items 906, such as dialogue/speech, text descriptions, titles, language information, semantic information, and/or any other text features/information.

The embeddings 910A, 910B, 910N can include values encoding information from the respective signals in the one or more media content items 906 (e.g., the visual signal, the audio signal, the text signal, etc.), such as semantic information, contextual information, descriptive information, extracted features, sentiment/mood information, content information, and/or any other information about the one or more media content items 906 and/or the segment 904B associated with the one or more media content items 906. For example, in some cases, the embedding 910A can include a feature vector generated based on a visual signal in the one or more media content items 906, the embedding 910B can include a feature vector generated based on the audio signal in the one or more media content items 906, and the embedding 910N can include a feature vector generated based on the text signal in the one or more media content items 906.

In some examples, the embeddings 910A, 910B, 910N can contain and/or encode an understanding of a context of the one or more media content items 906, such as an understanding of what is happening in a scene depicted in the one or more media content items 906. In some cases, the neural network 908 can use contrastive learning for unsupervised representation learning (e.g., to create the embeddings 910A, 910B, 910N). Contrastive learning can include a framework (e.g., a query/key framework, etc.) in which the model learns to associate similar instances (e.g., query-key pairs) and differentiate them from dissimilar instances. In some cases, the contrastive learning can train the model to obtain representations of positive query-key pairs closer together while pushing apart representations of negative pairs. For example, the neural network 908 can use an inherent structure or relationship in the data (e.g., data close to each other in time should be similar) and/or an imposed structure or relationship in the data (e.g., a mask or obfuscation in the data, etc.) to select positive pairs. During training, the neural network 908 can match a piece of data with its positive pair given a number of potential pairings.

In some cases, the neural network 908 or another model can perform sentiment analysis on the one or more media content items 906 to determine additional information about the one or more media content items 906, such as an emotional tone of the content of the one or more media content items 906. The sentiment analysis information can help the neural network 908 generate the embeddings 910A, 910B, 910N. For example, the sentiment analysis information can help the neural network 908 determine at least some information that can be encoded in the embeddings 910A, 910B, 910N to better describe, represent, contextualize, and/or identify the content in the one or more media content items 906 and/or the segment 904B.

The visual signal, audio signal, and text signal in the previous example are merely illustrative examples of signals in the one or more media content items 906 that the neural network 908 can use to generate embeddings. In other examples, the neural network 908 can process any other signal(s) in the one or more media content items 906 in addition to or instead of the visual signal, the audio signal, and/or the text signal. Moreover, while the neural network 908 in FIG. 9A generates embeddings 910A, 910B, 910N, in other examples, the neural network 908 can generate more or less embeddings than shown in FIG. 9A. For example, in some cases, the neural network 908 can generate a single embedding for the one or more media content items 906, such as an embedding generated by fusing embeddings from different signals in the one or more media content items 906. An example of a fused embedding generated by the neural network 908 is shown in FIG. 9B and further described below.

The neural network 908 can include one or more neural networks (e.g., a single neural network or multiple neural networks). For example, the neural network 908 can include a single neural network, multiple neural networks, a core neural network with one or more neural network branches or heads, or any other number of neural networks (and/or components thereof) and/or neural network configuration. In some cases, the neural network 908 can also include one or more classical methods/algorithms which can be used to learn and/or generate embeddings as described herein. Moreover, the neural network 908 can include any neural network configured to extract features from the one or more media content items 906 and generate one or more embeddings based on the extracted features. For example, in some cases, the neural network 908 can include a convolutional neural network (CNN), an encoder network, or a transformer network, among others. In some cases, the neural network 908 can be trained using unsupervised or self-supervised learning. In other cases, the neural network 908 can be trained using supervised learning based on a training dataset containing labels provided by human experts/labelers. While FIG. 9A illustrates a neural network used to generate embeddings, in other examples, the embeddings can be generated by a classical algorithm (e.g., a non-neural network algorithm), such as an algorithm that creates an embedding. For example, the embeddings can be generated using a color histogram or histogram of oriented gradients (HOG) method, an algorithm based on locality-based feature vectors, or any classical algorithm.

The embeddings 910A, 910B, 910N from the neural network 908 can be fed into another neural network 912 configured to determine one or more segment categories 914 for the one or more media content items 906 and the segment 904B associated with the one or more media content items 906. In some examples, the neural network 912 can classify the embeddings 910A, 910B, 910N to generate the one or more segment categories 914. In some aspects, when classifying the embeddings 910A, 910B, 910N, the neural network 912 can take into account contextual information associated with the embeddings 910A, 910B, 910N such as, for example and without limitation, characteristics of a scene associated with any of the embeddings, a genre associated with any of the embeddings, audio and/or speech associated with any of the embeddings, activity depicted in the content associated with any of the embeddings, a mood conveyed in the content associated with any of the embeddings, a type of content and/or scene associated with the embeddings, an environment depicted in the content associated with the embeddings, one or more attributes of content associated with the embeddings, an actor(s) associated with any of the embeddings, products and/or objects described and/or depicted in content associated with any of the embeddings, and/or any other context information. In some cases, the neural network 912 or another model can perform sentiment analysis on the embeddings 910A, 910B, 910N to encode information generated from the sentiment analysis, such as emotional tone, into the embeddings 910A, 910B, 910N. The added information from the sentiment analysis can help the neural network 912 determine the one or more segment categories 914 associated with the one or more media content items 906 and the segment 904B.

The one or more segment categories 914 can be used to match targeted media content to the segment 904B for presentation with or within the segment 904B. In some cases, to generate the one or more segment categories 914, the neural network 912 can classify the embeddings 910A, 910B, 910N (or each of the embeddings 910A, 910B, 910N) by determining which category (or categories) from a set of predetermined categories of content best matches, represents, and/or describes the embeddings 910A, 910B, 910N (or each of the embeddings 910A, 910B, 910N). In some cases, the set of predetermined categories can include any categories created to describe or represent media content (e.g., video content, etc.), such as interactive advertising bureau (IAB) categories or any other categories. In other cases, to generate the one or more segment categories 914, the neural network 912 can classify the embeddings 910A, 910B, 910N by determining or creating one or more categories estimated to best match, represent, and/or describe the segment 904B (and/or the one or more media content items 906 associated with the segment 904B) and/or the embeddings 910A, 910B, 910N.

The one or more segment categories 914 generated by the neural network 912 can include one or more categories generated based on the embeddings 910A, 910B, 910N. In some examples, the neural network 912 can determine a category for each embedding (e.g., for each of the embeddings 910A, 910B, 910N), and use the category for each embedding to generate the one or more segment categories 914, which can include some or all of the categories generated based on the embeddings 910A, 910B, 910N. For example, the neural network 912 can generate a segment category based on the embedding 910A, a segment category based on the embedding 910B, and a segment category based on the embedding 910N. The neural network 912 can use the categories generated based on the embeddings 910A, 910B, 910N to generate the one or more segment categories 914. In other examples, the neural network 912 can generate a single segment category based on the embeddings 910A, 910B, 910N (and/or based on respective categories generated from the embeddings 910A, 910B, 910N).

In some cases, the system can match the one or more segment categories 914 to a category or categories from a set of predetermined categories, such as a set of IAB categories or any other set of categories. For example, distance or similarity metrics (e.g., cosine similarity, Euclidean distance, kernel function metric, etc.) can be calculated for the one or more segment categories 914 and each of the categories in the set of predetermined categories to determine similarities between the one or more segment categories 914 and each of the set of predetermined categories. The calculated similarity or distance metrics can be used to determine which category or categories from the set of predetermined categories best matches the one or more segment categories 914. For example, the category or categories from the set of predetermined categories having the highest similarity or lowest distance (e.g., based on the similarity or distance metrics) can be identified as the best match or matches for the one or more segment categories 914.

In some cases, the set of predetermined categories can include categories used to describe, represent, and/or classify targeted media content items. Thus, the set of predetermined categories associated with the targeted media content items can be compared with the one or more segment categories 914 to determine what targeted media content item is a best match for the segment 904B (and thus best match to present with/within the content of segment 904B). For example, in order to determine which of the targeted media content items best matches with the segment 904B (e.g., is most relevant and/or related to the content of segment 904B, has the most commonalities with the content of segment 904B, is most likely to be of interest to a user consuming and/or interested in the content of segment 904B, etc.), the set of predetermined categories associated with the targeted media content items can be compared with the one or more segment categories 914 to determine a best match between the one or more segment categories 914 and one or more categories from the set of predetermined categories. The targeted media content item(s) associated with the one or more categories identified as best matching the one or more segment categories 914 can then be selected for presentation with/within the content of the segment 904B. The selected targeted media content item(s) can thus be inserted within and/or included in the segment 904B, inserted within or included in a break before or after the segment 904B, or otherwise presented with/within the segment 904B or a break before or after the segment 904B.

Continuing with the previous example, in some cases, to determine the best match between the one or more segment categories 914 and one or more categories from the set of predetermined categories, the neural network 912 can calculate similarity or distance metrics for the one or more segment categories 914 and each category from the set of predetermined categories. The neural network 912 can select the best matching category (or categories) from the set of predetermined categories based on the similarity or distance metrics. For example, the neural network 912 can select the category from the set of predetermined categories having the highest similarity metric or the lowest distance metric. As another example, the neural network 912 can select a number of categories from the set of predetermined categories having the top n highest similarity metrics or the lowest n distance metrics, where n is a number greater than or equal to 1.

In some aspects, the neural network 912 can use contrastive learning to optimize and/or select which of the embeddings 910A, 910B, 910N to use to determine the one or more segment categories 914. For example, since the embeddings 910A, 910B, 910N are generated by the neural network 908 based on different signals in the one or more media content items 906, the information encoded by the embeddings 910A, 910B, 910N in some cases can differ. As such, some of the embeddings 910A, 910B, 910N may more accurately describe and/or represent the context, content, and/or features of the one or more media content items 906, and some of the embeddings 910A, 910B, 910N may less accurately describe and/or represent the context, content, and/or features of the one or more media content items 906. In some cases, an embedding(s) that less accurately describes and/or represents the context, content, and/or features of the one or more media content items 906 can, if used/considered when determining the one or more segment categories 914 as previously described, reduce the accuracy of the one or more segment categories 914 determined (e.g., may result in a determination of one or more segment categories that are less relevant, related, similar, and/or complimentary to the content of the segment 904B). In such cases, to avoid using such embedding(s) to determine the one or more segment categories 914, the neural network 912 can remove/filter such embedding(s) (and instead use the remaining embedding(s) from the embeddings 910A, 910B, 910N to determine the one or more segment categories 914) if a similarity metric between such embedding(s) and one or more other embeddings from the embeddings 910A, 910B, 910N is below a threshold or a distance metric between such embedding(s) and the one or more other embeddings is above a threshold.

In some cases, the neural network 912 can generate a candidate category from each of the embeddings 910A, 910B, 910N. For example, the neural network 912 can generate a category based on the embedding 910A, a category based on the embedding 910B, and a category based on the embedding 910N. The neural network 912 can include all or a subset of the categories generated from the embeddings 910A, 910B, 910N in the one or more segment categories 914 generated by the neural network 912, include in the one or more segment categories 914 a single category from the categories generated using the embeddings 910A, 910B, 910N (e.g., the best matching category determined based on one or more associated metrics such as a similarity or distance metric), or fuse the categories generated from the embeddings 910A, 910B, 910N into a fused category included (and/or designated as) the one or more segment categories 914 determined by the neural network 912.

In some aspects, the neural network 912 can select, from the categories generated from the embeddings 910A, 910B, 910N, one or more segment categories that are estimated to be the best representations of the content of the segment 904B (e.g., the content in the one or more media content items 906). The one or more segment categories 914 generated by the neural network 912 can include (or can be) the one or more selected segment categories. For example, the neural network 912 can calculate similarity or distance metrics for the categories generated from the embeddings 910A, 910B, 910N, and use the similarity or distance metrics to select one or more segment categories having the most similarity and/or the best match.

The neural network 912 can include one or more neural networks (e.g., a single neural network or multiple neural networks). For example, the neural network 912 can include a single neural network, multiple neural networks, a core neural network with one or more neural network branches or heads, or any other number of neural networks (and/or components thereof) and/or neural network configuration. In some cases, the neural network 912 can also include one or more classical methods/algorithms which can be used to learn and/or select categories as described herein. In some examples, the neural network 912 can include any neural network configured to determine categories for content. For example, the neural network 912 can include a CNN or any classifier network, among other networks. In some cases, the neural network 912 and the neural network 908 can be part of a same neural network. For example, the neural network 908 can be a neural network core and the neural network 912 can be a neural network head attached to the neural network core. As another example, the neural network 908 and the neural network 912 can both be neural network heads attached to a common neural network core. In other cases, the neural network 912 and the neural network 908 can be separate neural networks.

While the system flow 900 in FIG. 9A uses a neural network (neural network 912) to generate the one or more segment categories 914, in other examples, other types of models or algorithms can be used to generate the one or more segment categories 914. For example, in some cases, the system flow 900 can use a classical classification algorithm (instead of or in addition to the neural network 912) to generate the one or more segment categories 914.

Moreover, while FIG. 9A illustrates multiple embeddings generated from different signals in the one or more media content items 906, in other examples, the neural network 908 can generate a single embedding for the one or more media content items 906 or can fuse the multiple embeddings into a single output embedding.

FIG. 9B is a diagram illustrating an example system flow 920 for categorizing a segment of media content using a fused embedding, according to some examples of the present disclosure. In this example, the system flow 920 can be used to generate a fused embedding 922 for the one or more media content items 906. The fused embedding 922 can represent and/or describe the one or more media content items 906 associated with the segment 904B, a content of the one or more media content items 906 associated with the segment 904B, one or more features in the one or more media content items 906 associated with the segment 904B, and/or a context of the one or more media content items 906 associated with the segment 904B.

The fused embedding 922 can be generated by fusing (e.g., combining, merging, etc.) multiple embeddings generated from different signals (e.g., visual signal, audio signal, text signal, etc.) in the one or more media content items 906, such as the embeddings 910A, 910B, 910N illustrated in FIG. 9A. For example, the neural network 908 can process the one or more media content items 906 of the segment 904B to generate embeddings from different signals in the one or more media content items 906, such as a visual signal (e.g., image data) in the one or more media content items 906, an audio signal (e.g., audio data) in the one or more media content items 906, and/or a text signal (e.g., closed caption data, metadata, etc.) in the one or more media content items 906. The neural network 908 can combine such embeddings to generate a fused embedding 922 that combines, encodes, describes, and/or represents information from the various embeddings. The fused embedding 922 can be a single embedding representing and/or describing the segment 904B (and/or the one or more media content items 906 associated with the segment 904B).

The fused embedding 922 from the neural network 908 can be fed into the neural network 912, which can use the fused embedding 922 to determine one or more segment categories 924 for the one or more media content items 906 and the segment 904B associated with the one or more media content items 906. The one or more segment categories 924 can be used to match targeted media content to the segment 904B for presentation with or within the segment 904B. In some cases, to generate the one or more segment categories 924, the neural network 912 can classify the fused embedding 922 by determining which category (or categories) from a set of predetermined categories of content best matches, represents, and/or describes the fused embedding 922 (and thus the segment 904B).

In some cases, a nearest neighbor method or any other learning method can be used to match the one or more segment categories 924 to a category from a set of predetermined categories, such as a set of IAB categories or any other set of categories. For example, distance or similarity metrics (e.g., cosine similarity, Euclidean distance, kernel function metric, etc.) can be calculated for the one or more segment categories 924 and each of the categories in the set of predetermined categories to determine similarities between the one or more segment categories 924 and each of the set of predetermined categories. The calculated similarity or distance metrics can be used to determine which category from the set of predetermined categories best matches the one or more segment categories 924. For example, the category from the set of predetermined categories having the highest similarity metric or lowest distance metric can be identified as the best match for the one or more segment categories 924.

In some cases, the set of predetermined categories can include categories used to describe, represent, and/or classify targeted media content items. Thus, the set of predetermined categories associated with the targeted media content items can be compared with the one or more segment categories 924 to determine what targeted media content item is a best match for the segment 904B (and thus a best match to present with/within the content of segment 904B). For example, in order to determine which of the targeted media content items best matches with the segment 904B (e.g., is most relevant and/or related to the content of segment 904B, has the most commonalities with the content of segment 904B, is most likely to be of interest to a user consuming and/or interested in the content of segment 904B, etc.), the set of predetermined categories associated with the targeted media content items can be compared with the one or more segment categories 924 to determine a best match between the one or more segment categories 914 and one or more categories from the set of predetermined categories. The targeted media content item(s) associated with the one or more categories identified as best matching the one or more segment categories 924 can then be selected for presentation with/within the content of the segment 904B. The selected targeted media content item(s) can thus be inserted within and/or included in the segment 904B, inserted within or included in a break before or after the segment 904B, or otherwise presented with/within the segment 904B or a break before or after the segment 904B.

To illustrate, from the previous example, to determine the best match between the one or more segment categories 924 and one or more categories from the set of predetermined categories, the neural network 912 can, in some cases, calculate similarity or distance metrics for the one or more segment categories 924 and each category from the set of predetermined categories. The neural network 912 can select the best matching category (or categories) from the set of predetermined categories based on the similarity or distance metrics. For example, the neural network 912 can select the category from the set of predetermined categories having the highest similarity metric or the lowest distance metric. As another example, the neural network 912 can select a number of categories from the set of predetermined categories having the top n highest similarity metrics or the lowest n distance metrics, where n is a number greater than or equal to 1.

Figure 10:
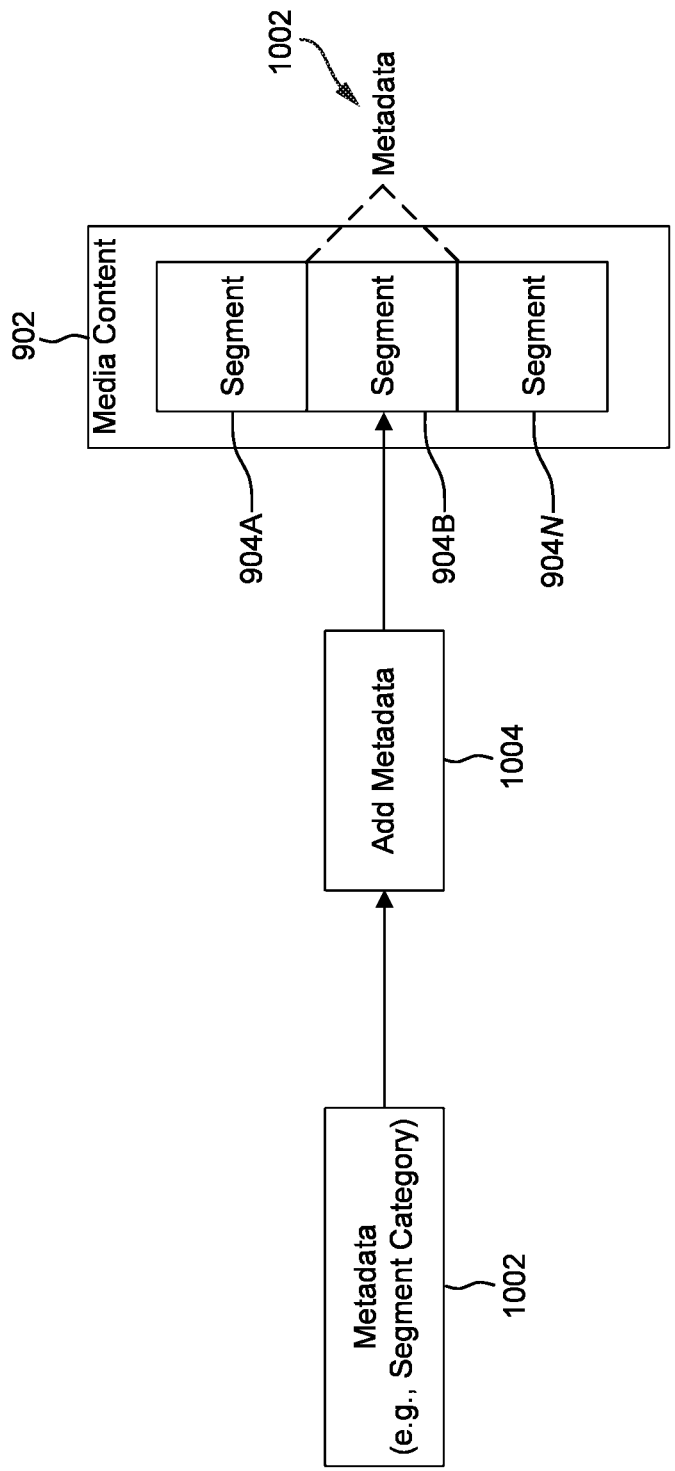
FIG. 10 is a diagram illustrating an example for tagging a segment of media content with metadata generated for the segment, according to some examples of the present disclosure.

FIG. 10 is a diagram illustrating an example for tagging a segment 904B of a media content 902 with metadata 1002 generated for the segment 904B, according to some examples of the present disclosure. The metadata 1002 can include information about the segment 904B and/or the content in the segment 904B, such as information describing, representing, classifying, identifying, and/or summarizing the segment 904B, the content of the segment 904B, and/or features of the segment 904B (and/or the content of the segment 904B). For example, the metadata 1002 can include information generated for the segment 904B, as further described herein.

In some examples, the metadata 1002 can include one or more segment categories generated for the segment 904B, such as the one or more segment categories 914 illustrated in FIG. 9A or the one or more segment categories 924 illustrated in FIG. 9B. The one or more segment categories can classify/categorize the segment 904B (and/or content thereof) as previously explained. In some cases, the metadata 1002 can additionally or alternatively include other information about the segment 904B, such as the augmented data 1206 described below with respect to FIG. 12.

In some cases, the metadata 1002 can include information generated based on a sentiment analysis performed on information in the metadata 1002 and/or content associated with the metadata 1002. For example, a neural network can perform sentiment analysis on content associated with the metadata 1002 to determine additional information about the content, such as an emotional tone of the content, a sentiment associated with an item (e.g., an object, a product, a brand, a vehicle, a structure, a tool, an animal, a landmark, an environment or scene, etc.) and/or an event associated with the content and/or category associated with the metadata 1002. The sentiment analysis information can be included in the metadata 1002 associated with the segment 904B, as further described herein.

As shown in FIG. 10, the metadata 1002 can be associated with the segment 904B at block 1004. In some examples, associating the metadata 1002 with the segment 904B can include adding the metadata 1002 to the segment 904B. For example, the segment 904B can be tagged with the metadata 1002. In some cases, associating the metadata 1002 with the segment 904B can additionally or alternatively include creating a mapping, link, pointer, and/or correlation between the metadata 1002 and the segment 904B. For example, the segment 904B can be tagged with a pointer to a location of the metadata 1002, which can be used to associate the segment 904B with the metadata 1002 and access the metadata 1002 associated with the segment 94B as needed. In some cases, associating the metadata 1002 with the segment 904B can include creating a relation (e.g., via primary keys, secondary keys, and/or any other relation) between the metadata 1002 and the segment 904B in a database.

Once the metadata 1002 is associated with the segment 904B, the metadata 1002 can be used to match targeted media content with the segment 904B for presentation (e.g., of the targeted media content) with/within the segment 904B. For example, a content provider can provide a targeted media content item for presentation with/within a segment of a video. The targeted media content item can include metadata, such as a category of the targeted media content item, which can be compared with metadata associated with segments of available media content (e.g., videos, etc.) to determine a match or best match between the metadata associated with the targeted media content item and metadata associated with a segment of media content (and thus determine a match or best match between the targeted media content item and the media content segment). To illustrate, in the example shown in FIG. 10, the segment 904B can be matched with a targeted media content item based on a match or best match between the metadata 1002 associated with the segment 904B and metadata (e.g., a category, such as an IAB category) associated with the targeted media content item.

In some cases, if a targeted media content item does not include a category (or other descriptive information), the targeted media content item can be analyzed to generate a category for the targeted media content item. For example, a category for the targeted media content item can be generated using the system flow 900 shown in FIG. 9A or the system flow 920 shown in FIG. 9B. To illustrate, the neural network 908 can analyze the targeted media content item to generate one or more embeddings encoding information about the targeted media content item. The neural network 912 can use the one or more embeddings to generate one or more categories for the targeted media content item. The one or more categories associated with the targeted media content item can be compared with metadata associated with media content segments, such as metadata 1002 associated with segment 904B, to determine a match between the one or more categories of the targeted media content item and the metadata associated with a media content segment(s), such as the metadata 1002 associated with segment 904B.

In some cases, the metadata 1002 associated with the segment 904B can be used to provide one or more users and/or systems information about the segment 904B. For example, the metadata 1002 can be used to provide a server, a user, a content provider (e.g., a targeted media content provider, a video content service and/or host, etc.), etc., information about the segment 904B. In some cases, the metadata 1002 can be augmented to provide more information about the segment 904B. For example, the metadata 1002 can include the augmented data 1206 described below with respect to FIG. 12.

Figure 11:
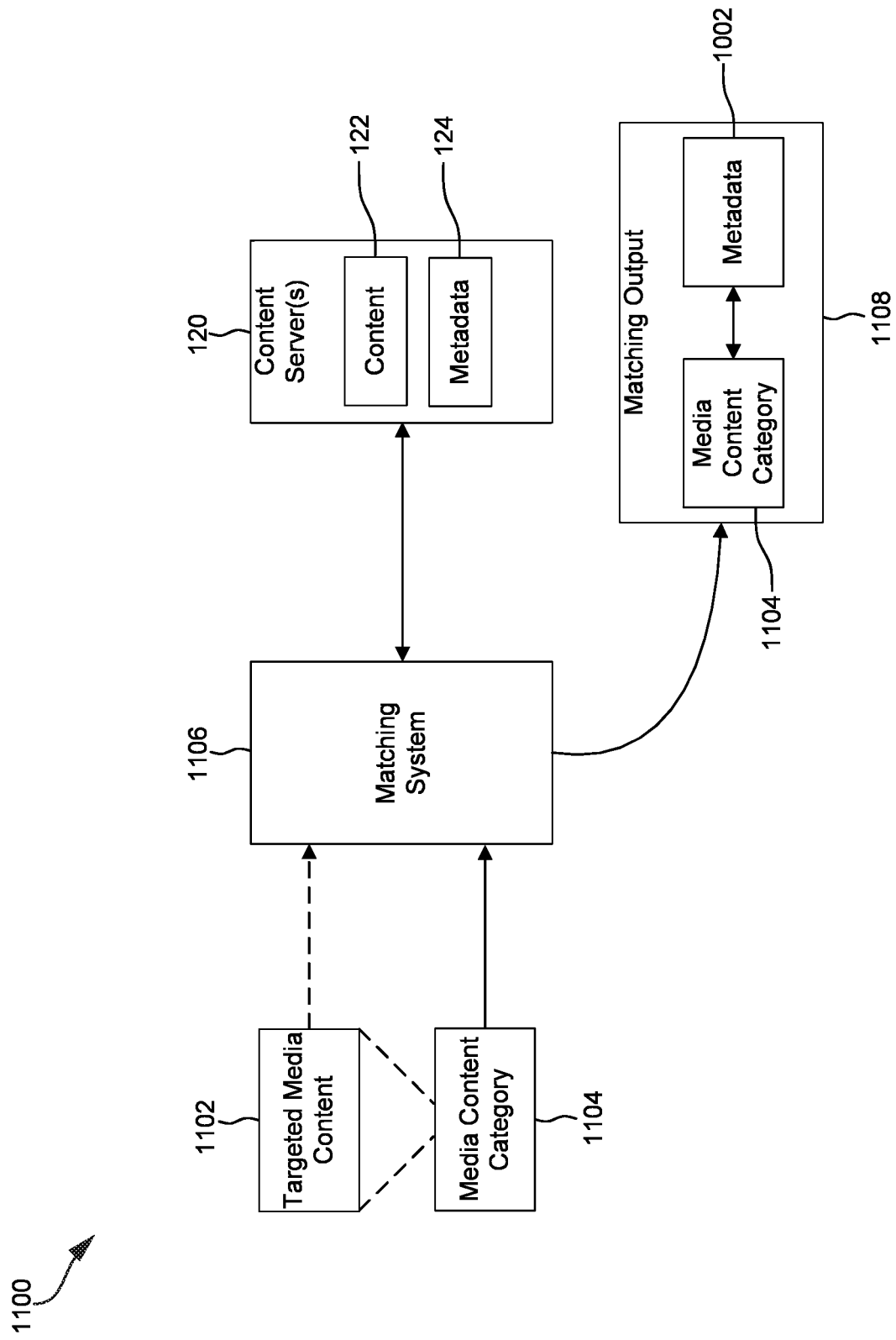
FIG. 11 is a diagram illustrating an example system flow for matching targeted media content with a media content segment, according to some examples of the present disclosure.

FIG. 11 is a diagram illustrating an example system flow 1100 for matching targeted media content 1102 with a media content segment (e.g., segment 904B), according to some examples of the present disclosure. The targeted media content 1102 can include one or more media content items (e.g., image data, audio data, text data, etc.) from a targeted media content provider. For example, the targeted media content 402 can include a video and/or image depicting, describing, announcing, promoting, identifying, and/or related to a product(s), a brand(s), an event(s), a message(s), an object(s), a service(s), and/or any other item. In the example system flow 1100, a matching system 1106 can use metadata (e.g., metadata 1002) associated with segments of available media content, such as segment categories (e.g., one or more segment categories 914, one or more segment categories 924), to match the targeted media content 1102 with a media content segment.

In some examples, the matching system 1106 can be part of or implemented by the content server(s) 120 illustrated in FIG. 1. For example, the matching system 1106 can be a software algorithm running on the content server(s) 120. In other examples, the matching system 1106 can be separate from the content server(s) 120. For example, the matching system 1106 can be or can be implanted by a different server(s), a datacenter, a software container hosted on a different system (e.g., a server(s), a cloud system, an on-premises system, etc.), a virtual machine hosted on a different system (e.g., a server(s), a cloud system, an on-premises system, etc.), a software service hosted on a distributed system, or any other system.

In the example shown in FIG. 11, the targeted media content 1102 can include a media content category 1104 associated with the targeted media content 1102. The media content category 1104 can be used to match the targeted media content 1102 with a segment (e.g., segment 904B) of media content (e.g., media content 902) from the content 122 in the content server(s) 120. The content server(s) 120 can include metadata 124 associated with the content 122. For example, the content server(s) 120 can include metadata 1002 associated with the segment 904B of the media content 902, as well as metadata associated with other segments of the media content 902 and/or other segments of other media content.

In some cases, the matching system 1106 or another model/system can perform sentiment analysis on the targeted media content 1102, the media content category 1104, the metadata 124, and/or the content 122 to determine additional information about the targeted media content 1102, the media content category 1104, the metadata 124, and/or the content 122, such as an emotional tone. The sentiment analysis information can help the matching system 1106 to better match the media content category 1104 (and thus the targeted media content 1102) to metadata associated with one or more media content segments in the content 122.

The matching system 1106 can compare the media content category 1104 associated with the targeted media content 1102 with the metadata 124 in the content server(s) 120 to identify a best match for the media content category 1104. For example, the matching system 1106 can compare the media content category 1104 associated with the targeted media content 1102 with categories included in the metadata 124 on the content server(s) 120 to determine which of the categories in the metadata 124 best match/matches the media content category 1104 associated with the targeted media content 1102. In some examples, the matching system 1106 can compare the media content category 1104 associated with the targeted media content 1102 with categories included in the metadata 124 on the content server(s) 120 and determine which of the categories in the metadata 124 best match/matches the media content category 1104 associated with the targeted media content 1102.

For example, the matching system 1106 can generate similarity or distance metrics for the media content category 1104 associated with the targeted media content 1102 and each of the categories included in the metadata 124 on the content server(s) 120. The matching system 1106 can use the similarity or distance metrics to determine which of the categories in the metadata 124 best match/matches the media content category 1104 associated with the targeted media content 1102. To illustrate, the matching system 1106 can identify one or more categories in the metadata 124 that have a highest similarity metric (relative to other categories in the metadata 124) with respect to the media content category 1104 or a lowest distance metric (relative to other categories in the metadata 124) with respect to the media content category 1104. The matching system 1106 can identify the one or more categories in the metadata 124 that have the highest similarity metric or the lowest distance metric as the best match for the media content category 1104. The matching system 1106 can generate a matching output 1108 that identifies a match between the media content category 1104 and the one or more categories in the metadata 124 having the highest similarity metric or the lowest distance metric.

For example, if the matching system 1106 determines that, from the metadata 124 associated with the content 122 in the content server(s) 120, the metadata 1002 is the best/closest match to the media content category 1104, the matching output 1108 generated by the matching system 1106 can identify a match between the metadata 1002 and the media content category 1104. Here, the matching output 1108 can be used to determine that the segment 904B associated with the metadata 1002 matched with the media content category 1104 is a match (or a best match) to the targeted media content 1102 associated with the media content category 1104. In other words, the match between the metadata 1002 associated with the segment 904B and the media content category 1104 associated with the targeted media content 1102 indicates that the segment 904B associated with the metadata 1002 is also a match (or best match) for the targeted media content 1102.

Thus, when a device (e.g., media device(s) 106) requests the media content 902 with the segment 904B, the content server(s) 120 can provide to the device the segment 904B with the targeted media content 1102 matched with the segment 904B for presentation at the device. Because the targeted media content 1102 is provided/presented with/within a media content segment (e.g., segment 904B) determined to match the targeted media content 1102 (e.g., determined to have the most content and/or contextual relevance, similarity, correlation, etc.), the targeted media content 1102 has a higher likelihood than other targeted media content of being of interest to a viewer when presented with the media content segment related to the targeted media content 1102, has a higher likelihood of being of interest to a viewer when presented with the media content segment related to the targeted media content 1102 than if the targeted media content 1102 is otherwise presented with a less relevant media content segment, may result in higher performance metrics than if the targeted media content 1102 is presented with a less relevant media content segment, and/or may result in higher performance metrics than other targeted media content that is less relevant to the segment 904B when that other targeted media content is presented with that media content segment.

While the targeted media content 1102 in FIG. 11 is associated with a media content category 1104, in some cases, the targeted media content 1102 may not have a predetermined media content category associated with it. Here, the matching system 1106 may not initially have a media content category associated with the targeted media content 1102 available. In such cases, a media content category can be determined for the targeted media content 1102 based on the system flow 900 illustrated in FIG. 9A or the system flow 920 illustrated in FIG. 9B. Once the media content category is determined for the targeted media content 1102, the matching system 1106 can generate the matching output 1108 for the targeted media content 1102, as previously described.

While FIG. 11 illustrates a media content category 1104 associated with the targeted media content 1102, in other examples, the targeted media content 1102 can additionally or alternatively include other metadata, such as augmented metadata 1206 described below with respect to FIG. 12.

Figure 12:
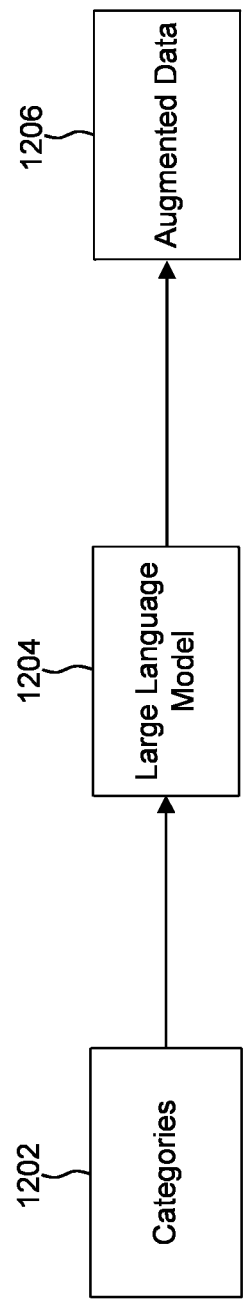
FIG. 12 is a diagram illustrating an example augmentation of data used to categorize media content segments and/or targeted media content, according to some examples of the present disclosure.

FIG. 12 is a diagram illustrating an example augmentation (e.g., query expansion) of data used to categorize media content segments and/or targeted media content, according to some examples of the present disclosure. In this example, a large language model (LLM) 1204 can receive categories 1202 generated for media content segments (e.g., the one or more segment categories 914, the one or more segment categories 924) and/or targeted media content (e.g., media content category 1104), and generate augmented data 1206 associated with the categories 1202.

The LLM 1204 can include an artificial neural network configured to process and/or generate text from an input, such as the categories 1202. In some examples, the LLM 1204 can be configured to learn and/or understand semantics in text, ontology information associated with text, syntax information, classification information, categories and/or category associations, tokens associated with text, how to generate text, dependencies, sentiment/tone, context, biases, and/or any other task and/or feature of an LLM.

In some cases, the categories 1202 can be provided to the LLM 1204 as text for processing by the LLM 1204. For example and without limitation, the categories 1202 can identify a set of categories in clear text. In other cases, the categories 1202 can be provided to the LLM 1204 as embeddings that encode information associated with specific media content segments and/or targeted media content. For example, in some cases, the categories 1202 can be provided to the LLM 1204 as the embeddings 910A, 910B, 910N illustrated in FIG. 9A or the fused embedding 922 illustrated in FIG. 9B, which can encode information about and/or identifying categories as previously described. In some cases, the LLM 1204 can decode and process such embeddings to generate the augmented data 1206, as further described herein. In other cases, a separate system/model (not shown) can decode the embeddings and provide to the LLM 1204 text categories encoded in the embeddings.

The LLM 1204 can interpret the categories 1202 and/or extract information about the categories 1202, and generate additional information about the categories 1202, such as descriptive information and/or additional details about the categories 1202. For example, if the categories 1202 include the category "Home Renovation", the LLM 1202 can generate a richer description of home renovation that details, for example, that home renovation can include or relate to home ownership, interior renovation, outdoor renovation, home and garden, etc. The LLM 1204 can use such information to generate the augmented data 1206. The augmented data 1206 can include the categories 1202 and any additional information related to the categories 1202 and generated by the LLM 1204.

In some examples, the augmented data 1206 can include the categories 1202 and one or more terms, details, and/or keywords related to the categories 1202 and generated by the LLM 1204 based on the input categories 1202. In other examples, the augmented data 1206 can include text in sentence and/or paragraph form that identifies/describes the categories 1202 and additional information about the categories 1202. Non-limiting examples of additional information relating to the categories 1202 that the LLM 1204 can include in the augmented data 1206 can include information about a context associated with the categories 122, an activity/action associated with the categories 1202, details describing the categories 1202, conditions associated with the categories 1202, patterns associated with the categories 1202, estimated behaviors and/or preferences associated with the categories 1202, other related categories, definitions of the categories 1202, summaries of the categories 1202, products associated with the categories 1202, environments associated with the categories 1202, user demographics associated with the categories 1202, sentiments or emotional tones associated with the categories 1202, statistics associated with the categories 1202, user behavior and/or purchasing habits associated with the categories 1202, etc.

In some cases, the augmented data 1206 can be associated with any media content segments matched to the categories 1202 to provide additional information associated with such media content segments. For example, with reference to FIG. 10, if the LLM 1204 generates the augmented data 1206 based on the metadata 1002, which is matched to segment 904B, the augmented data 1206 can be associated with the segment 904B to provide a richer description of the segment 904B. To illustrate, the segment 904B can be tagged with the augmented data 1206 to provide a richer description of the segment 904B.

In some aspects, the augmented data 1206 can be used to help match targeted media content to a media content segment. For example, the matching system 1106 in the system flow 1100 illustrated in FIG. 11 can use the augmented data 1206 to help the matching system 1106 match the targeted media content 1102 (and/or the media content category 1104 associated with the targeted media content 1102) with the segment 904B (and/or any other media content segment).

In some cases, the augmented data 1206 can be used to augment the information associated with a targeted media content item. Here, the augmented data 1206 can similarly help the matching system 1106 in FIG. 11 to match the targeted media content item with one or more media content segments. In some examples, the augmented data 1206 can be provided to targeted media content providers for use in describing targeted media content for matching with any media content segments and/or to facilitate the targeted media content providers generate categories and/or other descriptive information for targeted media content.

In some aspects, the LLM 1204 or another model can perform sentiment analysis on the categories 1202, segments and/or content associated with the categories 1202, and/or targeted media content associated with the categories 1202 to determine an emotional tone associated with the categories 1202, the segments, and/or the content associated with the categories 1202, and/or the targeted media content associated with the categories 1202. The information from the sentiment analysis (e.g., emotional tone) can be included in the augmented data 1206 for added context, details, and/or information.

Figure 13:
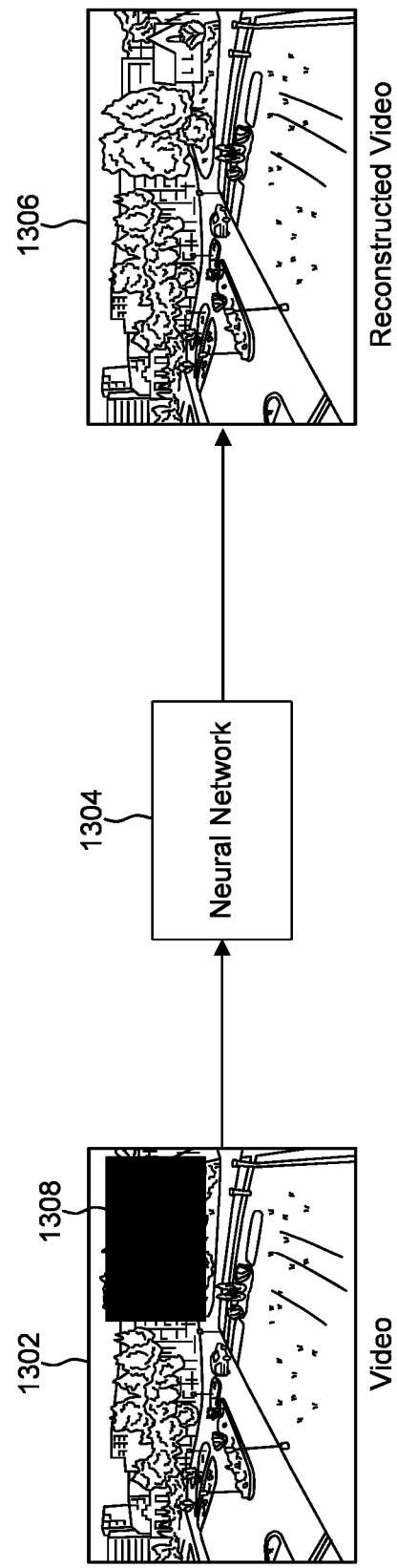
FIG. 13 is a diagram illustrating an example video reconstruction used to train a model, according to some examples of the present disclosure.

FIG. 13 is a diagram illustrating an example media content reconstruction used to train a model, according to some examples of the present disclosure. In this example, the media content includes a video 1302. However, the media content can include any type of media content such as, for example, video content, audio content, closed caption content, and/or any other content. As shown, a neural network 1304 can receive, as input, a video 1302 and reconstruct missing pixels in the image data of the video 1302. The missing pixels can include pixels in the video 1302 that are missing, have been removed, have been masked, or have been otherwise obfuscated. For example, the missing pixels can include pixels in the video 1302 that are obfuscated by a mask 1308 added to the video 1302 by the neural network 1304 or a separate system or algorithm.

In some examples, the neural network 1304 can add the mask 1308 to the video 1302 in order to obfuscate one or more pixels or patches of pixels in the video 1302. The neural network 1304 can generate a reconstructed video 1306 that includes the pixels of the video 1302 that are not missing (e.g., pixels that are not obfuscated by the mask 1308) as well as a reconstructed version of the missing pixels or patches of pixels of the video 1302 (e.g., the pixels obfuscated by the mask 1308). In other examples, the video 1302 can have one or more pixels or patches of pixels masked (e.g., by the mask 1308) before the neural network 1304 receives the video 1302 for processing. The neural network 1304 can reconstruct the missing pixels or patches of pixels and generate the reconstructed video 1306 based on the input video 1302 and the reconstructed pixels or patches of pixels.

In some cases, the neural network 1304 can analyze pixels or blocks of pixels that are adjacent to and/or neighboring any missing pixels in the video 1302 (e.g., adjacent to and/or neighboring the pixels obfuscated by the mask 1308), and use such adjacent and/or neighboring pixels or blocks of pixels to reconstruct the missing pixels in the video 1302. The neural network 1304 can use the adjacent and/or neighboring pixels or blocks of pixels to predict the missing pixels in the video 1302 based on motion, intensity values, patterns, pixel values, and/or other information derived from the adjacent and/or neighboring pixels or blocks of pixels (and/or other portions of content such as any previous video frames, content in the video 1302, etc.).

In some examples, the neural network 1304 can determine one or more motion vectors associated with the video 1302 based on motion calculated from the video 1302 (and/or motion calculated from one or more previous video frames). The neural network 1304 can use the one or more motion vectors, the adjacent and/or neighboring pixels or blocks of pixels (e.g., adjacent/neighboring relative to the missing pixels), and/or one or more relevant pixels or blocks of pixels from one or more previous video frames to reconstruct/predict the missing pixels in the video 1302.

The video reconstruction can allow the neural network 1304 to better understand the content (e.g., video), relationships and/or patterns in the content, mappings of data in the content, features of the content, and/or other information about the content. This in turn can help the neural network 1304 perform better when analyzing the content to generate embeddings, categorize the content, match the content with targeted media content, and/or generate augmented data, as further described herein.

In some examples, the neural network 1304 can be the same as the neural network 908 shown in FIGS. 9A, the neural network 912 shown in FIG. 9B, and/or the matching system 1106 shown in FIG. 11. In other examples, the neural network 1304 can be a different and/or separate model as the neural network 908 shown in FIGS. 9A, the neural network 912 shown in FIG. 9B, and the matching system 1106 shown in FIG. 11.

The neural network 1304 can include a generative model or a generative model head. For example, in some cases, the neural network 1304 can include a masked autoencoder. In another example, the neural network 1304 can include a generative adversarial network (GAN).

Figure 14:
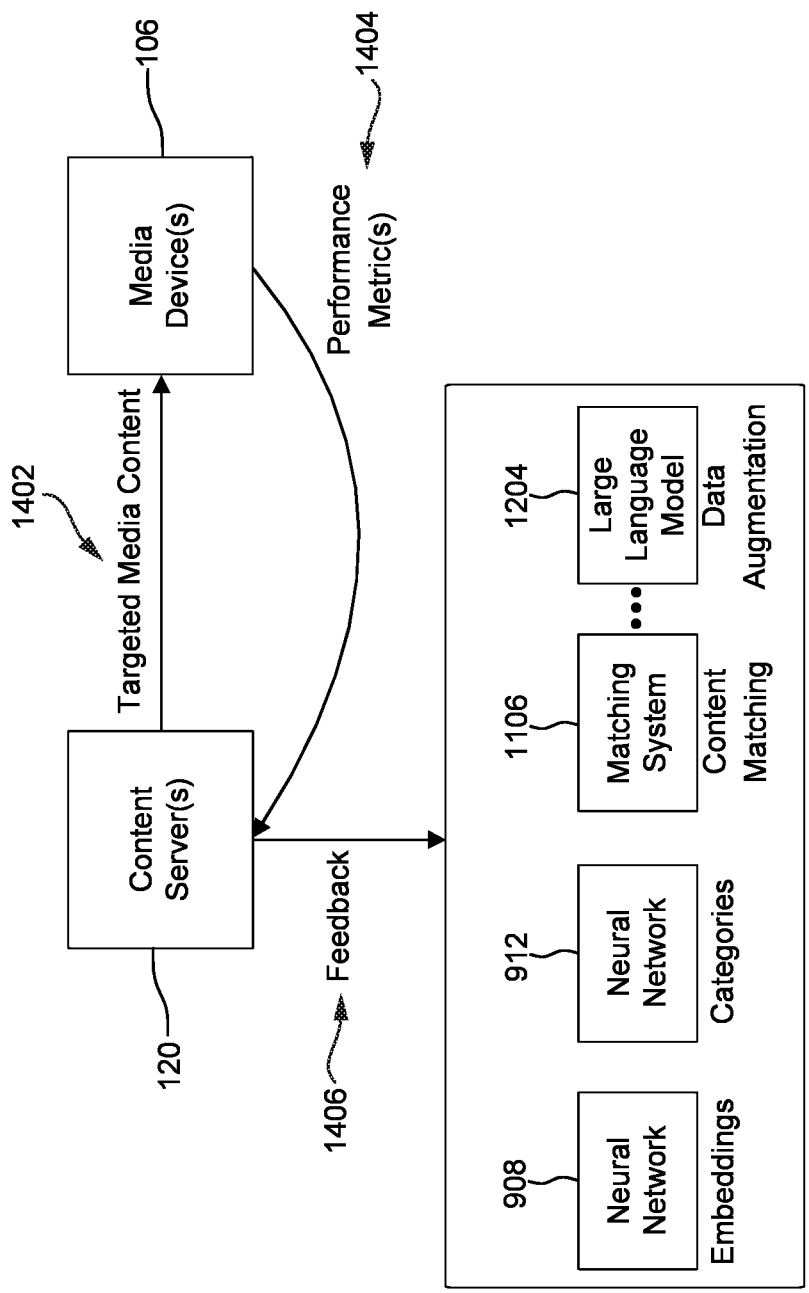
FIG. 14 is a diagram illustrating an example feedback loop used to make adjustments to content categorization, content matching, and/or data augmentation, according to some examples of the present disclosure.

FIG. 14 is a diagram illustrating an example feedback loop used to make adjustments to content categorization, content matching, and/or data augmentation based on performance metrics associated with targeted media content. In this example, after matching targeted media content 1402 with a segment of media content (e.g., a video, etc.), when the media device(s) 106 requests or attempts to access the media content, the content server 120 can provide the targeted media content 1402 to the media device(s) 106 along with the media content associated with the targeted media content 1402. The content server 120 can then determine performance metrics for the targeted media content 1402 based on how the targeted media content 1402 performed after being presented at the media device(s) 106.

The performance metrics can be based on various factors. For example and without limitation, the performance metrics can be based on a tracked bounce rate (e.g., an amount or percentage of users who take no action after being presented the targeted media content 1402 and/or close the targeted media content 1402 and/or associated media content after being presented the targeted media content 1402), a number of impressions of the targeted media content 1402, a number and/or type of interactions (e.g., clicks) with the targeted media content 1402 by a user presented with the targeted media content 1402), a number or percentage of conversions (e.g., completed activity/conversion associated with the targeted media content 1402) resulting from presentation of the targeted media content 1402 to one or more users, user engagement with the targeted media content 1402 (e.g., did a user interact with the content of the targeted media content 1402 and/or associated media content segment, did the targeted media content 1402 and/or the associated media content segment timeout from inactivity by the user indicating lack of engagement by the user, where there any positive or negative reactions/interactions by one or more users with the targeted media content 1402 and/or associated media content segment, etc.), a session duration per user presented with the targeted media content 1402, any user transactions associated with the targeted media content 1402, and/or any other performance metric.

The performance metrics can be used to generate feedback 1406 for the neural network 908, the neural network 912, the matching system 1106, and/or the LLM 1204. The feedback 1406 can indicate, based on the performance metrics, whether the targeted media content 1402 was correctly categorized (or should be categorized differently) and/or matched with the media content segment provided with the targeted media content 1402, and/or whether the categorization and/or matching of the targeted media content 1402 (and any other targeted media content) can or should be adjusted.

For example, if the feedback 1406 indicates or suggests that a performance of the targeted media content 1402 can be improved by improving the matching of the targeted media content 1402 with a different media content segment(s) that may be a better match for the targeted media content 1402, the content server(s) 120 can provide the feedback 1406 to the neural network 908, the neural network 912, and/or the matching system 1106. The neural network 908 can use the feedback 1406 to adjust how it generates embeddings encoding information about a media content segment, the neural network 912 can use the feedback 1406 to adjust how it generates categories based on the embeddings from the neural network 908, and/or the matching system 1106 can adjust how it matches targeted media content with media content segments.

For example, the neural network 908 can use the feedback 1406 to adjust weights/biases used by the neural network 908 to generate embeddings for a video, the neural network 912 can use the feedback 1406 to adjust weights/biases used by the neural network 912 to generate categories based on the embeddings from the neural network 908, and/or the matching system 1106 can adjust weights/biases used by the matching system 1106 to match targeted media content with any video segments. Thus, the feedback 1406 can be used to improve embeddings generated for media content, categorization of media content (e.g., categorization of the embeddings), and/or mapping of media content/segments to targeted media content.

In some cases, the feedback 1406 can additionally or alternatively be used to improve other aspects of content targeting and/or campaigns. For example, the feedback 1406 can indicate certain factors that may result in better performance of the targeted media content 1402. To illustrate, the feedback 1406 can indicate that the targeted media content 1402 may perform better with certain demographics, users in certain geographic areas, when presented with certain types of media content, when presented in certain contexts, when presented at certain days and/or times, when configured in certain ways, etc. The feedback 1406 can thus be used to make adjustments to one or more factors used to determine how, when, where, and/or whether to present the targeted media content 1402 (and any other targeted media content).

Figure 15:
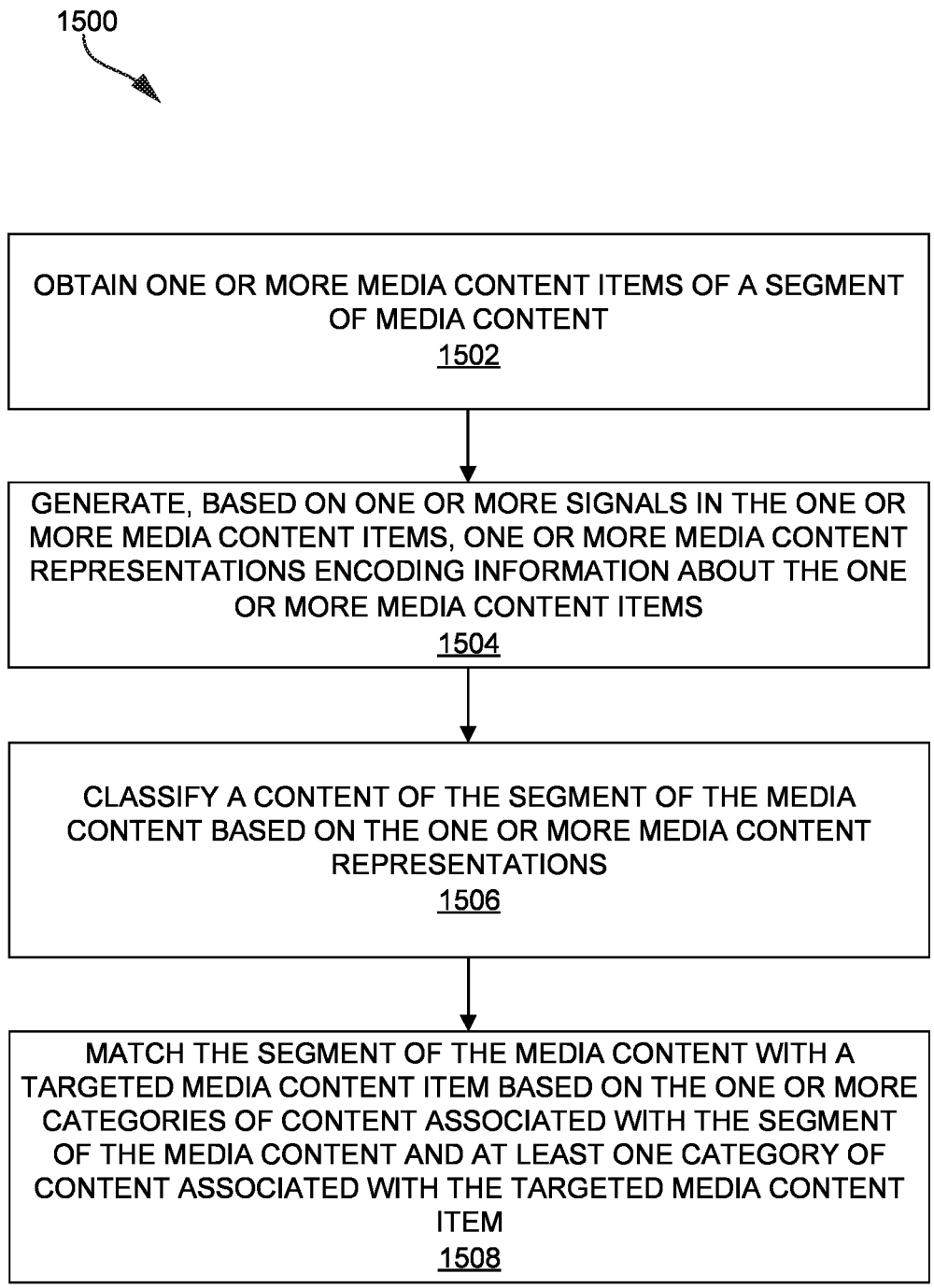
FIG. 15 is a diagram illustrating a flowchart of an example method for categorizing segments of media content, according to some examples of the present disclosure.

FIG. 15 is diagram illustrating a flowchart of an example method 1500 for categorizing segments of media content, according to some examples of the present disclosure. Method 1500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 15, as will be understood by a person of ordinary skill in the art.

Method 1500 will be described with reference to FIG. 1. However, method 1500 is not limited to that example.

In step 1502, the content server(s) 120 can obtain one or more media content items (e.g., one or more media content items 906) of a segment (e.g., segment 904B) of media content (e.g., media content 902). The media content can include, for example, video, audio, text, and/or any other media content. In some aspects, the media content can include any type of video such as, for example and without limitation, a television video/program, a pre-recorded or on-demand video, a live video broadcast, a movie, a podcast, or any other video. Moreover, the media content can include segments of media content. The segments can be determined based on a segmentation scheme. For example, in some cases, the segments can be determined based on scene and/or shot breaks, as further described herein.

In step 1504, the content server(s) 120 can generate, based on one or more signals in the one or more media content items, one or more media content item representations encoding information about the one or more media content items. In some cases, the information about the one or more media content items can include a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In some examples, the one or more media content item representations can include one or more embeddings encoding information about the one or more media content items, and the information encoded in the one or more embeddings can include a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In step 1506, the content server(s) 120 can classify a content of the segment of the media content based on the one or more media content item representations. In some examples, the content of the segment of the media content can be classified into one or more categories of content (e.g., one or more segment categories 914, one or more segment categories 924). For example, the content of the segment of the media content can be classified into one or more IAB categories or any other categories used to categorize and/or describe the segment of the media content. In some aspects, when classifying content of the segment of the media content based on the one or more media content item representations, the content server(s) 120 can take into account context information associated with the content and/or the one or more media content item representations such as, for example and without limitation, one or more characteristics of a scene depicted in the content, a genre associated with the content, audio and/or speech in the content, activity depicted in the content, a mood conveyed in the content, a type of content and/or scene, an environment depicted in the content, one or more attributes of the content, an actor(s) in the content, any products and/or objects described and/or depicted in the content, and/or any other context information.

In some examples, the one or more signals in the one or more media content items can include a visual signal, an audio signal, and/or a closed caption signal. The visual signal can include image data (e.g., one or more frames) from the one or more media content items. The audio signal can include audio (e.g., music, noise, speech/dialogue, sounds, etc.) from the one or more media content items. The closed caption signal can include text associated with the one or more media content items.

In some examples, the one or more media content item representations can include a first media content item representation encoding information determined based on the visual signal, a second media content item representation encoding information determined based on the audio signal, and/or a third media content item representation encoding information determined based on the closed caption signal.

In some aspects, the content server(s) 120 can combine at least two media content item representations from the first media content item representation, the second media content item representation, and the third media content item representation into a fused media content item representation, and classify the content of the segment of the media content into the one or more categories of content based on the fused media content item representation. For example, the content server(s) 120 can combine the first, second, and/or third media content item representations into the fused media content item representation and use the fused media content item representation to classify the content of the segment of the media content.

In step 1508, the content server(s) 120 can match the segment of the media content with a targeted media content item based on the one or more categories of content associated with the segment of the media content and at least one category of content associated with the targeted media content item. For example, the targeted media content item can be associated with a category defined for the targeted media content item. The content server(s) 120 can compare the category defined for the targeted media content item with the one or more categories of content associated with the segment of media content, and match the one or more categories of content associated with the segment of media content with the category defined for the targeted media content item based on one or more similarities and/or matching metrics.

In some aspects, the content server(s) 120 can insert the targeted media content item within the segment of the media content, and provide the segment of the media content with the targeted media content item to the media device(s) 106 associated with the user(s) 132.

In some cases, matching the segment of the media content with the targeted media content item can include matching the one or more categories of content associated with the segment with the at least one category of content associated with the targeted media content item and, based on the matching of the one or more categories of content associated with the segment with the at least one category of content associated with the targeted media content item, matching the segment with the targeted media content item.

In some aspects, the content server(s) 120 can determine similarity metrics indicating respective similarities between the one or more categories of content associated with the segment and a set of categories of content associated with a set of targeted media content items. The set of targeted media content items can include the targeted media content item. The content server(s) 120 can further match the one or more categories of content associated with the segment with the at least one category of content associated with the targeted media content item based on a respective similarity metric associated with the at least one category of content.

In some aspects, the content server(s) 120 can compare the similarity metrics; determine, based on the comparing of the similarity metrics, that a similarity between the one or more categories of content associated with the segment and the at least one category of content associated with the targeted media content item is greater than a respective similarity between each category of content from the set of categories of content associated with the set of targeted media content items; and based on the determining that the similarity between the one or more categories of content associated with the segment and the at least one category of content associated with the targeted media content item is greater than the respective similarity between each category of content from the set of categories of content, match the one or more categories of content associated with the segment with the at least one category of content associated with the targeted media content item.

In some aspects, the content server(s) 120 can determine distance metrics indicating respective distances within a representation space between the one or more categories of content associated with the segment and a set of categories of content associated with a set of targeted media content items. The set of targeted media content items can include the targeted media content item. The content server(s) 120 can further determine, based on the distance metrics, that a distance (within the representation space) between the one or more categories of content associated with the segment and the at least one category of content associated with the targeted media content item is smaller than a respective distance between each additional category of content from the set of categories of content, and match the one or more categories of content associated with the segment with the at least one category of content associated with the targeted media content item based on the determining that the distance between the one or more categories of content associated with the segment and the at least one category of content associated with the targeted media content item is smaller than the respective distance between each additional category of content from the set of categories of content.

In some aspects, the content server(s) 120 can determine, based on a sentiment analysis performed using a large language model (e.g., LLM 1204), an emotional tone associated with the content of the segment of the media content, and classify the content of the segment of the media content based on the one or more media content item representations and the emotional tone associated with the content of the segment of the media content. In some cases, the one or more media content item representations can encode the emotional tone associated with the content of the segment of the media content. In other cases, the emotional tone associated with the content of the segment of the media content can be separate from the one or more media content item representations.

In some aspects, the content server(s) 120 can generate, based on text describing the information encoded in the one or more media content item representations, augmented data including an indication of the one or more categories of content and additional information about the one or more categories of content and/or the content of the segment of the media content, and associate the segment of the media content with the augmented data.

Figure 16:
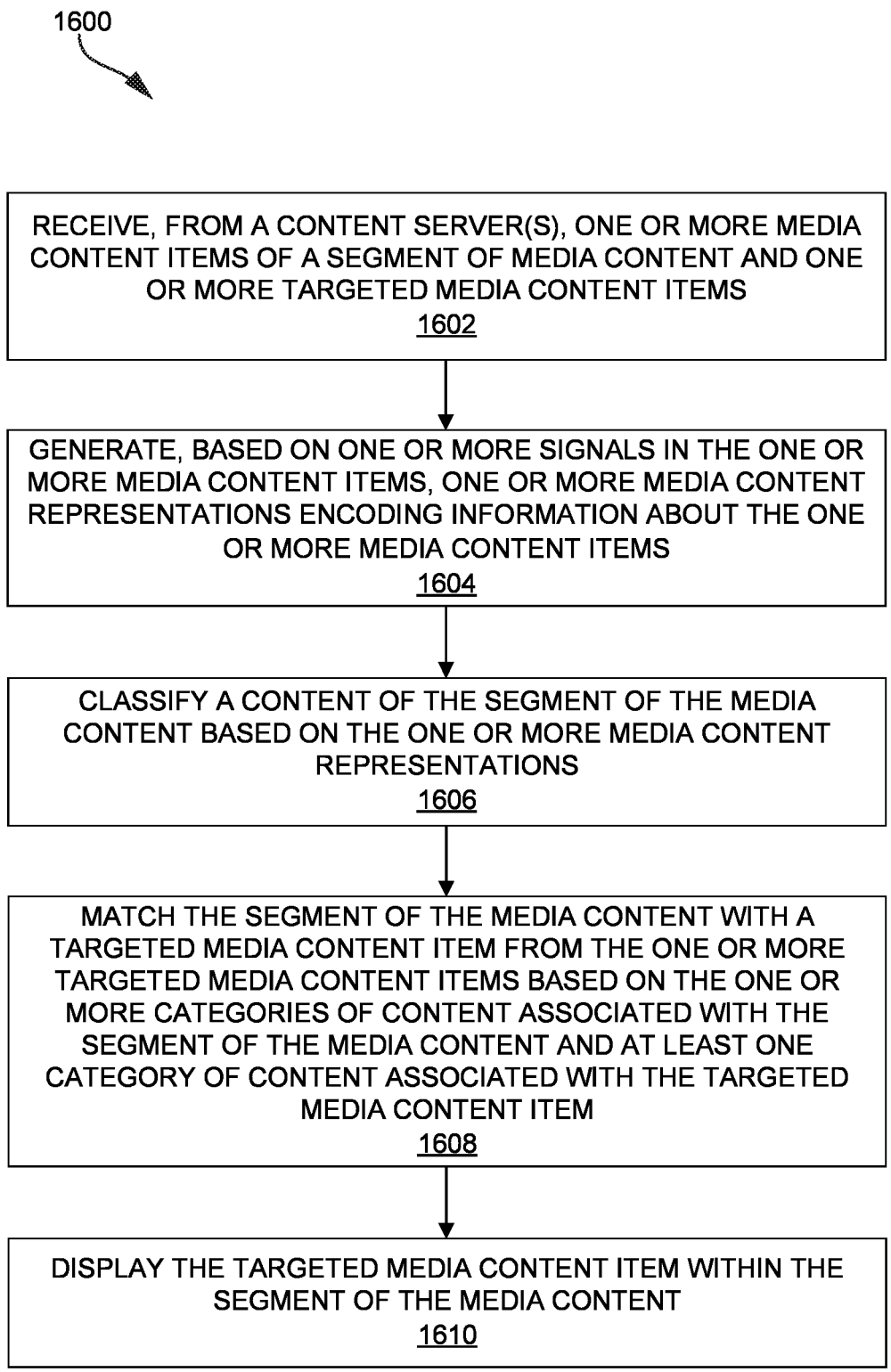
FIG. 16 is a diagram illustrating a flowchart of another example method for categorizing segments of media content, according to some examples of the present disclosure.

FIG. 16 is diagram illustrating a flowchart of another example method 1600 for categorizing segments of media content, according to some examples of the present disclosure. Method 1600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 16, as will be understood by a person of ordinary skill in the art.

Method 1600 will be described with reference to FIG. 1. However, method 1600 is not limited to that example.

In step 1602, the media device(s) 106 can receive, from content server(s) 120, one or more media content items (e.g., one or more media content items 906) of a segment (e.g., segment 904B) of media content (e.g., media content 902) and one or more targeted media content items. For example, the media device(s) 106 can receive content of a segment of a video from the content server(s) 120.

The media content can include segments of content. In some cases, the media content can include a live video or a live video broadcast, and the media device(s) 106 can buffer at least a portion of the one or more media content items to create a delay between obtaining the portion of the one or more media content items and playback of the portion of the one or more media content items. Such delay can provide a certain amount of time in which the media device(s) 106 can process the one or more media content items as described herein. In some cases, the live video or live video broadcast can be provided to the media device(s) 106 with a delay or buffer that the media device(s) 106 can use to process the one or more media content items as described herein, before playback of at least a portion of the one or more media content items.

In step 1604, the media device(s) 106 can generate, based on one or more signals in the one or more media content items, one or more media content item representations encoding information about the one or more media content items. In some cases, the information about the one or more media content items can include a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In some examples, the one or more media content item representations can include one or more embeddings encoding information about the one or more media content items, and the information encoded in the one or more embeddings can include a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In step 1606, the media device(s) 106 can classify a content of the segment of the media content based on the one or more media content item representations. In some examples, the content of the segment of the media content can be classified into one or more categories of content (e.g., one or more segment categories 914, one or more segment categories 924). For example, the content of the segment of the media content can be classified into one or more IAB categories or any other categories used to categorize and/or describe the segment of the media content.

In some examples, the one or more signals in the one or more media content items can include a visual signal, an audio signal, and/or a closed caption signal. The visual signal can include image data from the one or more media content items. The audio signal can include audio (e.g., music, noise, speech/dialogue, sounds, etc.) from the one or more media content items. The closed caption signal can include text associated with the one or more media content items.

In some examples, the one or more media content item representations can include a first representation encoding information determined based on the visual signal, a second representation encoding information determined based on the audio signal, and/or a third representation encoding information determined based on the closed caption signal.

In some aspects, the media device(s) 106 can combine at least two media content item representations from the first representation, the second representation, and/or the third representation into a fused representation, and classify the content of the segment of the media content into the one or more categories of content based on the fused representation. For example, the media device(s) 106 can combine the first, second, and/or third representations into the fused representation and use the fused representation to classify the content of the segment of the media content.

In step 1608, the media device(s) 106 can match the segment of the media content with a targeted media content item from the one or more targeted media content items based on the one or more categories of content associated with the segment of the media content and at least one category of content associated with the targeted media content item. For example, the targeted media content item can be associated with a category defined for the targeted media content item. The media device(s) 106 can compare the category defined for the targeted media content item with the one or more categories of content associated with the segment of media content, and match the one or more categories of content associated with the segment of media content with the category defined for the targeted media content item based on one or more similarities and/or matching metrics.

In some cases, matching the segment of the media content with the targeted media content item can include matching the one or more categories of content associated with the segment with the at least one category of content associated with the targeted media content item and, based on the matching of the one or more categories of content associated with the segment with the at least one category of content associated with the targeted media content item, matching the segment with the targeted media content item.

In some aspects, the media device(s) 106 can determine similarity metrics indicating respective similarities between the one or more categories of content associated with the segment and a set of categories of content associated with a set of targeted media content items. The set of targeted media content items can include the targeted media content item. The media device(s) 106 can further match the one or more categories of content associated with the segment with the at least one category of content associated with the targeted media content item based on a respective similarity metric associated with the at least one category of content.

In some aspects, the media device(s) 106 can compare the similarity metrics; determine, based on the comparing of the similarity metrics, that a similarity between the one or more categories of content associated with the segment and the at least one category of content associated with the targeted media content item is greater than a respective similarity between each category of content from the set of categories of content associated with the set of targeted media content items; and based on the determining that the similarity between the one or more categories of content associated with the segment and the at least one category of content associated with the targeted media content item is greater than the respective similarity between each category of content from the set of categories of content, match the one or more categories of content associated with the segment with the at least one category of content associated with the targeted media content item.

In some aspects, the media device(s) 106 can determine distance metrics indicating respective distances within a representation space between the one or more categories of content associated with the segment and a set of categories of content associated with a set of targeted media content items. The set of targeted media content items can include the targeted media content item. The media device(s) 106 can further determine, based on the distance metrics, that a distance (within the representation space) between the one or more categories of content associated with the segment and the at least one category of content associated with the targeted media content item is smaller than a respective distance between each additional category of content from the set of categories of content, and match the one or more categories of content associated with the segment with the at least one category of content associated with the targeted media content item based on the determining that the distance between the one or more categories of content associated with the segment and the at least one category of content associated with the targeted media content item is smaller than the respective distance between each additional category of content from the set of categories of content.

In step 1608, the media device(s) 106 can display (e.g., via display device(s) 108) the targeted media content item within the segment of the media content. For example, the media device(s) 106 can insert the targeted media content item within the segment of the media content, and display the targeted media content item within the segment of the media content.

In some aspects, the media device(s) 106 can determine, based on a sentiment analysis performed using a large language model (e.g., LLM 1204), an emotional tone associated with the content of the segment of the media content, and classify the content of the segment of the media content based on the one or more media content item representations and the emotional tone associated with the content of the segment of the media content. In some cases, the one or more media content item representations can encode the emotional tone associated with the content of the segment of the media content. In other cases, the emotional tone associated with the content of the segment of the media content can be separate from the one or more media content item representations.

In some aspects, the media device(s) 106 can generate, based on text describing the information encoded in the one or more media content item representations, augmented data including an indication of the one or more categories of content and additional information about the one or more categories of content and/or the content of the segment of the media content, and associate the segment of the media content with the augmented data.

Figure 17:
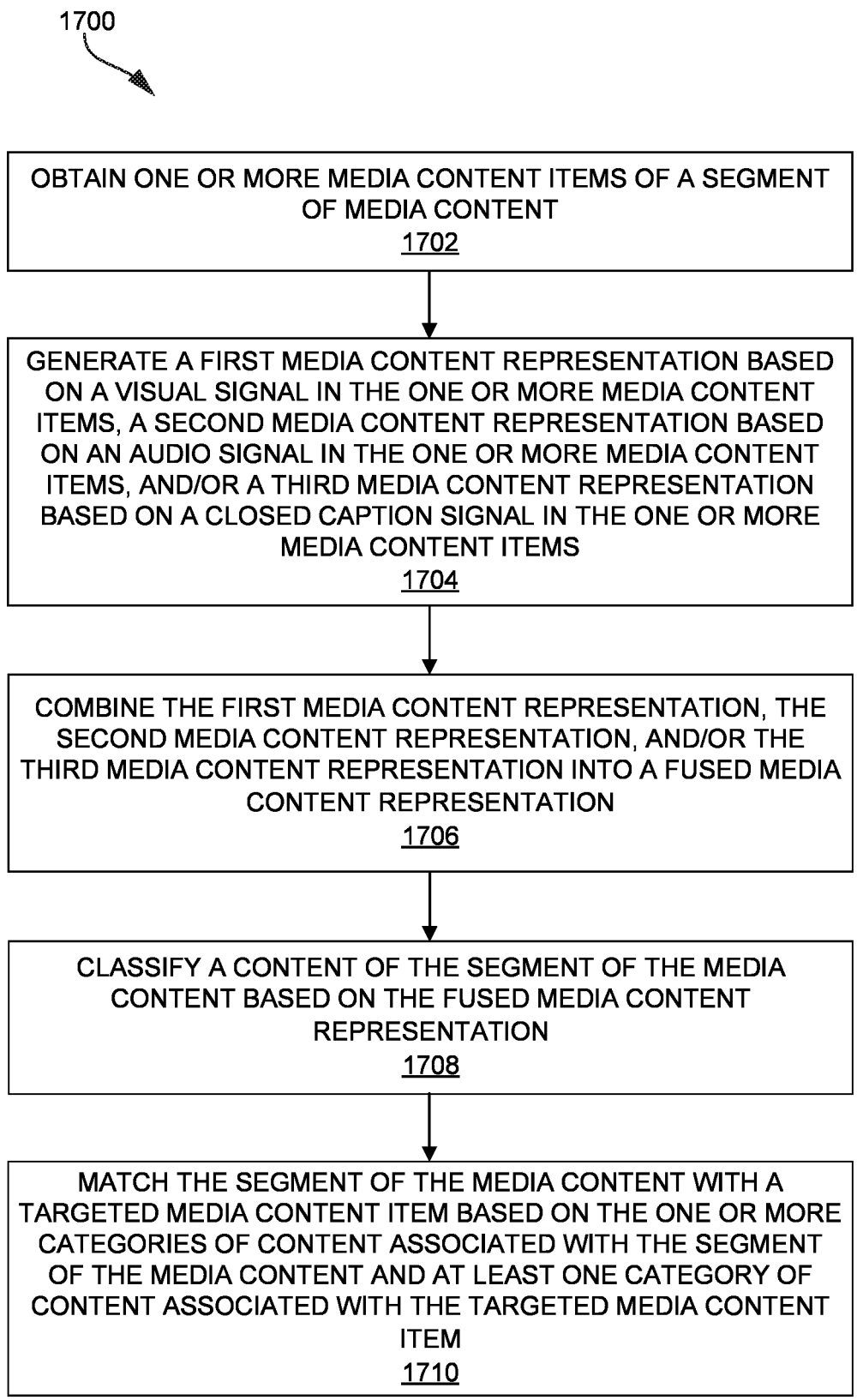
FIG. 17 is a diagram illustrating a flowchart of another example method for categorizing segments of media content, according to some examples of the present disclosure.

FIG. 17 is diagram illustrating a flowchart of another example method 1700 for categorizing segments of media content, according to some examples of the present disclosure. Method 1700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 17, as will be understood by a person of ordinary skill in the art.

Method 1700 will be described with reference to FIG. 1. However, method 1700 is not limited to that example.

In step 1702, the content server(s) 120 can obtain one or more media content items (e.g., one or more media content items 906) of a segment (e.g., segment 904B) of media content (e.g., media content 902). The media content can include video content, audio content, closed caption content, and/or any other type of content. For example, in some cases, the media content can include any type of video such as, for example and without limitation, a television video/program, a pre-recorded or on-demand video, a live video broadcast, a movie, a podcast, or any other video.

In step 1704, the content server(s) 120 can generate a first media content representation based on a visual signal in the one or more media content items, a second media content representation based on an audio signal in the one or more media content items, and/or a third media content representation based on a closed caption signal in the one or more media content items. The visual signal can include image data from the one or more media content items. The audio signal can include audio (e.g., music, noise, speech/dialogue, sounds, etc.) from the one or more media content items, and the closed caption signal can include text associated with the one or more media content items.

The first, second, and/or third media content representations can encode information about the one or more media content items. In some examples, the encoded information can include a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In some examples, the first media content representation can encode information determined based on the visual signal, the second media content representation can encode information determined based on the audio signal, and the third media content representation can encode information determined based on the closed caption signal. The information encoded in the first, second, and/or third media content representations can include a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In some cases, the first, second, and/or third media content representations can include embeddings encoding information about the one or more media content items such as, for example, a context associated with the content of the segment of the media content, one or more features of the content of the segment of the media content, one or more characteristics of the content of the segment of the media content, one or more characteristics of a scene in the segment of the media content, and/or one or more characteristics of a shot in the segment of the media content.

In step 1706, the content server(s) 120 can combine the first media content representation, the second media content representation, and/or the third media content representation into a fused media content representation.

In step 1708, the content server(s) 120 can classify a content of the segment of the media content based on the fused media content representation. In some examples, the content of the segment of the media content can be classified into one or more categories of content (e.g., one or more segment categories 914, one or more segment categories 924). For example, the content of the segment of the media content can be classified into one or more IAB categories or any other categories used to categorize and/or describe the segment of the media content.

In step 1710, the content server(s) 120 can match the segment of the media content with a targeted media content item based on the one or more categories of content associated with the segment of the media content and at least one category of content associated with the targeted media content item. For example, the targeted media content item can be associated with a category defined for the targeted media content item. The content server(s) 120 can compare the category defined for the targeted media content item with the one or more categories of content associated with the segment of media content, and match the one or more categories of content associated with the segment of media content with the category defined for the targeted media content item based on one or more similarities and/or matching metrics.

In some aspects, if the targeted media content item is not associated with at least one category of content, the content server(s) 120 can determine at least one category of content for the targeted media content item and associate the at least one category of content with the targeted media content item. For example, the content server(s) 120 can process the targeted media content item according to the system flow 900 or the system flow 920, to determine at least one category of content for the targeted media content item. The content server(s) 120 can use the at least one category of content associated with the targeted media content item to perform the matching in step 1710.

In some aspects, the content server(s) 120 can insert the targeted media content item within the segment of the media content, and provide the segment of the media content with the targeted media content item to the media device(s) 106 associated with the user(s) 132.

In some cases, matching the segment of the media content with the targeted media content item can include matching the one or more categories of content associated with the segment with the at least one category of content associated with the targeted media content item and, based on the matching of the one or more categories of content associated with the segment with the at least one category of content associated with the targeted media content item, matching the segment with the targeted media content item.

In some aspects, the content server(s) 120 can determine similarity metrics indicating respective similarities between the one or more categories of content associated with the segment and a set of categories of content associated with a set of targeted media content items. The set of targeted media content items can include the targeted media content item. The content server(s) 120 can further match the one or more categories of content associated with the segment with the at least one category of content associated with the targeted media content item based on a respective similarity metric associated with the at least one category of content.

In some aspects, the content server(s) 120 can compare the similarity metrics; determine, based on the comparing of the similarity metrics, that a similarity between the one or more categories of content associated with the segment and the at least one category of content associated with the targeted media content item is greater than a respective similarity between each category of content from the set of categories of content associated with the set of targeted media content items; and based on the determining that the similarity between the one or more categories of content associated with the segment and the at least one category of content associated with the targeted media content item is greater than the respective similarity between each category of content from the set of categories of content, match the one or more categories of content associated with the segment with the at least one category of content associated with the targeted media content item.

In some aspects, the content server(s) 120 can determine distance metrics indicating respective distances within a representation space between the one or more categories of content associated with the segment and a set of categories of content associated with a set of targeted media content items. The set of targeted media content items can include the targeted media content item. The content server(s) 120 can further determine, based on the distance metrics, that a distance (within the representation space) between the one or more categories of content associated with the segment and the at least one category of content associated with the targeted media content item is smaller than a respective distance between each additional category of content from the set of categories of content, and match the one or more categories of content associated with the segment with the at least one category of content associated with the targeted media content item based on the determining that the distance between the one or more categories of content associated with the segment and the at least one category of content associated with the targeted media content item is smaller than the respective distance between each additional category of content from the set of categories of content.

In some aspects, the content server(s) 120 can determine, based on a sentiment analysis performed using a large language model (e.g., LLM 1204), an emotional tone associated with the content of the segment of the media content, and classify the content of the segment of the media content based on the one or more media content representations and the emotional tone associated with the content of the segment of the media content. In some cases, the one or more media content representations can encode the emotional tone associated with the content of the segment of the media content. In other cases, the emotional tone associated with the content of the segment of the media content can be separate from the one or more media content representations.

In some aspects, the content server(s) 120 can generate, based on text describing the information encoded in the fused media content representation, augmented data including an indication of the one or more categories of content and additional information about the one or more categories of content and/or the content of the segment of the media content, and associate the segment of the media content with the augmented data.

Figure 18:
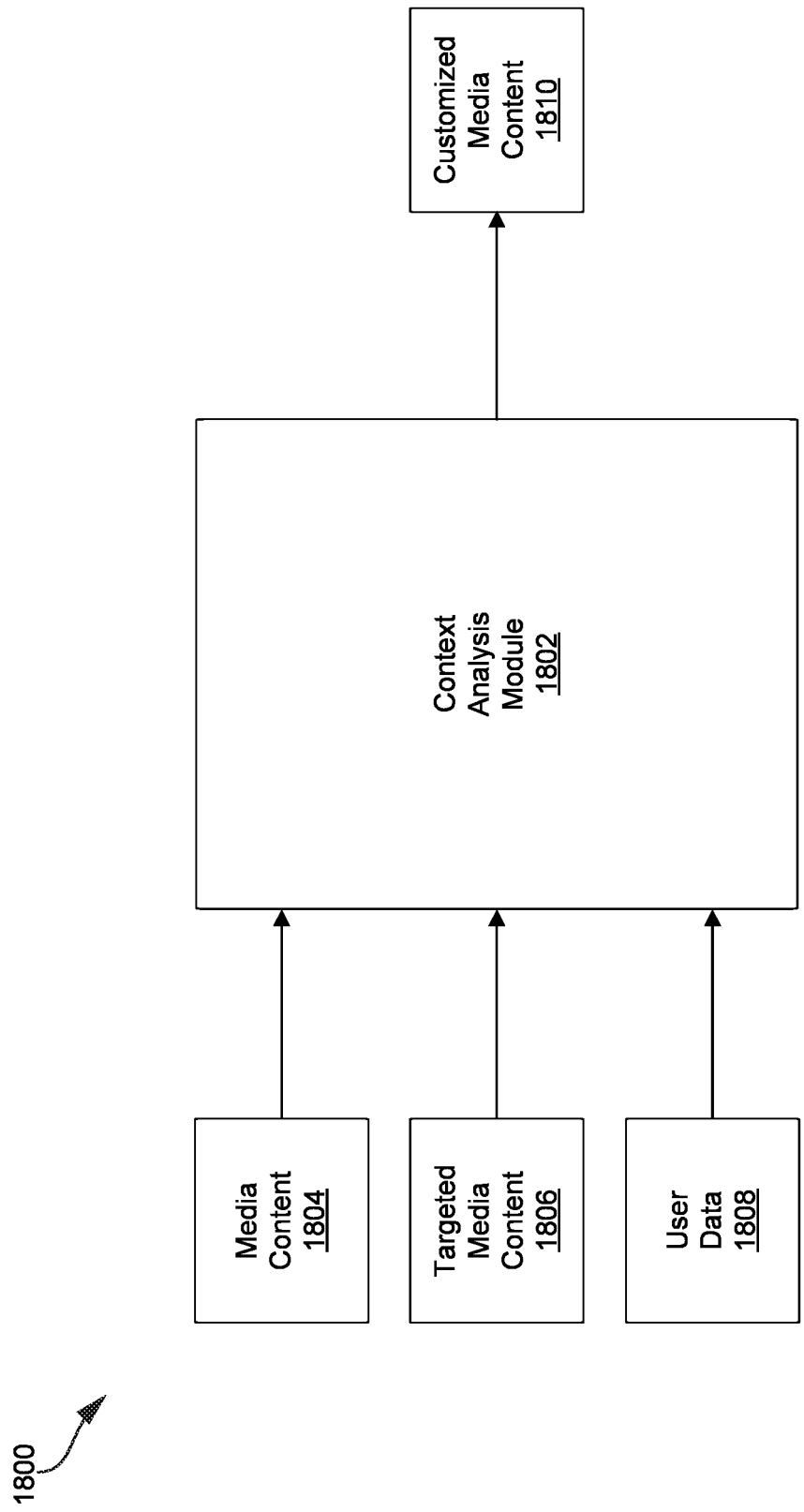
FIG. 18 is a diagram illustrating an example system flow for processing media content to generate customized media content that includes targeted media content, according to some examples of the present disclosure.

FIG. 18 is an example of a system 1800 that can be used to process media content and generate customized media content. In some examples, system 1800 can include context analysis module 1802. In some cases, context analysis module 1802 can be implemented as part of a server (e.g., content server(s) 120 and/or system server(s) 126), as part of a media device (e.g., media device(s) 106), and/or as part of cloud computing resources that may be associated with a network such as network 118.

In some aspects, context analysis module 1802 can be configured to implement algorithms, processes, machine learning models, etc. that can be used to analyze and process media content 1804, targeted media content 1806, and/or user data 1808 in order to generate customized media content 1810. For example, in some cases, context analysis module 1802 may include discriminative artificial intelligence (AI) models and/or generative AI models.

In some examples, media content 1804 can correspond to content 122 and can include music, videos, movies, TV programs, multimedia, images, still pictures, text, graphics, gaming applications, targeted content, programming content, public service content, government content, local community content, software, and/or any other content or data objects in electronic form. In some configurations, context analysis module 1802 can process media content 1804 to identify and/or extract information (e.g., contextual information, content information, attributes, cues, characteristics, etc.) that is associated with media content 1804. In some cases, context analysis module 1802 may identify and/or extract contextual information corresponding to one or more portions or sections of media content 1804. For example, context analysis module 1802 may identify parts (e.g., segments, sections, sequences, frames, etc.) of a video and identify contextual information that corresponds to one or more of the parts.

In some instances, contextual information identified and/or extracted from media content 1804 by context analysis module 1802 can include a type and/or genre of content, a type of scene (e.g., a scenic scene, a sports scene, a scene with dialogue, a slow or fast scene, an indoors scene, an outdoors scene, a city scene, a rural scene, a holiday scene, a vacation scene, a scene with certain weather, a scene with a certain amount of lighting, and/or any other scene), a scene classification (e.g., based on interactive advertising bureau (IAB) categories), a background and/or setting, any activity and/or events (e.g., driving, swimming, singing, etc.), an actor or actors, demographic information, a mood and/or sentiment (e.g., sad, festive, rambunctious, etc.), a type of audio (e.g., dialogue, music, noise, certain sounds, etc.) or lack thereof, any objects (e.g., a product and/or brand, a device, a structure, a tool, a toy, a vehicle, etc.), noise levels, a landmark and/or architecture (e.g., Golden Gate Bridge, Empire State Building, Chicago skyline, etc.), a geographic location, a keyword, a message, a type of encoding, a time and/or date, any other characteristic associated with media content 1804, and/or any combination thereof.

For instance, context analysis module 1802 may process a scene in an episode of a television show or a movie (e.g., media content 1804) that includes two people having dinner at a restaurant while discussing a business deal. In one illustrative example, contextual information derived from such a scene may include the activity type(s) (e.g., eating, sitting, talking, arguing, etc.), location (e.g., inside of a restaurant), identity of the actors, demographic information of the actors, type of food/drink on table, brands of products in scene (e.g., clothes, beverages, glassware, etc.), lighting conditions (e.g., dark, bright, etc.), mood or sentiment (e.g., excitement over business deal), language(s), accent(s), sound(s) (e.g., identify song playing in background), dialogue, keyword(s) (e.g., "cryptocurrency" or "loan" associated with business deal), etc.

In some aspects, context analysis module 1802 can use the contextual information from media content 1804 to identify targeted media content 1806. In some examples, targeted media content 1806 may include content (e.g., video content, image content, audio content, text content, etc.) that is associated with a product, service, brand, and/or event. In some instances, context analysis module 1802 can identify targeted media content 1806 based on a relationship, similarity, match, correspondence, and/or relevance to contextual information derived from media content 1804.

In some cases, context analysis module 1802 may identify contextual information that is associated with targeted media content 1806 as well as media content 1804. In some examples, context analysis module 1802 may identify targeted media content 1806 based on an association between the contextual information from targeted media content 1806 and the contextual information from media content 1804. In one illustrative example, context analysis module 1802 may identify targeted media content 1806 that is related to automobile insurance based on contextual information from media content 1804 that identifies a vehicle collision. In another example, context analysis module 1802 may identify targeted media content 1806 that is related to an upcoming concert by a particular artist based on contextual information from media content 1804 that identifies a song by the artist.

In some cases, context analysis module 1802 can add (e.g., present, insert, include, embed, etc.) targeted media content 1806 to media content 1804 to yield customized media content 1810. In some examples, the targeted media content 1806 can be added after the part, portion, segment, etc. of media content 1804 that includes the relevant contextual information. For instance, context analysis module 1802 can identify a stopping point (e.g., scene break, shot break, etc.) within media content 1804 that is suitable for adding targeted media content 1806.

In some aspects, targeted media content 1806 can include content that is preconfigured and ready to be added to media content 1804. That is, targeted media content 1806 may include audio content, video content, text content, etc. that is arranged by a third-party and context analysis module may add targeted media content 1806 to media content 1804 to generate customized media content 1810.

In some configurations, context analysis module 1802 can modify or edit targeted media content 1806. In some cases, the modification or edit to targeted media content 1806 can be based on the contextual information derived from media content 1804. That is, context analysis module 1802 can extract contextual information from media content 1804 that can be added to targeted media content 1806. In another example, context analysis module 1802 can generate content that is based on contextual information derived from media content 1804 and add the newly generated content to targeted media content 1806. For instance, context analysis module 1802 may replace a rural background of targeted media content 1806 with the New York skyline after identifying it within media content 1804. In another example, context analysis module 1802 may add a soundtrack to targeted media content 1806 that is related to contextual information from media content 1804.

In some aspects, context analysis module 1802 can use text data, image data, and/or video data from targeted media content 1806 to synthesize or generate a new version of targeted media content 1806 that can be added to media content 1804 (e.g., to create customized media content 1810). For example, targeted media content 1806 may include text data or image data that identifies a brand of a car. In some cases, context analysis module 1802 may identify a portion of media content 1804 that includes a car race and context analysis module 1802 can extract contextual information from media content 1804 such as the setting (e.g., a racetrack with other vehicles and fans). In one illustrative example, context analysis module 1802 may generate a new version of the targeted media content 1806 that includes the vehicle identified by the original targeted media content 1806 winning a race using the contextual information from media content 1804.

In some examples, context analysis module 1802 can synthesize or generate targeted media content 1806 that includes animation such as cartoon or content-like content and/or satirical content. In some aspects, the animated content may be mixed or blended with live-action content. For example, targeted media content 1806 may include a cartoon version of an actor that is identified within media content 1804 (e.g., based on contextual analysis). In another example, the cartoon version of the actor may be placed in a lifelike setting that may also be based on the contextual information (e.g., within a football stadium identified in media content 1804).

In some cases, context analysis module 1802 may modify targeted media content 1806 to achieve a desired outcome or effect. For instance, in some examples, the intended effect in presenting targeted media content 1806 may be that of shock or surprise. In one illustrative example, context analysis module 1802 may identify contextual information associated with a tranquil scene within media content 1804 and targeted media content 1806 can be modified or synthesized to include an aggressive rock song or a person yelling in order to generate shock or surprise. In some cases, the intended effect in presenting targeted media content 1806 may be to parallel or mirror one or more aspects (e.g., sentiment, environment, etc.) identified based on contextual information from media content 1804.

In some aspects, context analysis module 1802 can identify and process user data 1808 in order to generate customized media content 1810. In some cases, user data 1808 may include any information associated with user(s) 132 such user demographics, user preferences (e.g., likes and/or dislikes), geographic location, privacy settings, viewing history, etc. For example, context analysis module 1802 may disregard (e.g., not select) one or more items of targeted media content 1806 based on user history that indicates that the user does not like contextual information associated with the targeted media content 1806 (e.g., user has skipped past similar content or changed the channel when similar content is presented).

In some examples, user data 1808 can be used to select, modify, and/or synthesize targeted media content 1806 for inclusion in customized media content 1810. For instance, user data 1808 may indicate that the user has a pet, and context analysis module 1802 may select targeted media content 1806 that is associated with veterinary care. In another example, user data 1808 may include media items (e.g., photos, videos, etc.) that may be used to modify targeted media content 1806. For instance, a photo or video of the user's dog may be embedded into targeted media content 1806 that is related to dog food and can be presented as part of customized media content 1810. Further, it is noted that privacy settings within user data 1808 can be used to permit or deny access to user data 1808 for use by context analysis module 1802.

Figure 19:
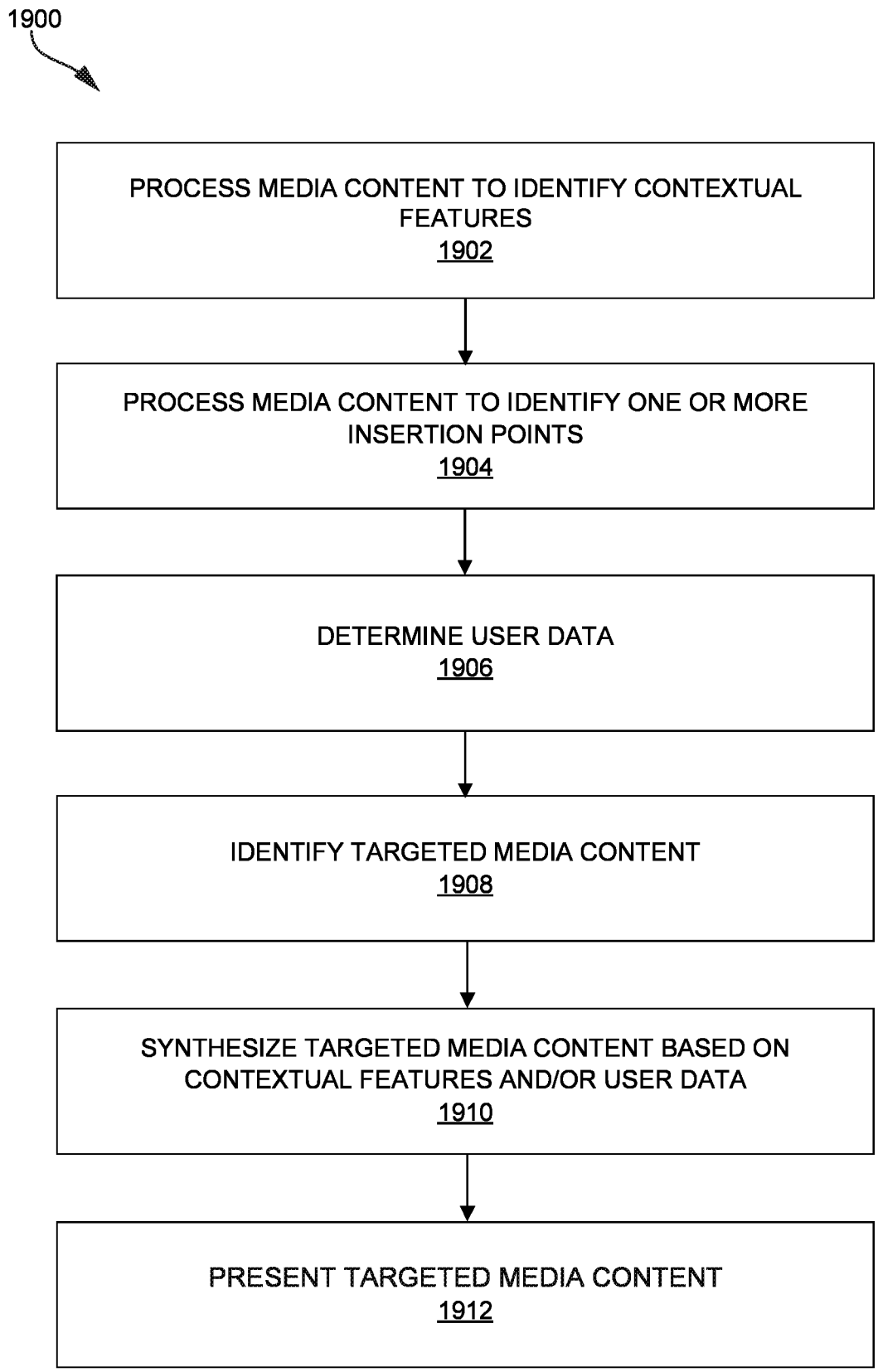
FIG. 19 is a diagram illustrating a flowchart of an example method for processing media content and generating customized media content, according to some examples of the present disclosure.

FIG. 19 is a flowchart for a method 1900 for processing media content and generating customized media content. Method 1900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 19, as will be understood by a person of ordinary skill in the art.

Method 1900 shall be described with reference to FIG. 18. However, method 1900 is not limited to that example.

In step 1902, context analysis module 1802 can process media content 1804 to identify contextual features. In some cases, context analysis module 1802 can be implemented as part of content server(s) 120, media device(s) 106, and/or any other computer system. In some aspects, the contextual features can include a type and/or genre of content, a type of scene, a background and/or setting, any activity and/or events, an actor or actors, demographic information, a mood and/or sentiment, a type of audio or lack thereof, any objects, noise levels, a landmark and/or architecture, a geographic location, a keyword, a message, a type of encoding, a time and/or date, any other characteristic associated with media content 1804, and/or any combination thereof.

In step 1904, context analysis module 1802 can process media content 1804 to determine one or more insertion points. In some aspects, an insertion point may correspond to a point within media content 1804 that is suitable or configurable for inserting, adding, and/or presenting an item of targeted media content 1806. In some cases, an insertion point may correspond to a scene break (e.g., boundary point between distinct scenes) that may or may not be predefined (e.g., a creator of media content 1804 may identify one or more scene breaks). In some instances, an insertion point may correspond to a shot break (e.g., change in perspective or camera used to record video). In some examples, context analysis module 1802 may identify an insertion point that follows or a point proximate to a portion of media content 1804 that includes contextual information that can be associated with an item of targeted media content.

In step 1906, context analysis module 1802 can determine user data (e.g., user data 1808). In some cases, user data may include user attributes and/or user profile data such as viewing history, demographics, geographic data, occupation, familial relationships, privacy settings, viewing preferences, user media content (e.g., photos, videos), search history, social media data, etc. In some aspects, context analysis module 1802 can process user data to identify contextual information that may be associated with the contextual information from media content.

In step 1908, context analysis module 1802 can identify targeted media content 1806. In some cases, targeted media content 1806 can include content (e.g., video content, image content, audio content, text content, etc.) that is associated with a product, service, brand, and/or event. For example, targeted media content 1806 may include a photo of an object, a textual description of a service, a video describing an event, etc. In some instances, context analysis module 1802 can identify targeted media content 1806 based on an association between targeted media content 1806 (e.g., based on metadata or contextual data) and media content 1804 (e.g., based on contextual features). In some cases, the association may be based on a common element or feature. In some examples, the association may be based on detecting a disassociation such that the targeted media content is inapposite to the media content (e.g., in order to create a sentiment of shock or surprise by linking dissimilar content).

In step 1910, context analysis module 1802 can synthesize targeted media content based on contextual features (e.g., from media content 1804) and/or user data 1808. In some cases, synthesizing targeted media content can include replacing or modifying one or more elements of targeted media content based on contextual information derived from media content. For example, the actor used in the synthesized version of the targeted media content can be the same actor identified in media content. In another example, the scene used in the synthesized version of the targeted media content can be the opposite of a scene identified in media content (e.g., targeted media content can be on the beach after a scene in media content that is in the snow).

In some cases, synthesized targeted media content can be entirely generated based on the contextual data from media content. For example, the actors, the objects, the scene, the mood, the music, etc. can all be based on contextual information obtained from media content. In some configurations, synthesized targeted media content can include one or more aspects that are based on user data. For instance, synthesized targeted media content can include the Eiffel tower upon determining that the user has plans to travel to Paris. In another example, synthesized targeted media content can include information for baby supplies based on user data indicating that the user is expecting a child.

In step 1912, context analysis module 1802 can present targeted media content. In some cases, context analysis module 1802 can send the targeted media content to a media device for presentation (e.g., on a smartphone, tablet, television, etc.). In some examples, the targeted media content can be presented be including it with the media content. For instance, the targeted media content can be embedded with the media content at the insertion point.

Figure 20:
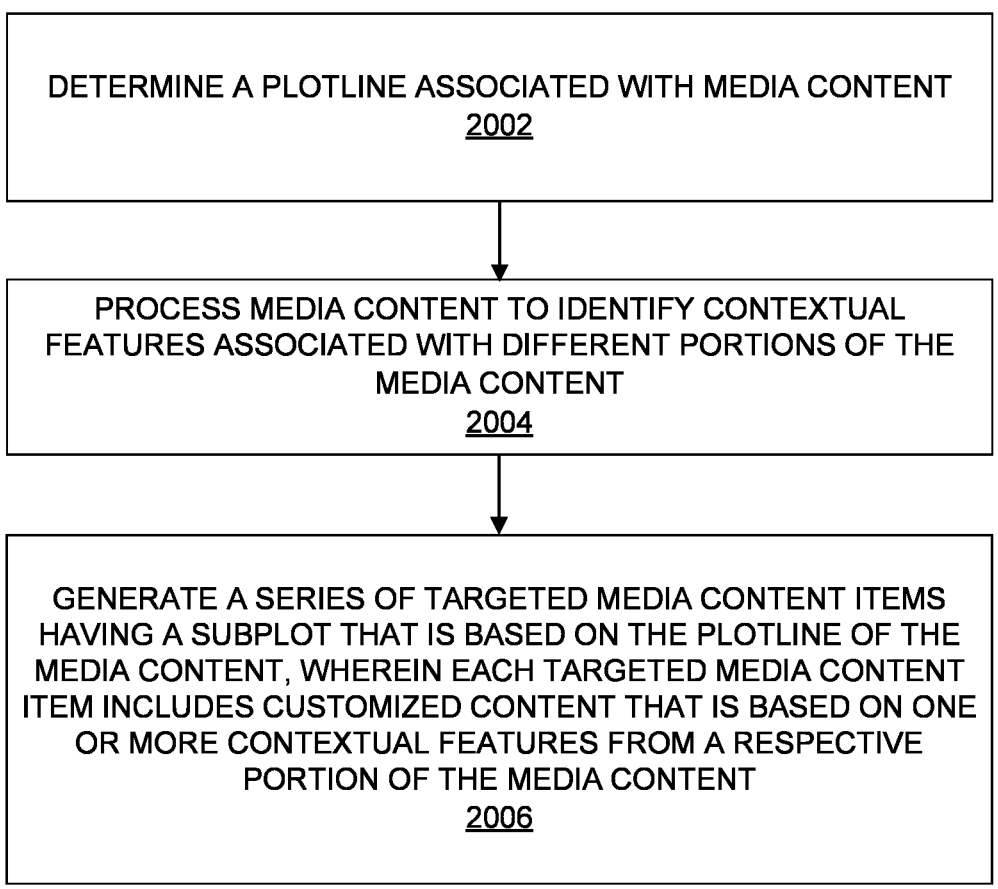
FIG. 20 is a diagram illustrating a flowchart of another example method for processing media content and generating customized media content, according to some examples of the present disclosure.

FIG. 20 is a flowchart for a method 2000 for processing media content and generating customized media content. Method 2000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 20, as will be understood by a person of ordinary skill in the art.

Method 2000 shall be described with reference to FIG. 18. However, method 2000 is not limited to that example.

In step 2002, context analysis module 1802 can determine a plotline associated with media content 1804. In some cases, context analysis module 1802 can extract or determine contextual information from portions of media content 1804 to determine a plotline. In some examples, context analysis module 1802 may determine a plotline that is associated with media content 1804 based on metadata that is associated with media content 1804. In one example, a plotline of a romantic movie may involve two main characters passing through some adversity and falling in love. In another example, a plotline of an action movie may involve an action hero rescuing someone from a dangerous situation. In some configurations, context analysis module 1802 may associate different portions of the plotline with different segments or sections of a video. For instance, a first segment may introduce main characters, a second segment may present adversity, a third segment may provide a climax associated with the adversity, and a fourth segment may provide a resolution.

In step 2004, context analysis module 1802 can process media content 1804 to identify contextual features associated with different portions of the media content. For instance, context analysis module 1802 can identify contextual information that is associated with the various portions of the media content 1804 that correspond to different portions of the plotline. As noted above, the contextual features can include a type and/or genre of content, a type of scene, a background and/or setting, any activity and/or events, an actor or actors, demographic information, a mood and/or sentiment, a type of audio or lack thereof, any objects, noise levels, a landmark and/or architecture, a geographic location, a keyword, a message, a type of encoding, a time and/or date, any other characteristic associated with media content 1804, and/or any combination thereof.

In step 2006, context analysis module 1802 can generate a series of targeted media content items having a subplot that is based on the plotline of the media content, wherein each targeted media content item includes customized content that is based on one or more contextual features from a respective portion of the media content. For instance, in some examples, context analysis module 1802 can generate a series of targeted media content items that include the same actor from the media content following a subplot that is based on the plotline of the media content. In one illustrative example, a first targeted media content item that is presented after the main character meets a romantic interest may include the main character shopping for clothes for an upcoming date. In furtherance of the subplot, a subsequent targeted media content item may depict the main character searching a travel website for possible locations to visit with a partner. In furtherance of the subplot, a subsequent targeted media content item may include the main character picking up a rental car that corresponds to the vehicle used in the media content.

In some instances, the subplot for the series of targeted media content items can be opposed to the plot from the media content. For example, the series of targeted media content items may include a lighthearted or humorous subplot that contradicts a serious or somber plot from the media content. In some cases, aspects of one or more of the series of targeted media content items may complement the media content while other aspects of one or more of the series of targeted media items may appear unrelated to the media content.

In some examples, context analysis module 1802 can insert, embed, or otherwise present the series of targeted media content items using identified insertion points. In some aspects, the insertion points can be selected to associate the subplot from the series of targeted media content items with the media content. In some examples, the insertion points may correspond to scene breaks or to shot breaks.

Figure 21:
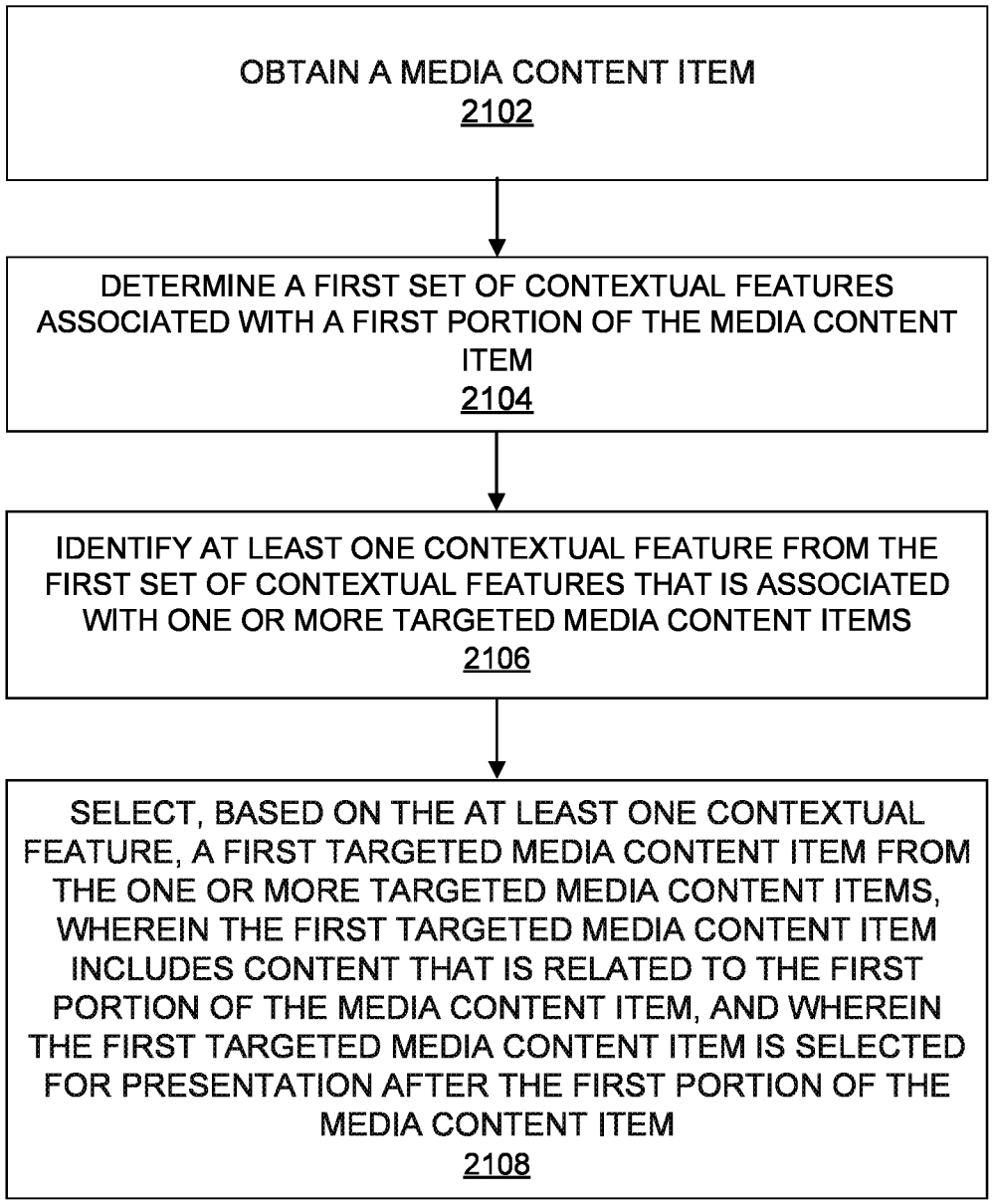
FIG. 21 is a diagram illustrating a flowchart of another example method for processing media content and generating customized media content, according to some examples of the present disclosure.

FIG. 21 is a flowchart for a method 2100 for processing media content and generating customized media content. Method 2100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 21, as will be understood by a person of ordinary skill in the art.

Method 2100 shall be described with reference to FIG. 18. However, method 2100 is not limited to that example.

In step 2102, the method 2100 includes obtaining a media content item. In some cases, context analysis module 1802 can obtain media content 1804 from a content server (e.g., content server(s) 120). In some examples, context analysis module 1802 may be implemented on a media device (e.g., media device(s) 106) and context analysis module 1802 may receive media content from a server (e.g., content server(s) 120) over a network (e.g., network 118). In some examples, the media content item can include music, videos, movies, TV programs, multimedia, images, still pictures, text, graphics, gaming applications, targeted content, programming content, public service content, government content, local community content, software, and/or any other content or data objects in electronic form. For example, the media content item can include a live video broadcast of a sporting event.

In step 2104, the method 2100 includes determining a first set of contextual features associated with a first portion of the media content item. For example, context analysis module 1802 can determine a first set of contextual features that is associated with a first portion of media content 1804. In some aspects, the first set of contextual features can include at least one of a genre type, a scene type, a sentiment, an environment, a geographic location, a keyword, an object, and a sound.

In step 2106, the method 2100 includes identifying at least one contextual feature from the first set of contextual features that is associated with one or more targeted media content items. For instance, context analysis module 1802 can identify at least one contextual feature from the first set of contextual features (e.g., determined from media content 1804) that is associated with one or more targeted media content items (e.g., targeted media content 1806). In some cases, context analysis module 1802 may determine contextual features and/or metadata corresponding to targeted media content 1806 and associate targeted media content 1806 with media content 1804 based on the respective contextual features and/or metadata.

In step 2108, the method 2100 includes selecting, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item. For instance, context analysis module 1802 can select a first targeted media content item from targeted media content 1806 and add the selected targeted media content item to media content 1804 to generate customized media content 1810.

In some aspects, the method 2100 can include modifying the first targeted media content item to yield a modified version of the first targeted media content item, wherein the modified version of the first targeted media content item includes customized content that is based on the first set of contextual features associated with the first portion of the media content item. For example, context analysis module 1802 can modify targeted media content 1806 to include customized content that is based on contextual features (e.g., scene, mood, music, etc.) associated with media content 1804.

In some examples, the method 2100 can include generating the first targeted media content item based on the first set of contextual features. For instance, context analysis module 1802 can generate or synthesize targeted media content 1806 based on contextual features derived from media content 1804. In one illustrative example, context analysis module 1802 may receive data that identifies an object or product and generate or synthesize targeted media content associated with the object or product using contextual features from media content 1804.

In some cases, the method 2100 can include determining a second set of contextual features associated with a second portion of the media content item and selecting, based on one or more contextual features from the second set of contextual features, a second targeted media content item from the one or more targeted media content items, wherein the second targeted media content item continues a plot from the first targeted media content item, and wherein the second targeted media content item is selected for presentation after the second portion of the media content item. For example, context analysis module 1802 can determine a second set of contextual features associated with a second portion (e.g., different scene) from media content 1804, and context analysis module 1802 can select a second targeted media content item (e.g., from targeted media content 1806) that continues a plot or subplot that was introduced in the first targeted media content item.

In some instances, method 2100 can include determining, based on the first set of contextual features, that the first portion of the media content item is associated with a first sentiment; and selecting the first targeted media content item that is associated with a second sentiment, wherein the second sentiment is different than the first sentiment. For example, context analysis module 1802 may determine, based on the first set of contextual features, that the first portion of media content 1804 is associated with an angry sentiment and context analysis module 1802 can select targeted media content 1806 (e.g., for inclusion with media content 1804 as part of customized media content 1810) that is associated with a happy sentiment.

In some aspects, method 2100 can include identifying a shot break that follows the first portion of the media content item; and inserting the first targeted media content item directly after the shot break. For example, context analysis module 1802 can identify a shot break within media content 1804 that follows the first portion (e.g., first scene associated with extracted contextual features) and context analysis module 1802 can insert targeted media content 1806 directly after the shot break to generate customized media content 1810.

In some examples, method 2100 can include identifying, based on the first set of contextual features, at least one targeted media content item that is ineligible for presentation after the first portion of the media content item. For instance, context analysis module 1802 may determine that an item of targeted media content 1806 is ineligible for presentation based on user data 1808 (e.g., user is not interested in content from targeted media content 1806). In another example, context analysis module 1802 may determine that an item of targeted media content 1806 is not eligible for presentation based on one or more rules associated with the targeted media content 1806. For instance, an item of targeted media content 1806 may be associated with rules indicating that the item should not be presented after a scene that includes violent content.

In some cases, method 2100 can include providing, to a device associated with a user, the first targeted media content item for presentation after the first portion of the media content item. For instance, context analysis module 1802 can be implemented on a server (e.g., content server(s) 120) that is configured to provide customized media content 1810 to a media device (e.g., media device(s) 106).

In some aspects, method 2100 can include obtaining one or more attributes associated with a user that is viewing the media content item; and modifying the first targeted media content item to include customized content that is based on the one or more attributes. For instance, context analysis module 1802 can obtain user data 1808 and context analysis module 1802 can modify targeted media content 1806 to include customized content that is based on user data 1808.

Figure 22:
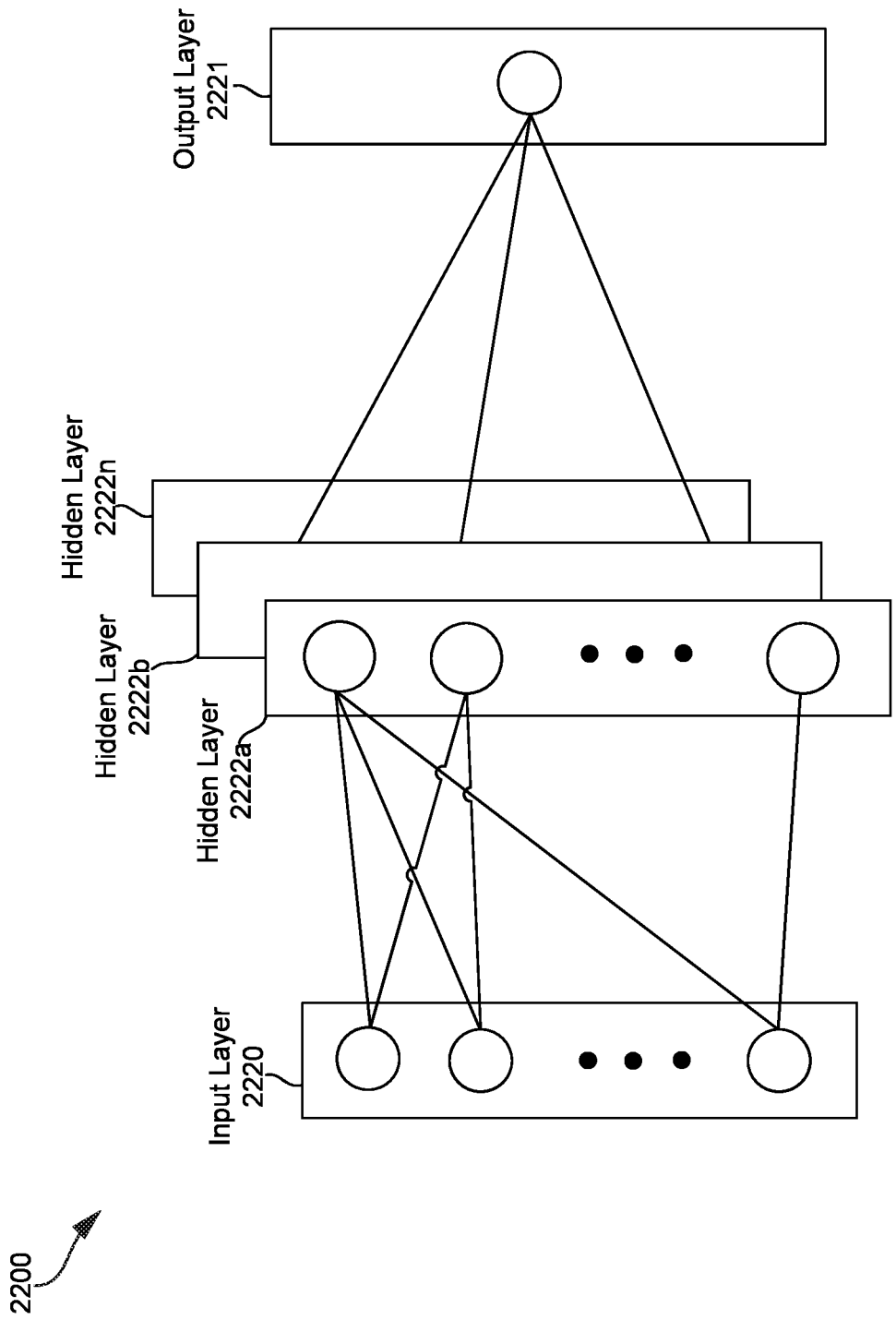
FIG. 22 is a diagram illustrating an example of a neural network architecture, according to some examples of the present disclosure.

FIG. 22 is a diagram illustrating an example of a neural network architecture 2200 that can be used to implement some or all of the neural networks described herein. The neural network architecture 2200 can include an input layer 2220 can be configured to receive and process data to generate one or more outputs. The neural network architecture 2200 also includes hidden layers 2222*a*, 2222*b*, through 2222*n*. The hidden layers 2222*a*, 2222*b*, through 2222*n* include "n" number of hidden layers, where "n" is an integer greater than or equal to one. The number of hidden layers can be made to include as many layers as needed for the given application. The neural network architecture 00 further includes an output layer 2221 that provides an output resulting from the processing performed by the hidden layers 2222*a*, 2222*b*, through 2222*n*.

The neural network architecture 2200 is a multi-layer neural network of interconnected nodes. Each node can represent a piece of information. Information associated with the nodes is shared among the different layers and each layer retains information as information is processed. In some cases, the neural network architecture 2200 can include a feed-forward network, in which case there are no feedback connections where outputs of the network are fed back into itself. In some cases, the neural network architecture 2200 can include a recurrent neural network, which can have loops that allow information to be carried across nodes while reading in input.

Information can be exchanged between nodes through node-to-node interconnections between the various layers. Nodes of the input layer 2220 can activate a set of nodes in the first hidden layer 2222*a*. For example, as shown, each of the input nodes of the input layer 2220 is connected to each of the nodes of the first hidden layer 2222*a*. The nodes of the first hidden layer 2222*a* can transform the information of each input node by applying activation functions to the input node information. The information derived from the transformation can then be passed to and can activate the nodes of the next hidden layer 2222*b*, which can perform their own designated functions. Example functions include convolutional, up-sampling, data transformation, and/or any other suitable functions. The output of the hidden layer 2222*b* can then activate nodes of the next hidden layer, and so on. The output of the last hidden layer 2222*n* can activate one or more nodes of the output layer 2221, at which an output is provided. In some cases, while nodes in the neural network architecture 2200 are shown as having multiple output lines, a node can have a single output and all lines shown as being output from a node represent the same output value.

In some cases, each node or interconnection between nodes can have a weight that is a set of parameters derived from the training of the neural network architecture 2200. Once the neural network architecture 2200 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 2200 to be adaptive to inputs and able to learn as more and more data is processed.

The neural network architecture 2200 is pre-trained to process the features from the data in the input layer 2220 using the different hidden layers 2222*a*, 2222*b*, through 2222*n* in order to provide the output through the output layer 2221.

In some cases, the neural network architecture 2200 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 2200 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as E_total=Σ(½ (target-output)/^2). The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 2200 can perform a backward pass by determining which inputs (weights) most contributed to the loss of the network, and can adjust the weights so that the loss decreases and is eventually minimized.

The neural network architecture 2200 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 2200 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 23:
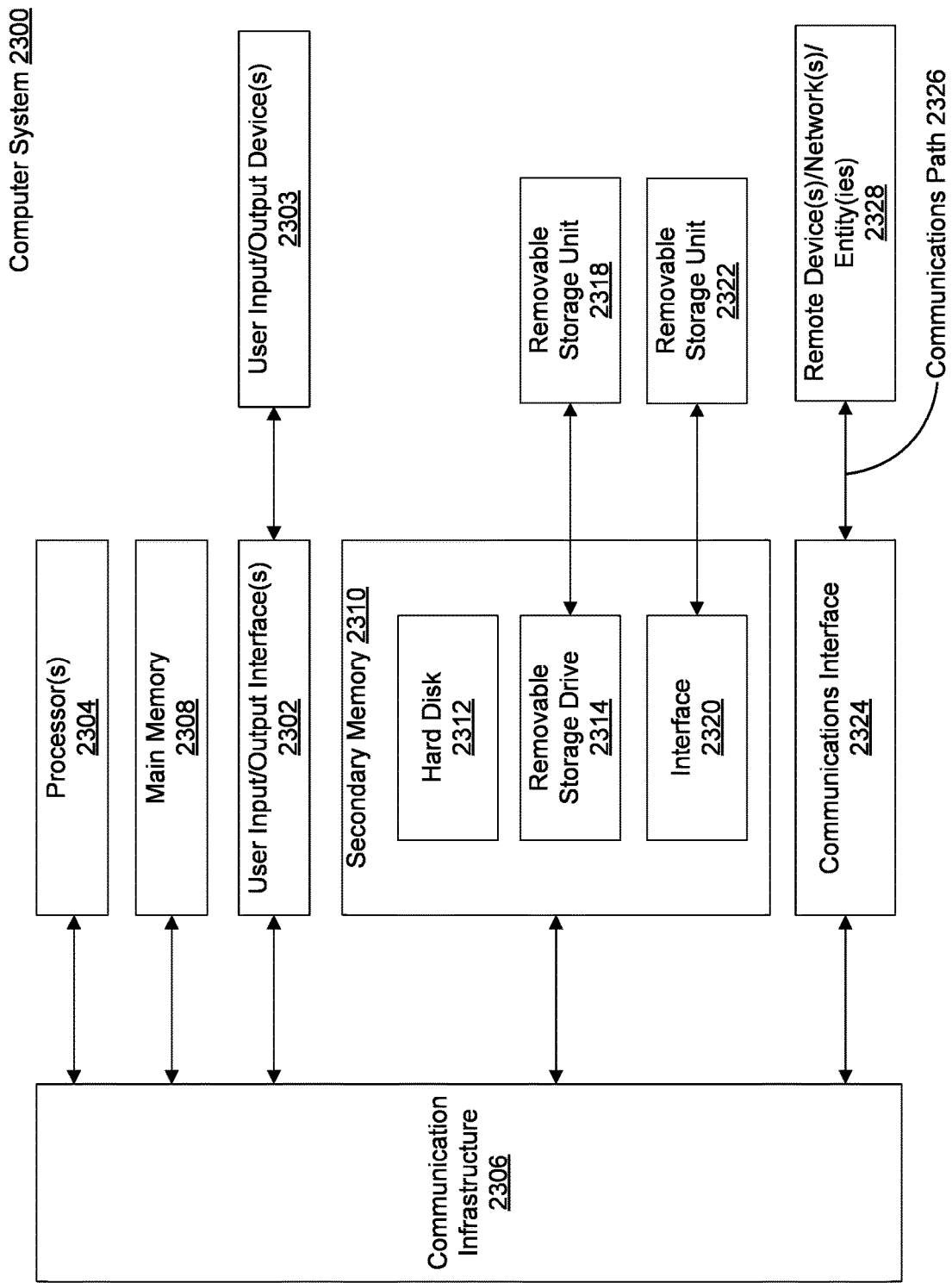
FIG. 23 illustrates an example computer system that can be used for implementing various aspects of the present disclosure.

Various aspects and examples may be implemented, for example, using one or more well-known computer systems, such as computer system 2300 shown in FIG. 23. For example, the media device 106 may be implemented using combinations or sub-combinations of computer system 2300. Also or alternatively, one or more computer systems 2300 may be used, for example, to implement any of the aspects and examples discussed herein, as well as combinations and sub-combinations thereof.

Computer system 2300 may include one or more processors (also called central processing units, or CPUs), such as a processor 2304. Processor 2304 may be connected to a communication infrastructure or bus 2306.

Computer system 2300 may also include user input/output device(s) 2303, such as monitors, keyboards, pointing devices, etc., which may communicate with communication infrastructure 2306 through user input/output interface(s) 2302.

One or more of processors 2304 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2300 may also include a main or primary memory 2308, such as random access memory (RAM). Main memory 2308 may include one or more levels of cache. Main memory 2308 may have stored therein control logic (e.g., computer software) and/or data.

Computer system 2300 may also include one or more secondary storage devices or memory 2310. Secondary memory 2310 may include, for example, a hard disk drive 2312 and/or a removable storage device or drive 2314. Removable storage drive 2314 may be a floppy disk drive, a magnetic tape drive, a compact disk drive, an optical storage device, tape backup device, and/or any other storage device/drive.

Removable storage drive 2314 may interact with a removable storage unit 2318. Removable storage unit 2318 may include a computer usable or readable storage device having stored thereon computer software (control logic) and/or data. Removable storage unit 2318 may be a floppy disk, magnetic tape, compact disk, DVD, optical storage disk, and/any other computer data storage device. Removable storage drive 2314 may read from and/or write to removable storage unit 2318.

Secondary memory 2310 may include other means, devices, components, instrumentalities or other approaches for allowing computer programs and/or other instructions and/or data to be accessed by computer system 2300. Such means, devices, components, instrumentalities or other approaches may include, for example, a removable storage unit 2322 and an interface 2320. Examples of the removable storage unit 2322 and the interface 2320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 2300 may include a communication or network interface 2324. Communication interface 2324 may enable computer system 2300 to communicate and interact with any combination of external devices, external networks, external entities, etc. (individually and collectively referenced by reference number 2328). For example, communication interface 2324 may allow computer system xx00 to communicate with external or remote devices 2328 over communications path 2326, which may be wired and/or wireless (or a combination thereof), and which may include any combination of LANs, WANs, the Internet, etc. Control logic and/or data may be transmitted to and from computer system 2300 via communication path 2326.

Computer system 2300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 2300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 2300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2300, main memory 2308, secondary memory 2310, and removable storage units 2318 and 2322, as well as tangible articles of manufacture embodying any combination of the foregoing. Such control logic, when executed by one or more data processing devices (such as computer system 2300 or processor(s) 2304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 23. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: determining a first set of contextual features associated with a first portion of a media content item; identifying at least one contextual feature from the first set of contextual features that is associated with one or more targeted media content items; and selecting, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item.

Aspect 2. The method of Aspect 1, further comprising: modifying the first targeted media content item to yield a modified version of the first targeted media content item, wherein the modified version of the first targeted media content item includes customized content that is based on the first set of contextual features associated with the first portion of the media content item.

Aspect 3. The method of any of Aspects 1 to 2, further comprising: generating the first targeted media content item based on the first set of contextual features.

Aspect 4. The method of any of Aspects 1 to 3, further comprising: determining a second set of contextual features associated with a second portion of the media content item; and selecting, based on one or more contextual features from the second set of contextual features, a second targeted media content item from the one or more targeted media content items, wherein the second targeted media content item continues a plot from the first targeted media content item, and wherein the second targeted media content item is selected for presentation after the second portion of the media content item.

Aspect 5. The method of any of Aspects 1 to 4, wherein the first set of contextual features includes at least one of a genre type, a scene type, a sentiment, an environment, a geographic location, a keyword, an object, and a sound.

Aspect 6. The method of any of Aspects 1 to 5, further comprising: determining, based on the first set of contextual features, that the first portion of the media content item is associated with a first sentiment; and selecting the first targeted media content item that is associated with a second sentiment, wherein the second sentiment is different than the first sentiment.

Aspect 7. The method of any of Aspects 1 to 6, further comprising: identifying a shot break that follows the first portion of the media content item; and inserting the first targeted media content item directly after the shot break.

Aspect 8. The method of any of Aspects 1 to 7, wherein the media content item comprises a live video broadcast.

Aspect 9. The method of any of Aspects 1 to 8, further comprising: identifying, based on the first set of contextual features, at least one targeted media content item that is ineligible for presentation after the first portion of the media content item.

Aspect 10. The method of any of Aspects 1 to 9, further comprising: providing, to a device associated with a user, the first targeted media content item for presentation after the first portion of the media content item.

Aspect 11. The method of any of Aspects 1 to 10, further comprising: obtaining one or more attributes associated with a user that is viewing the media content item; and modifying the first targeted media content item to include customized content that is based on the one or more attributes.

Aspect 12. An apparatus comprising: at least one memory; and at least one processor coupled to the at least one memory, wherein the at least one processor is configured to perform operations in accordance with any one of Aspects 1 to 11.

Aspect 13. An apparatus comprising means for performing operations in accordance with any one of Aspects 1 to 11.

Aspect 14. A non-transitory computer-readable medium comprising instructions that, when executed by an apparatus, cause the apparatus to perform operations in accordance with any one of Aspects 1 to 11.

What is claimed is:

1. A system comprising:
one or more memories; and
at least one processor coupled to at least one of the one or more memories and configured to perform operations comprising:
    determine a first set of contextual features associated with a first portion of a media content item;
    identify at least one contextual feature from the first set of contextual features that is associated with one or more targeted media content items; and
    select, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item,
    determine a second set of contextual features associated with a second portion of the media content item; and
    select, based on one or more contextual features from the second set of contextual features, a second targeted media content item from the one or more targeted media content items, wherein the second targeted media content item continues a plot from the first targeted media content item, and wherein the second targeted media content item is selected for presentation after the second portion of the media content item.

2. The system of claim 1, wherein the at least one processor is configured to perform operations comprising:
    modify the first targeted media content item to yield a modified version of the first targeted media content item, wherein the modified version of the first targeted media content item includes customized content that is based on the first set of contextual features associated with the first portion of the media content item.

3. The system of claim 1, wherein the at least one processor is configured to perform operations comprising:
    generate the first targeted media content item based on the first set of contextual features.

4. The system of claim 1, wherein the first set of contextual features includes at least one of a genre type, a scene type, a sentiment, an environment, a geographic location, a keyword, an object, and a sound.

5. The system of claim 1, wherein the at least one processor is configured to perform operations comprising:
    determine, based on the first set of contextual features, that the first portion of the media content item is associated with a first sentiment; and
    select the first targeted media content item that is associated with a second sentiment, wherein the second sentiment is different than the first sentiment.

6. The system of claim 1, wherein the at least one processor is configured to perform operations comprising:
    identify a shot break that follows the first portion of the media content item; and
    insert the first targeted media content item directly after the shot break.

7. The system of claim 1, wherein the media content item comprises a live video broadcast.

8. The system of claim 1, wherein the at least one processor is configured to perform operations comprising:
    identify, based on the first set of contextual features, at least one targeted media content item that is ineligible for presentation after the first portion of the media content item.

9. The system of claim 1, wherein the at least one processor is configured to perform operations comprising:
    provide, to a device associated with a user, the first targeted media content item for presentation after the first portion of the media content item.

10. The system of claim 1, wherein the at least one processor is configured to perform operations comprising:
obtain one or more attributes associated with a user that is viewing the media content item; and
modify the first targeted media content item to include customized content that is based on the one or more attributes.

11. A computer-implemented method for processing media content, the computer-implemented method comprising:
determining a first set of contextual features associated with a first portion of a media content item;
identifying at least one contextual feature from the first set of contextual features that is associated with one or more targeted media content items;
selecting, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item;
determining a second set of contextual features associated with a second portion of the media content item; and
selecting, based on one or more contextual features from the second set of contextual features, a second targeted media content item from the one or more targeted media content items, wherein the second targeted media content item continues a plot from the first targeted media content item, and wherein the second targeted media content item is selected for presentation after the second portion of the media content item.

12. The computer-implemented method of claim 11, further comprising:
modifying the first targeted media content item to yield a modified version of the first targeted media content item, wherein the modified version of the first targeted media content item includes customized content that is based on the first set of contextual features associated with the first portion of the media content item.

13. The computer-implemented method of claim 11, further comprising:
generating the first targeted media content item based on the first set of contextual features.

14. The computer-implemented method of claim 11, further comprising:
determining, based on the first set of contextual features, that the first portion of the media content item is associated with a first sentiment; and
select the first targeted media content item that is associated with a second sentiment, wherein the second sentiment is different than the first sentiment.

15. The computer-implemented method of claim 11, further comprising:
identifying, based on the first set of contextual features, at least one targeted media content item that is ineligible for presentation after the first portion of the media content item.

16. The computer-implemented method of claim 11, further comprising:
providing, to a device associated with a user, the first targeted media content item for presentation after the first portion of the media content item.

17. The computer-implemented method of claim 11, further comprising:
obtaining one or more attributes associated with a user that is viewing the media content item; and
modifying the first targeted media content item to include customized content that is based on the one or more attributes.

18. A non-transitory computer-readable medium having instructions stored thereon that, when executed by at least one computing device, cause the at least one computing device to perform operations comprising:
determine a first set of contextual features associated with a first portion of a media content item;
identify at least one contextual feature from the first set of contextual features that is associated with one or more targeted media content items; and
select, based on the at least one contextual feature, a first targeted media content item from the one or more targeted media content items, wherein the first targeted media content item includes content that is related to the first portion of the media content item, and wherein the first targeted media content item is selected for presentation after the first portion of the media content item;
determine a second set of contextual features associated with a second portion of the media content item; and
select, based on one or more contextual features from the second set of contextual features, a second targeted media content item from the one or more targeted media content items, wherein the second targeted media content item continues a plot from the first targeted media content item, and wherein the second targeted media content item is selected for presentation after the second portion of the media content item.

* * * * *